United States Patent [19]

Kitagawa et al.

[11] Patent Number: 5,678,402
[45] Date of Patent: Oct. 21, 1997

[54] AIR-FUEL RATIO CONTROL SYSTEM FOR INTERNAL COMBUSTION ENGINES AND EXHAUST SYSTEM TEMPERATURE-ESTIMATING DEVICE APPLICABLE THERETO

[75] Inventors: Hiroshi Kitagawa; Seiji Hatcho; Tetsuya Kaneko; Akira Kato; Toshiaki Hirota; Masami Watanabe; Jun Takahashi, all of Wako, Japan

[73] Assignee: Honda Giken Kogyo Kabushiki Kaisha, Tokyo, Japan

[21] Appl. No.: 408,820

[22] Filed: Mar. 23, 1995

[30] Foreign Application Priority Data

| Mar. 23, 1994 | [JP] | Japan | 6-076649 |
| Mar. 23, 1994 | [JP] | Japan | 6-076650 |
| Mar. 23, 1994 | [JP] | Japan | 6-076651 |
| Mar. 23, 1994 | [JP] | Japan | 6-076652 |

[51] Int. Cl.$^6$ .................................................. F01N 3/28
[52] U.S. Cl. .................... 60/276; 60/277; 60/285
[58] Field of Search .................... 60/274, 276, 277, 60/285

[56] References Cited

U.S. PATENT DOCUMENTS

| 4,656,829 | 4/1987 | Creps | 60/277 |
| 5,077,970 | 1/1992 | Hamburg | 60/277 |
| 5,158,063 | 10/1992 | Hosoda | 60/277 |
| 5,303,168 | 4/1994 | Cullen | 123/425 |
| 5,462,037 | 10/1995 | Hasegawa | 123/673 |

FOREIGN PATENT DOCUMENTS

| 56-17533 | 4/1981 | Japan . |
| 62-203965 | 9/1987 | Japan . |
| 63-97848 | 4/1988 | Japan . |
| 1-219340 | 9/1989 | Japan . |
| 2-11841 | 1/1990 | Japan . |
| 6-193516 | 7/1994 | Japan . |

*Primary Examiner*—Douglas Hart
*Attorney, Agent, or Firm*—Nikaido Marmelstein Murray & Oram LLP

[57] ABSTRACT

An air-fuel ratio control system for an internal combustion engine has a catalytic converter arranged in an exhaust passage. A maximum oxygen storage amount indicative of the maximum amount of oxygen that can be stored in the catalytic converter is calculated. The air-fuel ratio of a mixture supplied to the engine is forcibly oscillated at a predetermined frequency and a predetermined amplitude. At least one of the predetermined frequency and the predetermined amplitude is changed at a predetermined rate of change. A predetermined rate of change of the at least one of the predetermined frequency and the predetermined amplitude is set in dependence on the maximum oxygen storage amount to thereby secure the maximum purification rate of the catalytic converter.

27 Claims, 36 Drawing Sheets

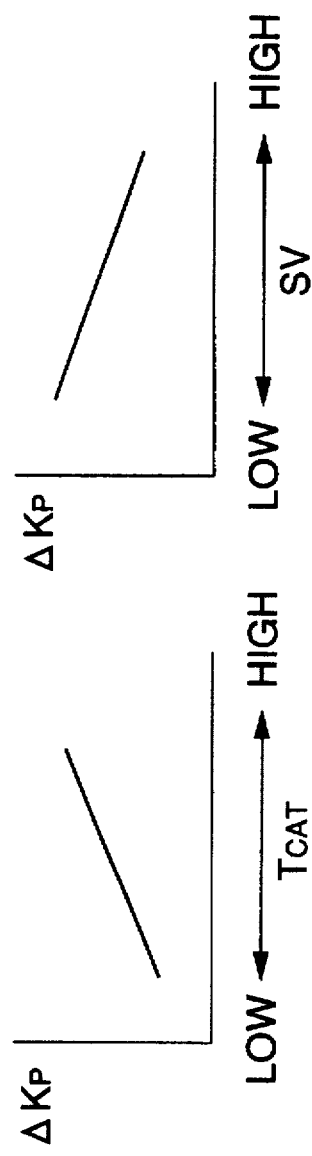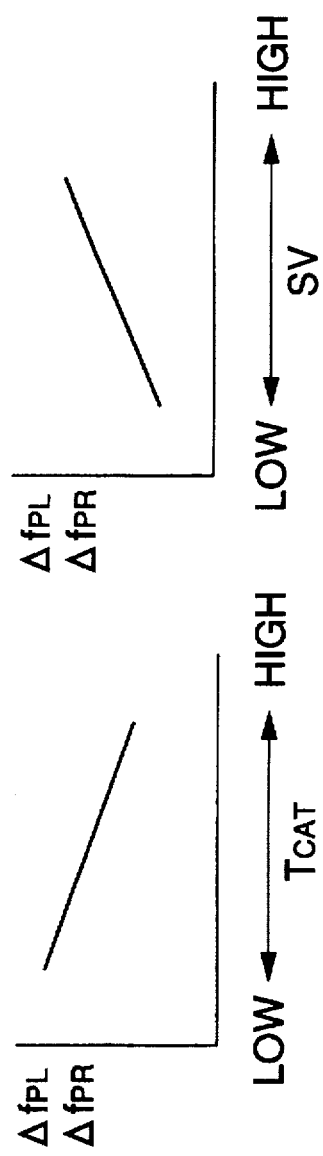

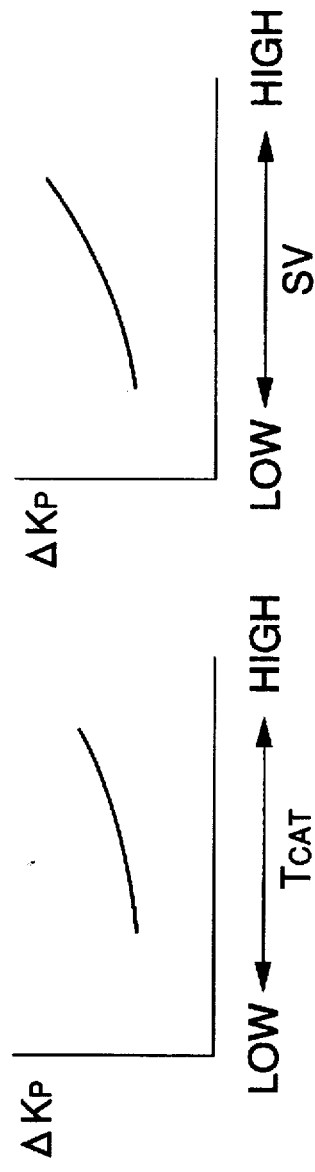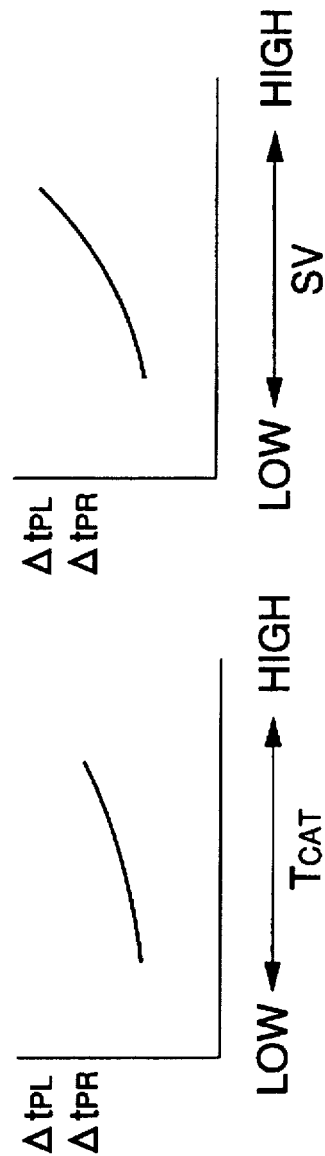

AIR-FUEL RATIO CONTROL SYSTEM FOR INTERNAL COMBUSTION ENGINES AND EXHAUST SYSTEM TEMPERATURE-ESTIMATING DEVICE APPLICABLE THERETO

BACKGROUND OF THE INVENTION

1. Field of the Invention

This invention relates to an air-fuel ratio control system and an exhaust system temperature-estimating device applicable thereto, and more particularly to an air-fuel ratio control system for internal combustion engines for controlling the air-fuel ratio of a mixture supplied to the engine such that the purifying efficiency of a catalytic converter arranged in the exhaust system of the engines is enhanced, an air-fuel ratio control system for controlling the air-fuel ratio of the mixture by estimating the air-fuel ratio of exhaust gases flowing into the catalytic converter during air-fuel ratio feedback control of the engine, and an exhaust system temperature-estimating timing device applicable to these systems.

2. Prior Art

Conventionally, an air-fuel ratio control system, which is directed to improvement of the purification rate of a catalytic converter, is disclosed by Japanese Laid-Open Patent Publication (Kokai) No. 2-11841 or Japanese Patent Publication (Kokoku) No. 56-17533, in which the air-fuel ratio of a mixture supplied to an internal combustion engine having a catalytic converter is subjected to forced oscillation (perturbation) to enhance the purification rate (purifying efficiency) of the catalytic converter.

Further, the present assignee has already proposed a fuel supply control system by Japanese Patent Application No. 5-329780 corresponding to U.S. Ser. No. 08/353,201, which calculates an oxygen (O2) utilization factor from an amount of oxygen stored in the catalytic converter (oxygen storage amount), and forcibly oscillates the air-fuel ratio of the mixture by the use of a control amount for perturbation, based on the oxygen utilization factor, thereby changing the frequency and amplitude of a waveform indicative of changes in the air-fuel ratio such that the purification rate of the catalytic converter becomes the maximum, or alternatively sets the gain of a proportional term and rich-lean inverting delay for use in air-fuel ratio feedback control, based on the oxygen utilization factor, thereby subjecting the air-fuel ratio to forced oscillation (pseudo-perturbation).

However, the proposed systems still require further improvements for the following reasons: That is, the purification rate of the catalytic converter largely depends on parameters representative of the temperature and deterioration degree of the catalytic converter. However, the proposed systems do not detect or estimate these parameters to set the frequency and amplitude of the above forced oscillation.

More specifically, in the conventional systems, in spite of the fact that the purifying efficiency of the catalytic converter largely depends on an amount of exhaust gases (space velocity SV) as a representative parameter of operating conditions of the engine, as well as on the temperature and deterioration of the catalytic converter, possible combinations of frequencies and amplitudes of the force oscillation, and possible combinations of values of the gain of the proportional term and lean-rich inverting delay time periods are fixed, and hence, it is not always possible to control the air-fuel ratio such that the maximum purification rate of the catalytic converter is maintained when the operating condition of the engine or the operating state of the catalytic converter are changed.

Further, in the proposed system (Japanese Patent Application No. 5-329780, to cause the catalytic converter to exhibit the purifying capacity thereof to the maximum extent, it is proposed to estimate the oxygen storage amount based on the air-fuel ratio of exhaust gases detected at a location upstream of the catalytic converter, and carry out the forced oscillation of the air-fuel ratio control such that the estimated value of the oxygen storage amount does not exceed the maximum allowable storage amount.

In the fuel supply control system, the maximum storage amount is estimated based on the reaction rate of the catalytic converter, the air-fuel ratio of exhaust gases upstream of the catalytic converter, the catalyst temperature, and the degree of deterioration of the catalyst, which prevents, when taking estimation errors into consideration, the air-fuel ratio control from utilizing the oxygen storage amount of the catalytic converter to its maximum extent. Therefore, the air-fuel ratio control is carried out such that the oxygen storage amount is limited to a predetermined range defined by an lower limit of 10 to 30% of the maximum allowable storage amount and an upper limit of 70 to 90% of the same.

However, when the temperature (catalyst temperature) of the catalytic converter is not high enough to activate the catalyst, or when the catalytic converter is deteriorated, the effective oxygen storage amount (dynamic maximum allowable storage amount) calculated in a dynamic state in which the air-fuel ratio changes with time is small compared with the maximum allowable storage amount (static maximum allowable storage amount) calculated in a static state in which the air-fuel ratio does not change with time. Therefore, unless the margin of the predetermined range within the maximum allowable storage amount in the static state is set to a sufficiently large value, the oxygen storage amount within the catalytic converter undesirably exceeds the effective oxygen storage amount, which results in deviation of the air-fuel ratio downstream of the catalytic converter toward a richer or leaner side, degrading exhaust emission characteristics of the engine.

Conversely, if the margin of the predetermined range within the maximum storage amount is set to a larger value than required, it would be necessary to increase the capacity of the catalytic converter to achieve purification as desired, which results in an decrease in the purification rate.

In the proposed fuel supply control system, to calculate the oxygen storage amount of the catalytic converter, the air-fuel ratio (excess air ratio) of exhaust gases flowing into the catalytic converter is estimated based on an output from an O2 sensor arranged immediately downstream of the exhaust valve of engine. More specifically, an air-fuel ratio coefficient KO2 which is calculated such that the air-fuel ratio (excess air ratio) detected by the O2 sensor becomes equal to a desired air-fuel ratio, an average value KO2AVE thereof is calculated by the weighted average method, and then the ratio of the calculated correction coefficient KO2 value to the average value KO2AVE is calculated to estimate the air-fuel ratio of exhaust gases flowing into the catalytic converter from the ratio.

Further, in the proposed conventional system, a method of air-fuel ratio feedback control (2O2F/B control) is also disclosed, which utilizes an output from an additional (downstream) oxygen sensor arranged in the exhaust system at a location downstream of the catalytic converter. Based on the output from the downstream oxygen sensor, the correction coefficient KO2 based on the output from the upstream oxygen sensor is corrected. In air-fuel ratio control according to this method, the average value of the correction coefficient KO2 obtained through correction based on the output from the downstream O2 sensor is substantially equal to the stoichiometric air-fuel ratio, and hence calculation of the ratio KO2/KO2AVE makes it possible to estimate a value of the air-fuel ratio which is free from an error with respect to the stoichiometric air-fuel ratio.

However, the proposed system still requires further improvements for the following reasons: That is, the upstream oxygen sensor is arranged immediately after the exhaust valve of the engine to accelerate activation of the sensor, or increase the response speed of the control to the air-fuel ratio of exhaust gases. On the other hand, the exhaust gases emitted from the exhaust valve are dispersed and mixed with each other as they flow in the exhaust pipe down to the catalytic converter. Therefore, the air fuel ratio of exhaust gases actually flowing into the catalytic converter has a smooth waveform which is different from the waveform of the air-fuel ratio of exhaust gases immediately downstream of the exhaust valve which is reflected in the air-fuel ratio correction coefficient KO2. Therefore, there arises a discrepancy between the air-fuel ratio of exhaust gases immediately downstream of the exhaust valve and the air-fuel ratio of exhaust gases flowing into the catalytic converter, which results in an error in the oxygen storage amount calculated based on the former air-fuel ratio.

Further, in the air-fuel ratio feedback control carried out by the use of the downstream oxygen sensor, it is possible to estimate the air-fuel ratio which is free from an error with respect to the stoichiometric air-fuel ratio. However, the follow-up speed, i.e. the speed at which the air-fuel ratio converges to the stoichiometric air-fuel ratio is slow in the air-fuel ratio feedback control, so that in a transient operating condition of the engine, the accuracy of estimation of the air-fuel ratio is low until the controlled air-fuel ratio converges to the stoichiometric air-fuel ratio.

An exhaust system temperature-estimating device applicable to such an air-fuel ratio control system or fuel supply control system described above has been proposed by Japanese Laid-Open Patent Publication (Kokai) No. 63-97848, which estimates the temperature of a catalyst arranged in the exhaust system of the engine. According to the method of estimation of the catalyst temperature of this proposed device, the catalyst temperature is determined or estimated from a basic fuel supply amount VAUP, the engine rotational speed NE, and the coolant temperature TW assumed at the start of the engine, and a rate of change Δ CTMP in the catalyst temperature is determined from a map set according to the basic fuel supply amount VAUP and the engine rotational speed NE, based on which the catalyst temperature is updated in a cumulative manner, until the estimated catalyst temperature reaches an upper limit value (fixed value). Fuel supply control is carried out such that the catalyst temperature is held at the upper limit value to protect the catalytic converter from excessive heat.

Further, it has been proposed by Japanese Laid-Open Patent Publication (Kokai) No. 1-219340 to cumulate correction values determined according to the intake air quantity Qa and correct the cumulative value by the ambient air temperature, to thereby estimate the temperature of a component part of the exhaust system, such as an oxygen sensor.

Besides, it has been proposed by Japanese Laid-Open Patent Publication (Kokai) No. 62-203965 to correct the temperature of a catalytic converter in a steady condition by the use of a time constant for estimation of the temperature which is set based on the intake air quantity and the air-fuel ratio to thereby estimate the temperature of the catalytic converter.

However, the prior art still provides room for a further improvement of the accuracy of estimation of the exhaust system temperature, for the following reasons: That is, according to the method of estimation of the catalyst temperature proposed by Japanese Laid-Open Patent Publication (Kokai) No. 63-97848, when the catalyst temperature estimated in a cumulative manner exceeds the upper limit value, the catalyst temperature is merely held at the fixed value to protect the catalytic converter. No contemplation is made of the fact that the catalytic converter is cooled by a traveling wind.

Further, Japanese Laid-Open Patent Publication (Kokai) No. 1-219340 does not disclose setting the temperature of a component part of the exhaust system to a temperature value thereof in a steady condition. Further, although the correction value related to the ordinary temperature is corrected by the intake air temperature, the traveling wind, which varies with the vehicle, is not contemplated.

Further, although Japanese Laid-Open Patent Publication (Kokai) No. 62-203965 discloses correcting the temperature of the catalytic converter in a steady condition by the intake air amount Qa and the air-fuel ratio A/F in estimating the temperature of the catalytic converter, the fact that the catalytic converter is cooled by a raveling wind is not contemplated.

SUMMARY OF THE INVENTION

It is a first object of the invention to provide an air-fuel ratio control system for an internal combustion engine, which is capable of securing the maximum purification rate of the catalytic converter by carrying out the air-fuel ratio control in dependence on operating conditions of the engine as well as on the state of the catalytic converter, to thereby improve exhaust emission characteristics of the engine.

It is a second object of the invention to provide an air-fuel ratio control system for an internal combustion engine, which is capable of setting a predetermined range of an oxygen storage amount to be utilized within the maximum allowable storage amount to a range appropriate to the effective oxygen storage amount, even when the temperature of the catalytic converter is low, or when the catalytic converter is deteriorated, to thereby enhance the exhaust emission characteristics of the engine and preventing lowering of the purification rate of the catalytic converter.

It is a third object of the invention to provide an air-fuel ratio control system for an internal combustion engine, which is capable of estimating the air-fuel ratio of exhaust gases flowing into the catalytic converter, with high accuracy.

It is a fourth object of the invention to provide an exhaust system temperature-estimating device which exhibits accuracy of estimation of the exhaust system temperature by setting the temperature in a steady condition in dependence on a traveling wind.

To attain the first object, according to a first aspect of the invention, there is provided an air-fuel ratio control system for an internal combustion engine having an exhaust passage, and a catalytic converter arranged in the exhaust passage, comprising:

maximum oxygen storage amount-calculating means for calculating a maximum oxygen storage amount indicative of the maximum amount of oxygen that can be stored in the catalytic converter;

forcible oscillating means for forcibly oscillating an air-fuel ratio of a mixture supplied to the engine at a predetermined frequency and a predetermined amplitude;

oscillation-changing means for changing at least one of the predetermined frequency and the predetermined amplitude at a predetermined rate of change; and change rate-setting means for setting a predetermined rate of change of the at least one of the predetermined frequency and the predetermined amplitude, in dependence on the maximum oxygen storage amount.

Preferably, the maximum oxygen storage amount-calculating means calculates the maximum oxygen storage amount based on at least one of temperature of a catalyst of the catalytic converter and a degree of deterioration of the catalytic converter.

To attain the first object, according to a second aspect of the invention, there is provided an air-fuel ratio control system for an internal combustion engine having an exhaust passage, and a catalytic converter arranged in the exhaust passage, comprising:

exhaust gas amount-calculating means for calculating an exhaust gas amount indicative of an amount of exhaust gases supplied to the catalytic converter;

forcible oscillating means for forcibly oscillating an air-fuel ratio of a mixture supplied to the engine at a predetermined frequency and a predetermined amplitude;

oscillation-changing means for changing at least one of the predetermined frequency and the predetermined amplitude at a predetermined rate of change; and change rate-setting means for setting a predetermined rate of change of the at least one of the predetermined frequency and the predetermined amplitude in dependence on the exhaust gas amount.

Preferably, the exhaust gas amount-calculating means determines the exhaust gas amount, based on a load on the engine and rotational speed of the engine.

Also according to a third aspect of the invention, there is provided an air-fuel ratio control system for an internal combustion engine having an exhaust passage, a catalytic converter arranged in the exhaust passage, and an oxygen sensor arranged in the exhaust passage at a location upstream of the catalytic converter, comprising:

maximum oxygen storage amount-calculating means for calculating a maximum oxygen storage amount indicative of the maximum amount of oxygen that can be stored in the catalytic converter;

air-fuel ratio feedback control means for calculating an air-fuel ratio feedback control amount, based on an output from the oxygen sensor and a feedback control constant;

control amount-changing means for changing the air-fuel ratio feedback control constant at a predetermined rate of change; and change rate-setting means for setting predetermined rate of change of the feedback control constant, based on the maximum oxygen storage amount.

Preferably, the maximum oxygen storage amount-calculating means calculates the maximum oxygen storage amount, based on at least one of temperature of a catalyst of the catalytic converter and a degree of deterioration of the catalytic converter.

Preferably, the air-fuel ratio feedback control constant comprises a proportional term and a delay time period for delaying operation of the proportional term after the output from the oxygen sensor is inverted.

Also according to a fourth aspect of the invention, there is provided an air-fuel ratio control system for an internal combustion engine having an exhaust passage, a catalytic converter arranged in the exhaust passage, and an oxygen sensor arranged in the exhaust passage at a location upstream of the catalytic converter, comprising:

exhaust gas amount-calculating means for calculating an exhaust gas amount indicative of an amount of exhaust gases supplied to the catalytic converter;

air-fuel ratio feedback control means for calculating an air-fuel ratio feedback control amount, based on an output from the oxygen sensor and a feedback control constant;

control amount-changing means for changing the air-fuel ratio feedback control constant at a predetermined rate of change; and change rate-setting means for setting a predetermined rate of change of the feedback control constant, based on the exhaust gas amount.

Preferably, the exhaust gas amount-calculating means determines the amount of exhaust gases, based on load on the engine and rotational speed of the engine.

Preferably, the air-fuel ratio feedback control constant comprises a proportional term and a delay time period for delaying operation of the proportional term after the output from the oxygen sensor is inverted.

Also according to a fifth aspect of the invention, there is provided an air-fuel ratio control system for an internal combustion engine having an exhaust passage, and a catalytic converter arranged in the exhaust passage, comprising:

maximum oxygen storage amount-calculating means for calculating a maximum oxygen storage amount indicative of the maximum amount of oxygen that can be stored in the catalytic converter;

exhaust gas amount-calculating means for calculating an exhaust gas amount indicative of an amount of exhaust gases supplied to the catalytic converter;

forcible oscillating means for forcibly oscillating an air-fuel ratio of a mixture supplied to the engine at a predetermined frequency and a predetermined amplitude; and setting means for setting the predetermined frequency and the predetermined amplitude, in dependence on the maximum oxygen storage amount and the exhaust gas amount.

According to a sixth aspect of the invention, there is provided an air-fuel ratio control system for an internal combustion engine having an exhaust passage, a catalytic converter arranged in the exhaust passage, and an oxygen sensor arranged in the exhaust passage at a location upstream of the catalytic converter, comprising:

control amount-calculating means for calculating an air-fuel ratio feedback control amount, based on a predetermined proportional term when a predetermined delay time period elapses after the output from the oxygen sensor is inverted.

maximum oxygen storage amount-calculating means for calculating a maximum oxygen storage amount indicative of the maximum amount of oxygen that can be stored in the catalytic converter;

exhaust gas amount-calculating means for calculating an exhaust gas amount indicative of an amount of exhaust gases supplied to the catalytic converter; and setting means for setting the predetermined proportional term and the predetermined delay time period, in dependence on the maximum oxygen storage amount and the exhaust gas amount.

To attain the second object, according to a seventh object, there is provided an air-fuel ratio control system for an internal combustion engine having an exhaust passage, and a catalytic converter arranged in the exhaust passage, comprising:

oxygen amount-calculating means for calculating an amount of oxygen stored in the catalytic converter;

maximum oxygen storage amount-calculating means for calculating a maximum oxygen storage amount indicative of the maximum amount of oxygen that can be stored in the catalytic converter;

air-fuel ratio control means for controlling an air-fuel ratio of a mixture supplied to the engine such that the amount of oxygen stored in the catalytic converter falls within a predetermined range within the maximum oxygen storage amount; and changing means for changing the predetermined range in dependence on operating conditions of the engine.

Preferably, the operating conditions of the engine includes temperature of the catalytic converter, and the predetermined range is set to a smaller range as the temperature of the catalytic converter is lower.

Preferably, the operating conditions of the engine includes deterioration of the catalytic converter, and the predetermined range is set to a smaller range when the catalytic converter is in a deteriorated state.

Preferably, the operating conditions of the engine include coolant temperature of the engine, and the predetermined range is set to a smaller range as the engine coolant temperature is lower.

To attain the third object, there is provided an air-fuel ratio control system for an internal combustion engine having a cylinder block, an exhaust passage extending from the cylinder block, and a catalytic converter arranged in the exhaust passage, comprising:

an oxygen sensor arranged in the exhaust passage at a location upstream of the catalytic converter;

control amount-calculating means for calculating an air-fuel ratio feedback control amount, based on an output from the oxygen sensor;

air-fuel ratio control means for controlling an air-fuel ratio of a mixture supplied to the engine based on the air-fuel ratio feedback control amount;

first air-fuel ratio-estimating means for estimating an air-fuel ratio of exhaust gases in the exhaust passage at a location immediately downstream of the cylinder block from an amount of variation of the air-fuel ratio feedback control amount relative to an average value of the air-fuel ratio feedback control amount; and second air-fuel ratio-estimating means for estimating an air-fuel ratio of exhaust gases in the exhaust passage at a location immediately upstream of the catalytic converter from an averaged air-fuel ratio obtained by averaging the air-fuel ratio of the exhaust gases at the location immediately downstream of the cylinder block by the use of a predetermined averaging time constant.

Preferably, the predetermined averaging time constant is determined based on operating conditions of the engine.

Preferably, the air-fuel ratio control system includes a second oxygen sensor arranged in the exhaust passage at a location downstream of the catalytic converter, and correcting means for correcting the air-fuel ratio of exhaust gases at the location immediately upstream of the catalytic converter, based on an output from the second oxygen sensor.

Preferably, the air-fuel ratio control means controls the air-fuel ratio of the mixture supplied to the engine, based on the air-fuel ratio of the exhaust gases at the location immediately upstream of the catalytic converter.

To attain the third object, according to an eighth aspect of the invention, there is provided an air-fuel ratio control system for an internal combustion engine having an exhaust passage, and a catalytic converter arranged in the exhaust passage, comprising:

an oxygen sensor arranged in the exhaust passage at a location upstream of the catalytic converter;

control amount-calculating means for calculating an air-fuel ratio feedback control amount, based on an output from the oxygen sensor;

air-fuel ratio control means for controlling an air-fuel ratio of a mixture supplied to the engine, based on the air-fuel ratio feedback control amount;

first averaging means for averaging the air-fuel ratio feedback control amount by a first averaging time constant;

second averaging means for averaging the air-fuel ratio feedback control amount by a second averaging time constant; and air-fuel ratio-calculating means for calculating an air-fuel ratio of exhaust gases at a location immediately upstream of the catalytic converter, based on an output from the first averaging means and an output from the second averaging means.

Preferably, the air-fuel ratio control system includes average value-calculating means for calculating an average value of the air-fuel ratio feedback control amount by the use of the first averaging time constant, and the second averaging time constant is determined based on operating conditions of the engine, to an averaging degree smaller than an averaging degree of the first averaging time constant.

Preferably, the air-fuel ratio control system includes a second oxygen sensor arranged in the exhaust passage at a location downstream of the catalytic converter, and correcting means for correcting the air-fuel ratio of exhaust gases at the location immediately upstream of the catalytic converter, based on an output from the second oxygen sensor.

Preferably, the air-fuel ratio control means includes control amount-changing means for changing a control amount of the air-fuel ratio of the mixture supplied to the engine, based on the air-fuel ratio of the exhaust gases at the location immediately upstream of the catalytic converter.

More preferably, the air-fuel ratio control means includes estimating means for estimating an amount of oxygen stored in the catalytic converter, based on the estimated air fuel ratio of exhaust gases at the location immediately upstream of the catalytic converter, and control amount-calculating means for calculating the control amount, based on the estimated amount of oxygen stored in the catalytic converter.

To attain the fourth object, according to a ninth aspect of the invention, there is provided an exhaust system temperature-estimating device for an internal combustion engine having an exhaust passage, including steady condition temperature-calculating means for calculating a steady condition temperature of the exhaust passage in a steady condition of the engine, based on operating conditions of the engine at least including load on the engine, follow-up speed-calculating means for calculating a follow-up speed of the temperature of the exhaust system relative to the steady condition temperature, and exhaust system temperature-estimating means for estimating temperature of the exhaust system, based on the steady condition temperature and the follow-up speed.

The exhaust system temperature-estimating means is characterized by comprising:

intake air temperature-detecting means for detecting intake air temperature of the engine;

vehicle speed-detecting means for detecting speed of a vehicle on which the engine is installed; and correcting means for correcting the steady condition temperature and/or the follow-up speed, based on the intake air temperature and the vehicle speed.

Preferably, the exhaust system temperature-estimating device includes correcting means for correcting the steady condition temperature by an air-fuel ratio of a mixture supplied to the engine.

The above and other objects, features, and advantages of the invention will be more apparent from the following detailed description taken in conjunction with the accompanying drawings.

BRIEF DESCRIPTION OF THE DRAWINGS

FIG. 24A shows a graph showing the relationship between the catalyst temperature TCAT and an mount of change $\Delta$Kp in the amplitude Kpert;

FIG. 24B shows a graph showing the relationship between the space velocity SV and the amount of change $\Delta$Kp in the amplitude Kpert;

FIG. 24C shows a graph showing the relationship between the catalyst temperature TCAT and amounts of changes $\Delta$fPR, $\Delta$fPL in the frequencies fpertR, fpertL;

FIG. 24D shows a graph showing the relationship between the space velocity SV and amounts of changes $\Delta$fPR, $\Delta$fPL in the frequencies fpertR, fpertL;

FIG. 26A is a graph showing the relationship between the catalyst temperature TCAT and an mount of change $\Delta$Kp in the amplitude Kpert;

FIG. 26B is a graph showing the relationship between the space velocity SV and the amount of change $\Delta$Kp in the amplitude Kpert;

FIG. 26C is a graph showing the relationship between the catalyst temperature TCAT and amounts of changes $\Delta$tPR, $\Delta$tPL in the repetition periods fpertR, $\Delta$tpertR;

FIG. 26D is a graph showing the relationship between the space velocity SV and amounts of changes $\Delta$tPR, $\Delta$tPL in the repetition periods tpertR, tpertL;

DETAILED DESCRIPTION

The invention will now be described in detail with reference to the drawings showing an embodiment thereof.

Figure 1:
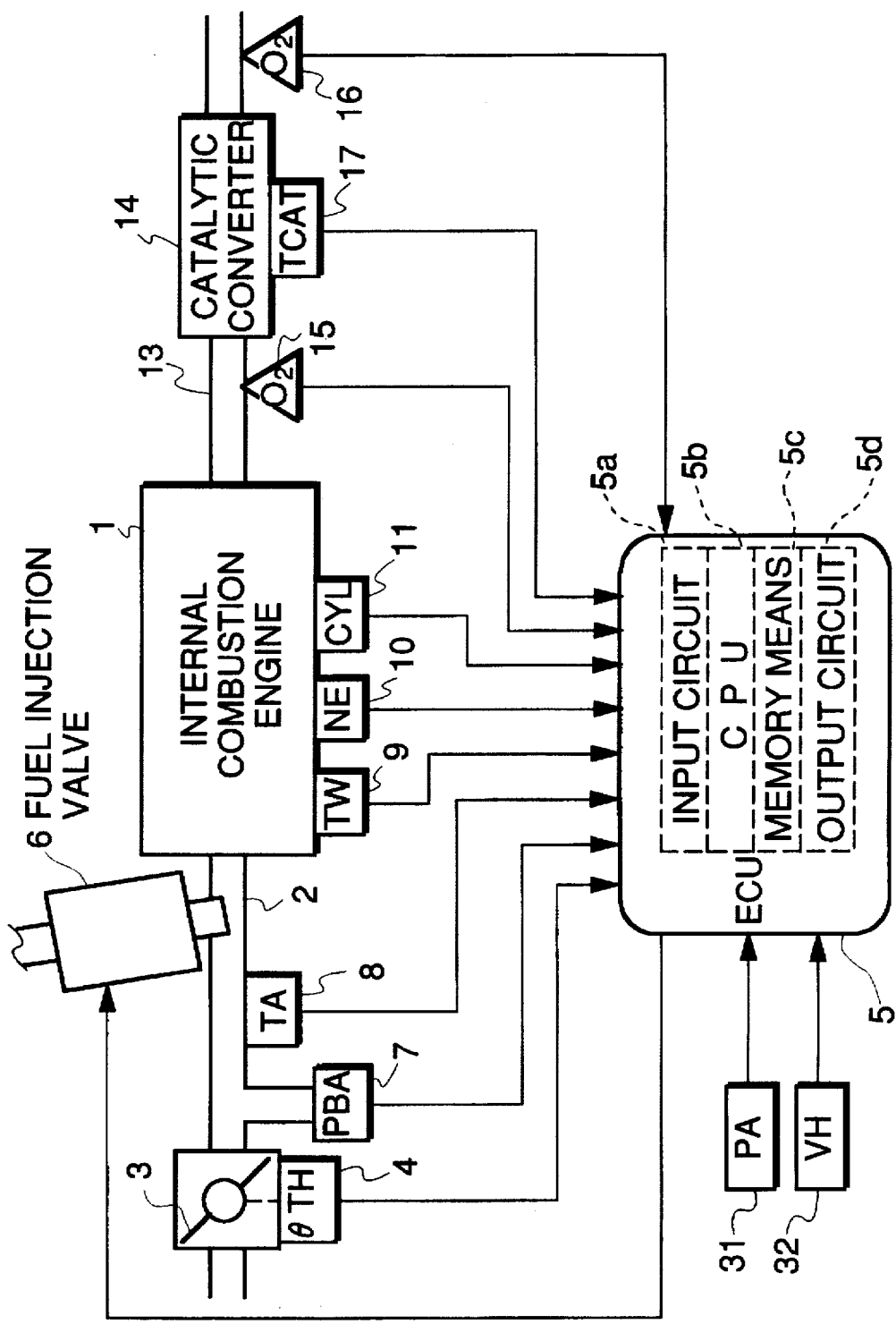
FIG. 1 is a schematic diagram showing the whole arrangement of an internal combustion engine and an air-fuel ratio control system therefor, according to a first embodiment of the invention.

Referring first to FIG. 1, there is illustrated the whole arrangement of an internal combustion engine and a air-fuel ratio control system therefor, according to an embodiment of the invention.

In the figure, reference numeral 1 designates an internal combustion engine (hereinafter referred to as "the engine") having four cylinders. In an intake pipe 2 of the engine 1, there is arranged a throttle valve 3, to which is connected a throttle valve opening (θTH) sensor 4 for generating an electric signal indicative of the sensed throttle valve opening and supplying the same to an electronic control unit (hereinafter referred to as "the ECU") 5.

Fuel injection valves 6 are provided, respectively, for cylinders of the engine and each arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 7 is provided at a location immediately downstream of the throttle valve 3 for supplying an electric signal indicative of the sensed intake pipe absolute pressure to the ECU 5. An intake air temperature (TA) sensor 8 is inserted into the intake pipe 2 at a location downstream of the PBA sensor 8 for supplying an electric signal indicative of the sensed intake air temperature TA to the ECU 5.

An engine coolant temperature (TW) sensor 9, which may be formed of a thermistor or the like, is mounted in the cylinder block of the engine 1 for supplying an electric signal indicative of the sensed engine coolant temperature TW to the ECU 5. An engine rotational speed (NE) sensor 10 and a cylinder-discriminating (CYL) sensor 11 are arranged in facing relation to a camshaft or a crankshaft of the engine 1, neither of which is shown. The NE sensor 10 generates signal pulses (hereinafter referred to as "TDC signal pulses") at predetermined crank angles whenever the crankshaft rotates through 180 degrees, and the CYL sensor 11 generates a signal pulse (hereinafter referred to as "CYL signal pulses") at a predetermined crank angle of a particular cylinder of the engine 1. These signal pulses are supplied to the ECU 5.

A three-way catalyst (catalytic converter) 14 is arranged in an exhaust pipe 13 extending from the cylinder block of the engine 1 for purifying components of HC, CO, NOx, etc. present in the exhaust gases. Arranged in the exhaust pipe 13 at respective locations upstream and downstream of the three-way catalyst 14 are oxygen concentration sensors (hereinafter referred to as "the upstream O2 sensor" and "the downstream O2 sensor", respectively) 15 and 16 as air-fuel ratio sensors, for detecting the concentration of oxygen present in the exhaust gases at the respective locations, and supplying signals indicative of the sensed oxygen concentration to the ECU 5. Further, a catalyst temperature sensor 17 is mounted in the catalytic converter 14, for detecting temperature TCAT of the catalytic converter 14, and supplying a signal indicative of the sensed temperature to the ECU 5.

Further electrically connected to the ECU 5 are atmospheric pressure sensor 31 for detecting atmospheric pressure PA and a vehicle speed sensor 32 for detecting vehicle speed VH of a vehicle with the engine 1 installed therein, signals therefrom being supplied to the ECU 5.

The ECU 5 is comprised of an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6.

The CPU 5b operates in response to the above-mentioned various engine parameter signals from the various sensors to determine operating conditions in which the engine 1 is operating, such as feedback control regions where the air-fuel ratio is controlled in response to the detected oxygen concentration in the exhaust gases, and open-loop control regions, and calculates, based upon the determined engine operating conditions, a fuel injection period Tout over which the fuel injection valve 6 is to be opened, in synchronism with generation of TDC signal pulses.

The CPU 5b generates signals for driving the fuel injection valves 6 via the output circuit 5d, and determines whether or not the catalytic converter 14 is deteriorated.

[Outline of air-fuel ratio control according to the first embodiment]

Figure 2:
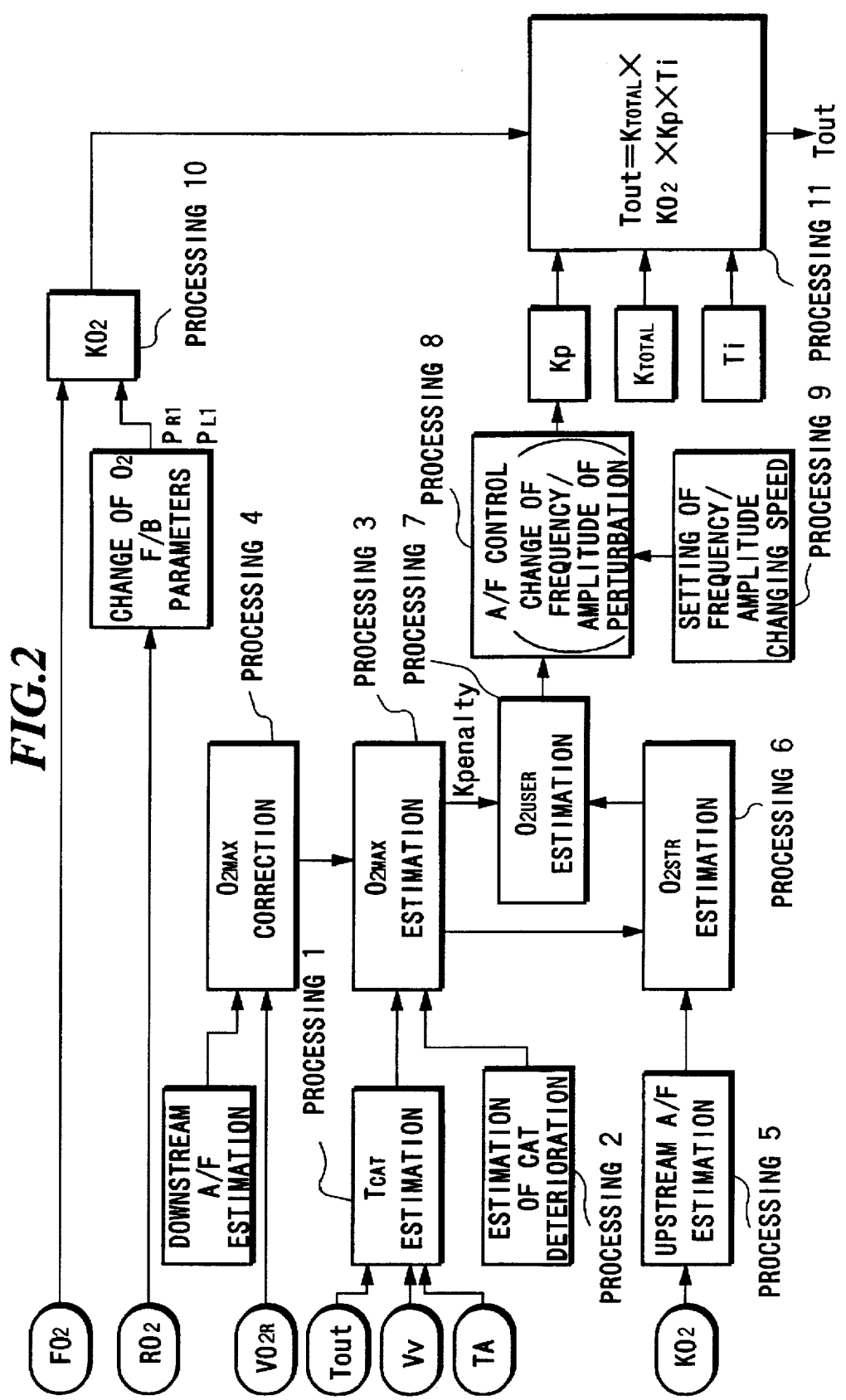
FIG. 2 is a schematic diagram showing the outline of the overall processing of the air-fuel ratio control according to the first embodiment.

FIG. 2 shows the outline of air fuel ratio amount control by the air-fuel ratio control system according to a first embodiment of the invention. The air-fuel ratio control system carries out the following processings: estimating catalyst temperature TCAT (processing 1), estimating deterioration of the catalytic converter 14 (processing 2), estimating the maximum allowable O2 storage amount O2MAX in the catalytic converter 14 (processing 3), correcting the maximum allowable O2 storage amount O2MAX (processing 4), estimating an air-fuel ratio A/F of exhaust gases at a location upstream of the catalytic converter 14 (processing 5), estimating an O2 storage amount O2STR stored in the catalytic converter 14 (processing 6), calculating an O2 utilization factor O2USER of the catalytic converter 14 (processing 7), controlling the air-fuel ratio A/F of a mixture supplied to the engine 1 by forcedly oscillating (perturbation) the A/F value (processing 8), setting a rate of change in frequency and amplitude of perturbation (processing 9), calculating an air-fuel ratio correction coefficient KO2 (processing 10), and calculating a fuel injection amount TOUT (processing 11). Particularly, the air-fuel ratio control system according to the embodiment is characterized in that the air-fuel ratio A/F is forcedly oscillated depending on operating conditions of the engine 1 and the state (temperature, degree of deterioration, and capacity) of the catalytic converter 14 so as to maximize the purification rate of the catalytic converter 14 so that the O2 utilization factor O2USER of the catalytic converter 14 becomes the maximum.

According to the processing 3 for estimating the maximum allowable O2 storage amount (hereinafter referred to as "the maximum O2 storage amount") O2MAX of the catalytic converter 14, the maximum O2 storage amount O2MAX of the catalytic converter 14 is calculated based on the catalyst temperature TCAT, the deterioration degree of the catalyst, and the capacity (volumetric size) of same. The catalyst temperature TCAT may be directly detected by the catalyst temperature sensor 17, or may be calculated by estimating the catalyst temperature TCAT in a manner described hereinafter. The deterioration degree of the catalyst may be calculated by estimating the deterioration degree of the catalyst in a manner described hereinafter. The capacity of the catalyst, which has a fixed value determined by the volumetric size of the catalyst, may be stored into the memory means 5c of the ECU 5 beforehand. The calculated maximum O2 storage amount O2MAX is not only used as a limit for the O2 storage amount O2STR in calculating the latter, but also used in decreasing the O2 utilization factor O2USER since the catalytic converter 14 cannot purify exhaust gases, if the O2STR value exceeds the maximum O2 storage amount O2MAX.

According to the processing 5 for estimating the air-fuel ratio A/F, the A/F value may be directly detected by a linear output air-fuel ratio sensor (LAF sensor). In the present embodiment, however, the LAF sensor is not employed, but an output from the O2 sensor 15 is used to calculate a correction coefficient KO2, based thereon, whereby the air-fuel ratio A/F is calculated based on a deviation amount of the correction coefficient KO2 from a central value thereof. Further, the correction coefficient KO2 is corrected based on an output from the downstream O2 sensor 16 to eliminate the deviation amount of the correction coefficient KO2 from the central value.

According to the processing 6 for estimating the O2 storage amount O2STR of the catalytic converter 14, when the air-fuel ratio A/F is on a lean side with respect to a stoichiometric air-fuel ratio, the catalytic converter 14 acts to adsorb oxygen molecules O2, while it desorbs oxygen molecules when the A/F value is on a rich side with respect to the stoichiometric air fuel ratio. By utilizing this fact, a degree of adsorption and desorption of oxygen molecules O2 to and from the catalytic converter 14 is calculated from the A/F value and the amount of exhaust gases to calculate the O2 storage amount O2STR based on the calculated degree of adsorption and desorption. The O2 storage amount O2STR thus calculated is limited to the maximum O2 storage amount O2MAX which is determined mainly by the capacity of the catalytic converter 14. Further, when the O2 storage amount O2STR assumes a negative value, it is limited to "0".

According to the processing 7 for calculating the O2 utilization factor O2USER, a physical amount corresponding to the purification rate is calculated as the O2 utilization factor O2USER. The larger the O2 utilization factor O2USER, the higher the purification rate of the catalytic converter 14. However, when the O2 storage amount O2STR exceeds the maximum O2 storage amount O2MAX or falls below "0", exhaust gases are not effectively purified by the catalytic converter 14, and therefore the O2 utilization factor O2USER is decreased when it exceeds the maximum O2 storage amount O2MAX or falls below "0".

According to the A/F perturbation processing 8, the A/F value of a mixture supplied to the engine is forcedly oscillated to change the O2 storage amount O2STR of oxygen stored in the catalytic converter 14 within a range defined by an lower limit value O2STRL which is close to a value of "0" and an upper limit value O2STRH which is close to the maximum O2 storage amount O2MAX, by an amplitude as large as possible, and at the same time the repetition period of the oscillation is set to a short value, thereby controlling the air fuel ratio such that the oxygen storage capacity of the catalyst is utilized to the maximum extent, to thereby enhance the purification rate of the catalytic converter 14.

According to processing for setting the rate of change in frequency and amplitude of perturbation (processing 9), the rates of changes in frequency and amplitude of perturbation are changed depending on operating conditions (space velocity SV) of the engine 1 and the maximum oxygen storage amount (e.g. dependent on the catalyst temperature) of the catalytic converter 14.

Next, the processings 1 to 11 will be described in detail hereinbelow.

[Processing 1 for estimating the catalyst temperature TCAT]

Figure 3:
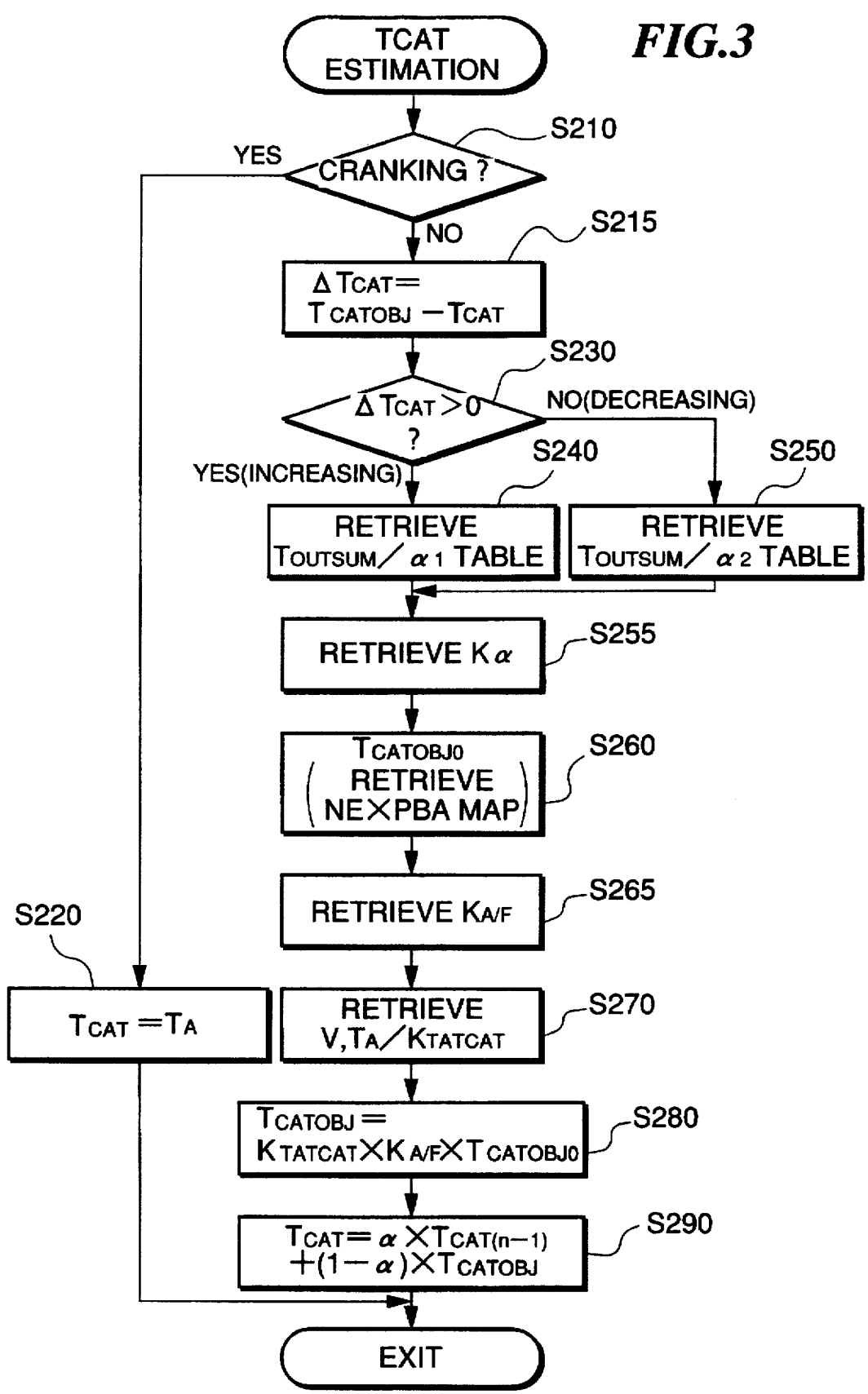
FIG. 3 is a flowchart showing a routine for estimating catalyst temperature TCAT.
Figure 4:
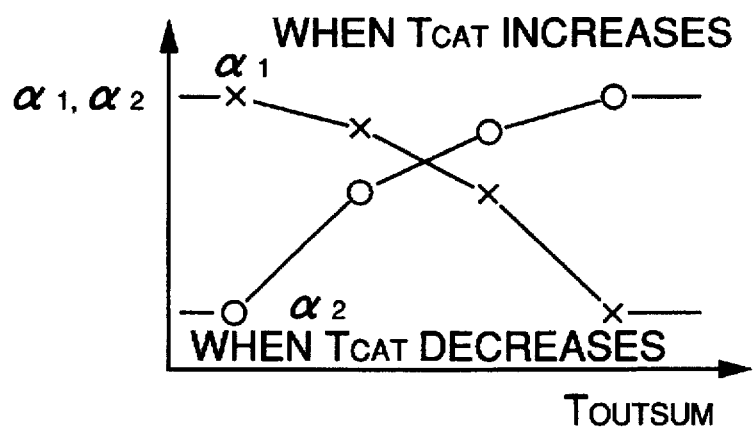
FIG. 4 is a graph showing the relationship between a cumulative value TOUTSUM of fuel injection periods TOUT and a coefficient $\alpha 1$ for lowering the catalyst temperature and a coefficient $\alpha 2$ for elevating the catalyst temperature.

FIG. 3 shows a routine for estimating the catalyst temperature TCAT. At a step S210, it is determined whether or not the engine is in a starting mode. If the engine is in the starting mode, the catalyst temperature TCAT is set to the intake air temperature TA detected by the TA sensor 8, as an initial value of the catalyst temperature TCAT at a step S220, followed by terminating the present routine. If the engine is not in the starting mode, the program proceeds to a step S215, wherein a difference ΔTCAT between the catalyst temperature TCAT and a desired estimated catalyst temperature TCATOBJ is calculated, and then it is determined at a step S230 whether or not the difference ΔTCAT between the catalyst temperature TCAT and the desired estimated catalyst temperature TCATOBJ is larger than "0" FIG. 4 shows the relationship between coefficients α1, α2 and a cumulative value TOUTSUM. After the start of the engine normally the catalyst temperature TCAT rises, and hence when the difference ΔTCAT value is positive, i.e. when the catalyst temperature TCAT is smaller than the desired estimated catalyst temperature TCATOBJ, a TOUTSUM/α1 table is retrieved to determine a coefficient α1 for raising the catalyst temperature TCAT based on the cumulative value TOUTSUM, shown in FIG. 4, at a step S240. On the other hand, when the Δ TCAT value is negative, i.e. when the catalyst temperature TCAT is larger than the desired estimated catalyst temperature TCATOBJ, a TOUTSUM/α2 table is retrieved to determine a coefficient α2 for lowering the catalyst temperature TCAT based on the cumulative value TOUTSUM at a step S250. The TOUTSUM value represents a cumulative value of the fuel injection period TOUT obtained over a predetermined unit time period. The larger the TOUT value, the larger the combustion energy, resulting in an elevated catalyst temperature TCAT. The coefficients α1 and α2 designate time constants of delay exhibited in the catalyst temperature TCAT reaching the desired catalyst temperature TCATOBJ, in other words, they represent follow-up speed of the catalyst temperature in reaching the desired value thereof, and the coefficient α1 is decreased as the cumulative value TOUTSUM is larger, whereas the coefficient α2 is increased as the cumulative value TOUTSUM is larger.

Then, at a step S255, a correction coefficient $K\alpha$ for correcting the coefficients α1, α2 is determined based on the vehicle speed V and the intake air temperature TA.

Figure 6:
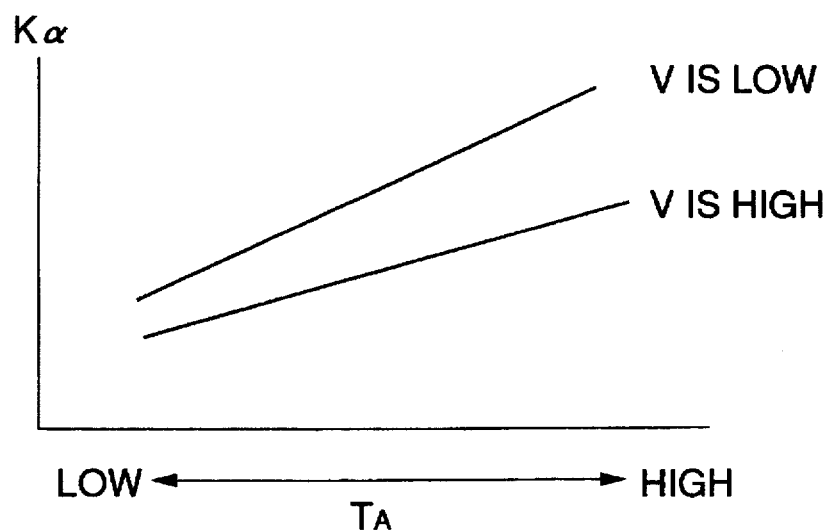
FIG. 6 is a graph showing the relationship between a correction coefficient K $\alpha$ and intake air temperature TA and vehicle speed V.

FIG. 6 shows the relationship between the vehicle speed V and the intake temperature TA, and the correction coefficient $K\alpha$. A $K\alpha$ table is set based on this relationship, and hence according to the $K\alpha$ table, the correction coefficient $K\alpha$ is set to a larger value as the intake air temperature TA is higher, and at the same time to a smaller value as the vehicle velocity is smaller. When the correction coefficient $K\alpha$ is retrieved from the $K\alpha$ table at a step S255, the coefficient α is determined by the following equation (1a) or (1b):

$$\alpha = \alpha 1 \times K\alpha \quad (1a)$$

$$\alpha = \alpha 2 \times K\alpha \quad (1b)$$

Figure 5:
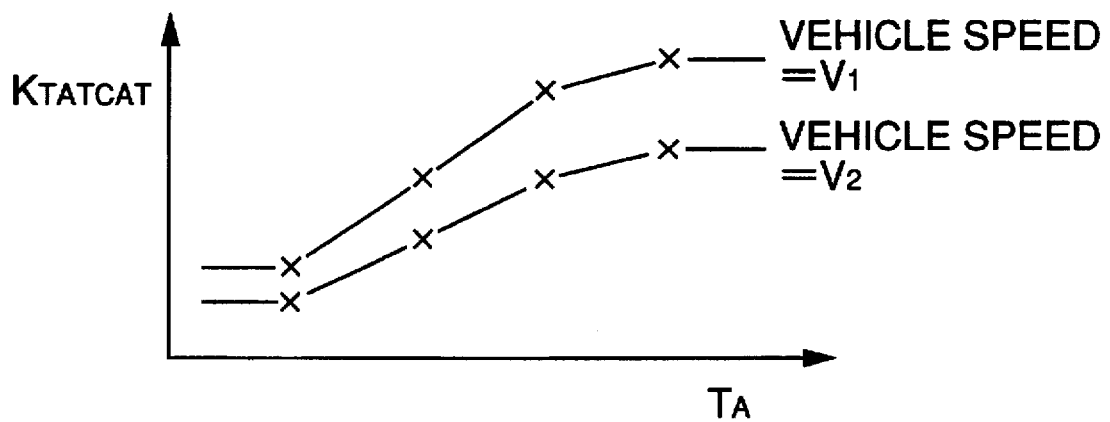
FIG. 5 is a graph showing the relationship between a correction coefficient KTATCAT and intake air temperature TA and vehicle speed V.
Figure 7:
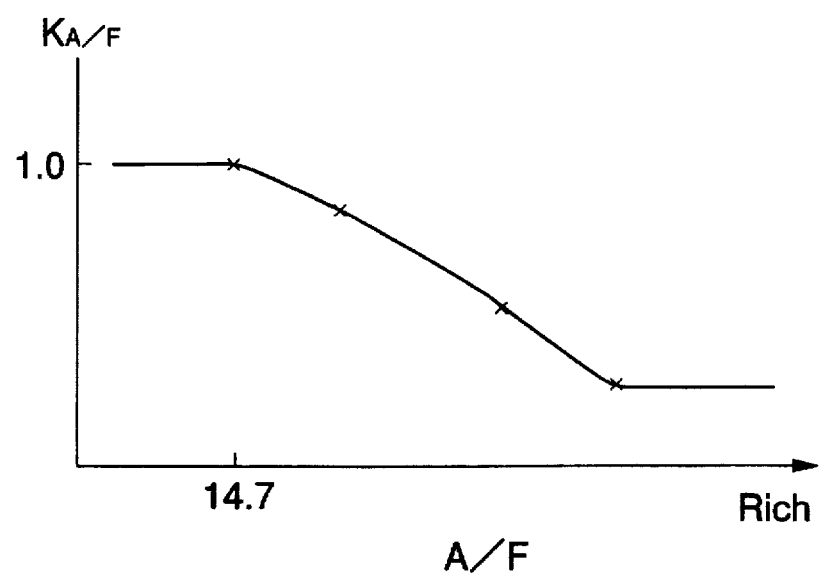
FIG. 7 is a graph showing the relationship between a correction coefficient KA/F and the air-fuel ratio.

Then, at a step S260, a basic value TCATOBJ0 of the desired estimated catalyst temperature TCATOBJ is determined by retrieving a map, not shown, according to the intake pipe absolute pressure PBA and the engine rotational speed NE. Then, at a step S265, an air-fuel ratio-dependent correction coefficient KA/F is determined by retrieving a KA/F table according to the air-fuel ratio A/F. The correction coefficient KA/F is a coefficient for compensating for the cooling effect of fuel, since the richer the mixture, i.e. the smaller the air-fuel ratio, the catalyst is more likely to be cooled by the mixture. The coefficient KA/F is determined according to the air-fuel ratio of the mixture. FIG. 7 shows the relationship between the air-fuel ratio A/F and the correction coefficient KA/F, based on which the KA/F table is set. According to the KA/F table, the correction coefficient KA/F is set to a smaller value, as the air-fuel ratio A/F is richer. Then, at a step S270, a KTATCAT table is retrieved to determine a correction coefficient KTATCAT for the basic value TATOBJ0, according to the intake air temperature TA and the vehicle velocity V. FIG. 5 shows the relationship between the intake temperature TA and the correction coefficient KTATCAT, based on which the KTATCAT table is set. According to the TA/KTATCAT table, in view of the fact that when the intake air temperature TA is low, the catalytic converter 14 is cooled by fresh air, the correction coefficient KTATCAT is set to a lower value as the intake air temperature TA is lower. In addition, as the vehicle speed V increases, the amount of heat released or dissipated from the catalytic converter 14 increases due to an increase in the volume of fresh air to which the vehicle, and hence the catalytic converter is exposed, and hence the cooling degree of the catalytic converter 14 by fresh air varies with the vehicle speed VH. Therefore, the correction coefficient KTATCAT is also changed according to the vehicle speed V.

Then, the basic value TCATOBJ0 calculated is multiplied by the retrieved correction coefficients KA/F and KTATCAT, to thereby set the desired estimated catalyst temperature TCATOBJ which has thus been corrected for the intake air temperature TA, the vehicle velocity v, and the air-fuel ratio A/F at a step S280 by the use of the following equation (2).

$$TCATOBJ = KTATCAT \times KA/F \times TCATOBJ0 \quad (2)$$

Then, based on the desired estimated catalyst temperature TCATOBJ thus set, a present value of the catalyst temperature TCAT(n) is calculated by the use of the following equation (3) at a step S290:

$$TCAT(n) = \alpha \times TCAT(n-1) + (1-\alpha) \times TCATOBJ \quad (3)$$

where the α1 value obtained at the step S240 or the α2 value obtained at the step S250 is substituted for α. TCAT(n−1) represents a value obtained in the immediately preceding loop. The calculation of the catalyst temperature TCAT(n) is followed by termination of the present routine.

Thus, by taking into account the cooling effect dependent on the concentration of fuel in the mixture, the outside air temperature, and the vehicle speed, it is possible to accurately estimate the catalyst temperature TCAT.

According to the present embodiment, the follow-up speed (α1, α2) of the catalyst temperature is determined from the cumulative value TOUTSUM of the fuel injection amount, this is not limitative, but the follow-up speed can be directly determined from the intake pipe pressure representative of load on the engine.

[Processing 2 for estimating deterioration of the catalyst]

Then, deterioration of the performance of the catalytic converter 14 is estimated. The method of estimating deterioration of the catalyst is incorporated herein with reference to Japanese Laid-Open Patent Publication (Kokai) No. 6-193516. Therefore, the method is described in a simplified manner in the present specification.

During execution of the air-fuel feedback control in which the correction coefficient KO2 is calculated based only on the output RVO2 from the downstream O2 sensor 16, calculations are made of a time period TL from the time a special P term PLSP for skipping the KO2 value in the decreasing direction is generated to the time the downstream O2 sensor output RVO2 is correspondingly inverted, and a time period TR from the time a special P term PR for skipping the KO2 value in the increasing direction is generated to the time the downstream O2 sensor output RVO2 is correspondingly inverted. The determination of deterioration of the catalyst performance is carried out based on calculating an average value T of the thus calculated time periods TL and TR. This utilizes the fact that as the purification rate of the catalyst decreases, the average value T of the time periods TL, TR decreases. The decrease in the average value T means decrease in the oxygen storage capacity of the catalytic converter. This method makes it possible to determine deterioration of the catalyst with accuracy.

[Processing 3 for estimating the maximum O2 storage amount O2MAX of the catalytic converter]

As described hereinabove, the maximum O2 storage amount O2MAX of the catalytic converter 14 is determined by the capacity (volumetric size) of the catalyst, the catalyst temperature TCAT and the deterioration degree of the catalyst estimated according to the processings 1 and 2, respectively.

Figure 8:
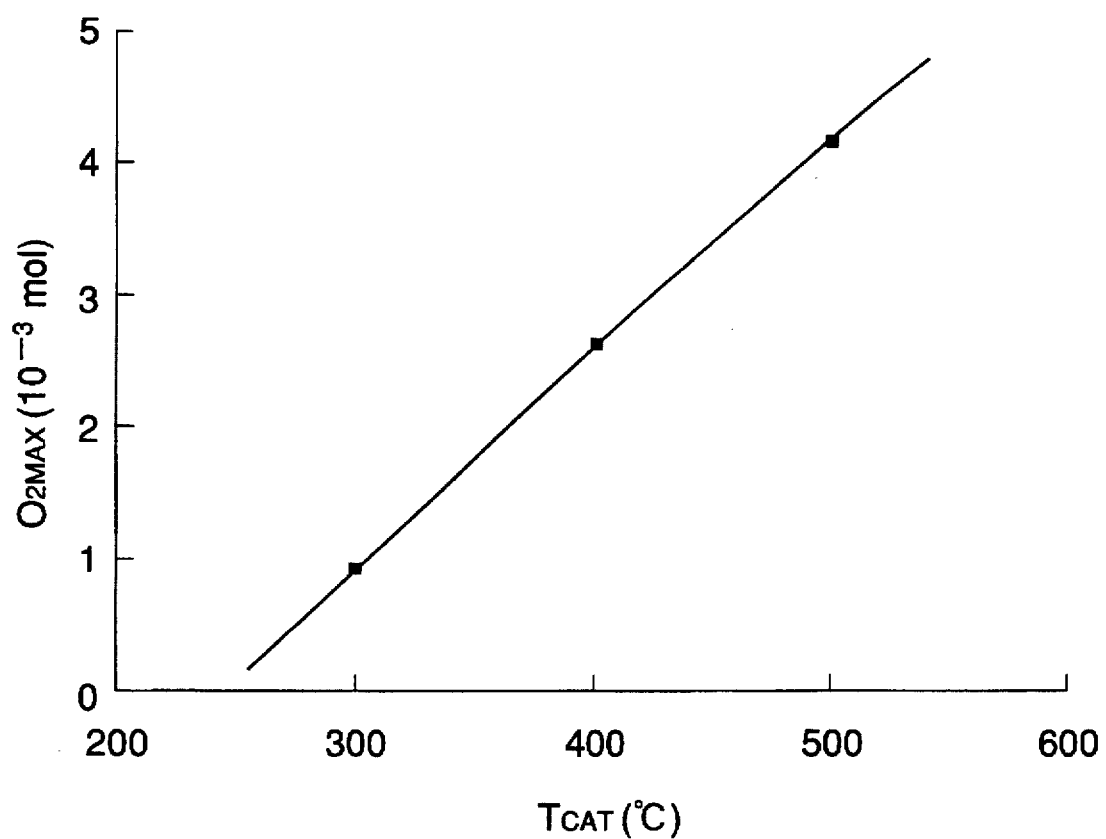
FIG. 8 is a graph showing a change in the maximum allowable O2 storage amount O2MAX relative to the catalyst temperature TCAT.

FIG. 8 shows the relationship between the detected or estimated catalyst temperature TCAT and the maximum O2 storage amount O2MAX. As shown in the figure, the maximum O2 storage amount O2MAX increases as the catalyst temperature TCAT increases in a substantially proportional manner. Therefore, the maximum O2 storage amount O2MAX is calculated by multiplying the maximum O2 storage amount per unit volume according to the catalyst temperature TCAT, by the volumetric size and the deterioration degree of the catalyst. The maximum O2 storage amount O2MAX thus calculated is used in executing the feedback control of the air-fuel ratio A/F, and corrected in a manner described hereinafter. Further, the maximum O2 storage amount O2MAX is inhibited from being fully utilized by setting limits thereto, as described hereinafter.

[Processing 4 for correcting the maximum O2 storage amount O2MAX]

Figure 9:
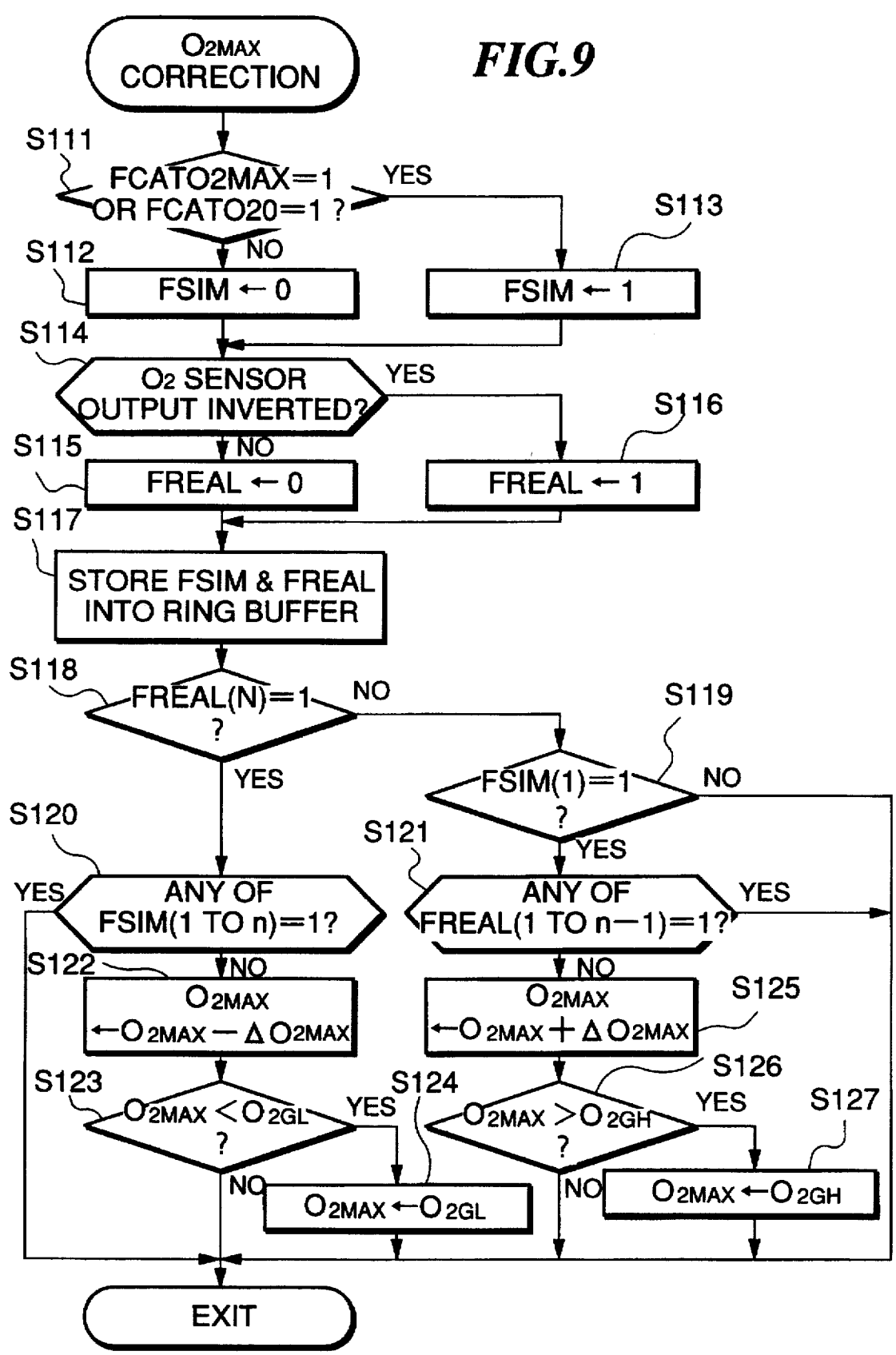
FIG. 9 is a flowchart showing a routine for correcting the maximum allowable O2 storage amount O2MAX.

FIG. 9 shows a program for correcting the maximum O2 storage amount O2MAX. This program is executed at intervals of a predetermined time period (e.g. one second) for correcting a calculated value of the maximum O2 storage amount O2MAX when the inversion timing of the downstream air-fuel ratio A/F estimated from the O2 storage amount O2STR in the catalytic converter 14, referred to hereinafter, deviates from the inversion timing of the output from the downstream O2 sensor 16 and it is hence determined that the calculated value of the maximum O2 storage amount O2MAX is erroneous. A flag FSIM, which is set to "1" upon an inversion of the air-fuel ratio A/F estimated by a ring buffer, and a flag FREAL, which is set to "1" upon an inversion of the output from the downstream O2 sensor 16, are employed for correcting the O2MAX value. If the flag FSIM has not been set to "1" within a predetermined time period before the inversion of the downstream O2 sensor output, i.e. if the estimated inversion of the downstream air-fuel ratio is delayed, it is judged that the calculated O2MAX value is too large, whereby the O2MAX value is decreased by an amount ΔO2MAX. If the inversion of the output from the downstream O2 sensor does not occur within the predetermined time period after setting of the flag FSIM to "1", it is determined that the calculated O2MAX value is too small, whereby the value O2MAX is increased by the amount ΔO2MAX.

First, it is determined at a step S111 whether or not any of a flag FCATO2O and a flag FCATO2MAX has been set to "1" According to an O2 storage amount O2STR calculating routine shown in FIG. 14, described hereinafter, the flag FCATO2O is set to "1" when the O2 storage amount O2STR in the catalytic converter 14 is below a predetermined value O2STRL which is close to 0. The flag FCATO2MAX is set to "1" when the O2 storage amount O2STR of the catalytic converter 14 exceeds a predetermined value O2STRH which is close to the O2MAX value. If neither of the flag FCATO2MAX and FCATO2O has been set to "1", the flag FSIM is reset to "0" at a step S112, whereas if either the flag FCATO2MAX or FCATO2O has been set to "1", the flag FSIM is set to "1" at a step S113.

Then, it is determined at a step S114 whether or not the output from the downstream O2 sensor 16 has been inverted. If the output has not been inverted, the flag FREAL is reset to "0" at a step S115, whereas if the output has been inverted, the flag FREAL is set to "1" at a step S116. These flags FSIM and FREAL are stored into the ring buffer at a step S117. Then, it is determined whether or not an initial value FSIM(1) of the flag FSIM and a present value FREAL(n) of the flag FREAL have both been set to "1", at steps S118 and S119, respectively, and if the flags have both been set to "0", the present routine is terminated without correcting the maximum O2 storage amount O2MAX. If the present value of the flag FREAL has been set to "1" at the step S118 and any of flags FSIM(1 to n) has been set to "1" at a step S120, the present routine is terminated without correcting the O2MAX value. Further, if the initial value of the flag FSIM has been set to "1" at the step S119 and any of flags FREAL(1 to n−1) has been set to "1" at a step S121, the present routine is terminated without correcting the O2MAX value.

Figure 10:
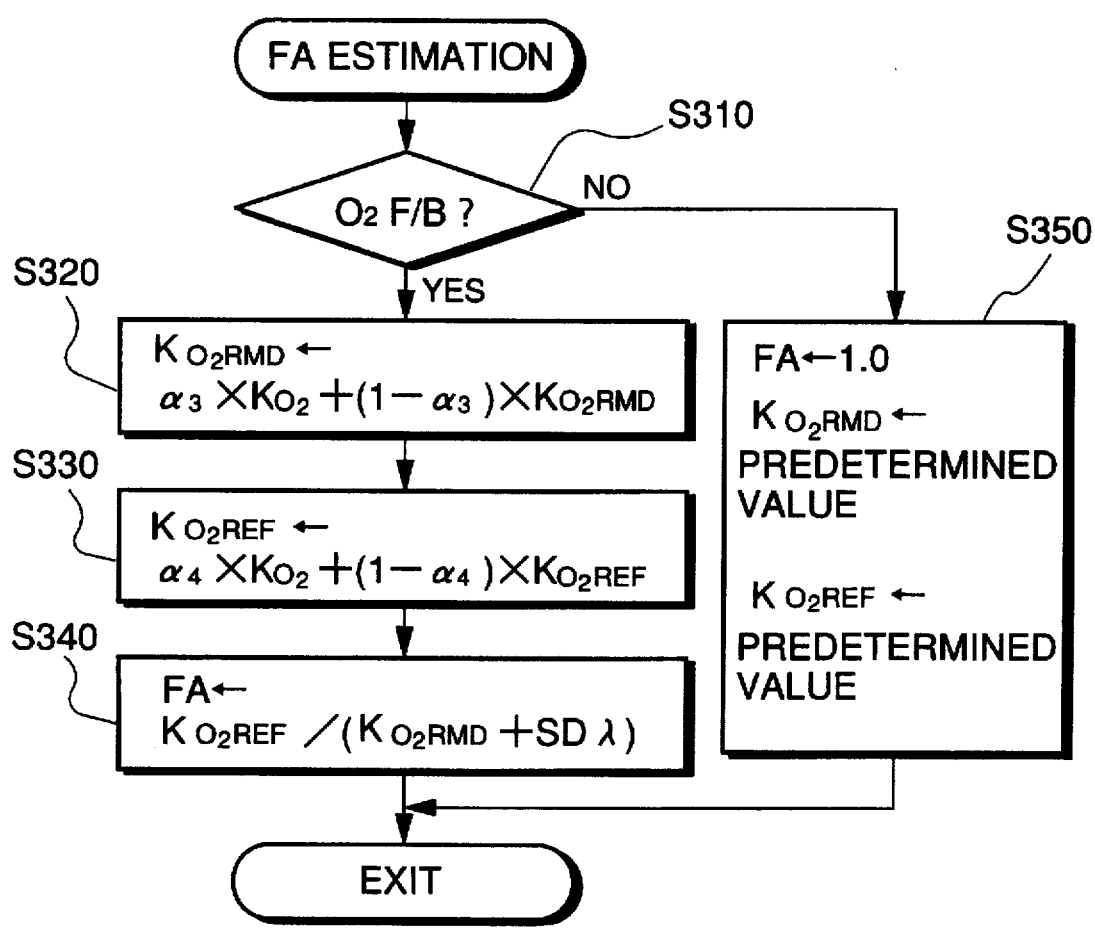
FIG. 10 is a flowchart showing a routine for estimating the air-fuel ratio A/F of exhaust gases.
Figure 15:
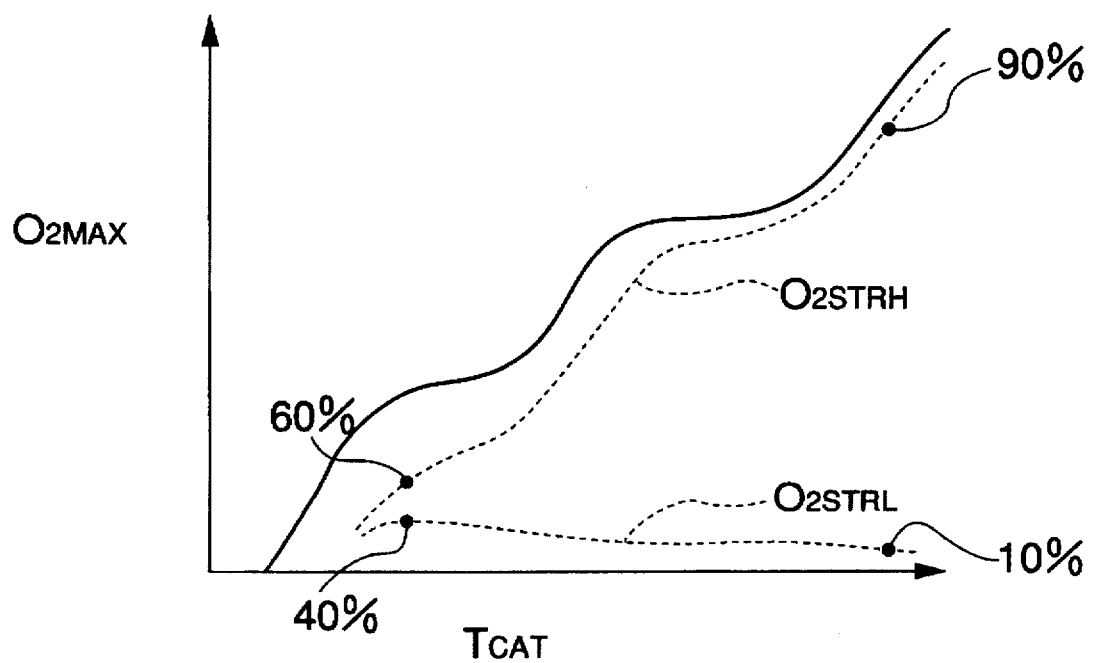
FIG. 15 is a graph showing the relationship between upper and lower limit values O2STRH, O2STRL of the O2 storage amount O2STR and the catalyst temperature TCAT.

On the other hand, if the flags FSIM(1 to n) have all been set to "0", the maximum O2 storage amount O2MAX determined according to the catalyst temperature TCAT in FIG. 10 directly detected by the TCAT sensor 17 or estimated by the processing 3 is decreased by the amount a O2MAX at a step S122. Then, if the maximum O2 storage amount O2MAX is below a lower limit value O2GL at a step S123, the O2MAX value is limited to the lower limit value O2GL at a step S124, followed by terminating the present routine. On the other hand, if all of the flags FREAL(1 to n−1) have been set to "0", the maximum O2 storage amount O2MAX at the same catalyst temperature TCA shown in FIG. 15 is increased by the amount ΔO2MAX at a step S125. On the other hand, if the maximum O2 storage amount value O2MAX exceeds an upper limit value O2GH at a step S126, the maximum O2 storage amount value O2MAX is limited to the upper limit value O2GH at a step S127, followed by terminating the routine.

[Processing 5 for estimating the air-fuel ratio A/F, accurately an inverse number thereof]

FIG. 10 shows a program for estimating the air-fuel ratio A/F of exhaust gases emitted from the engine. In the present routine, the LAF sensor for directly detecting the A/F value is not employed, but the correction coefficient KO2 based on the output from the upstream O2 sensor 15 is employed to estimate the air-fuel ratio A/F at the location upstream of the catalytic converter 14.

First, it is determined at a step S310 whether or not the air-fuel ratio A/F is under feedback control based on an output from the upstream O2 sensor 15. As mentioned hereinbefore, during feedback control of the air-fuel ratio, an average value KO2RMD of the correction coefficient KO2 which is set such that the air-fuel ratio (oxygen concentration) detected by the O2 sensor 15 corresponds to the desired value, is calculated at a step S320. The average value KO2RMD is calculated by weighted averaging by the use of the following equation (4):

$$KO2RMD = \alpha3 \times KO2 + (1-\alpha3) \times KO2RMD \qquad (4)$$

where α3 represents a first averaging coefficient for setting the center of control.

Further, a weighted average value KO2REF of the correction coefficient KO2 indicative of the air-fuel ratio coefficient of exhaust gases immediately upstream of the catalytic converter 14 is calculated at a step S330, by taking into account delay in transfer of exhaust gases from the exhaust valve to the catalytic converter 14 by the use of the following equation (5):

$$KO2REF = \alpha4 \times KO2 + (1-\alpha4) \times KO2REF \qquad (5)$$

where α4 is a second averaging coefficient which takes into account delay in transfer of exhaust gases from the exhaust valve to the catalytic converter 14, and which is set to a larger value than the first averaging coefficient α3. The second averaging coefficient α4 depends on operating conditions of the engine, and is determined by retrieving a map, not shown, according to the engine rotational speed NE and the intake pipe absolute pressure PBA.

Further, a fuel-air ratio F/A is calculated at a step S340 by calculation a ratio of the weighted average value KO2REF to the sum of the weighted average value KO2RMD and a control discrepancy amount SD λ determined based on the output from the downstream O2 sensor 16, followed by terminating the program. The control discrepancy amount SD A is determined in an air-fuel ratio feedback routine based on the output from the downstream O2 sensor, described in detail hereinafter. By correcting the KO2RMD/KO2REF by the control discrepancy amount SDλ, an estimated value of the air-fuel ratio, and hence the fuel-air ratio, is prevented from shifting from a proper value, whereby it is possible to secure the accuracy of estimation of the air-fuel ratio when the engine is in a transient operating condition. Further, if it is determined at a step S310 that the open-loop air-fuel ratio control is being carried out, the fuel-air ratio F/A is set to a value of "1.0", and the weighted average values KO2RMD and KO2REF are set to predetermined respective values at a step S350, followed by terminating the program.

[Processing 6 for estimating the O2 storage amount O2STR of the catalytic converter]

Figure 11:
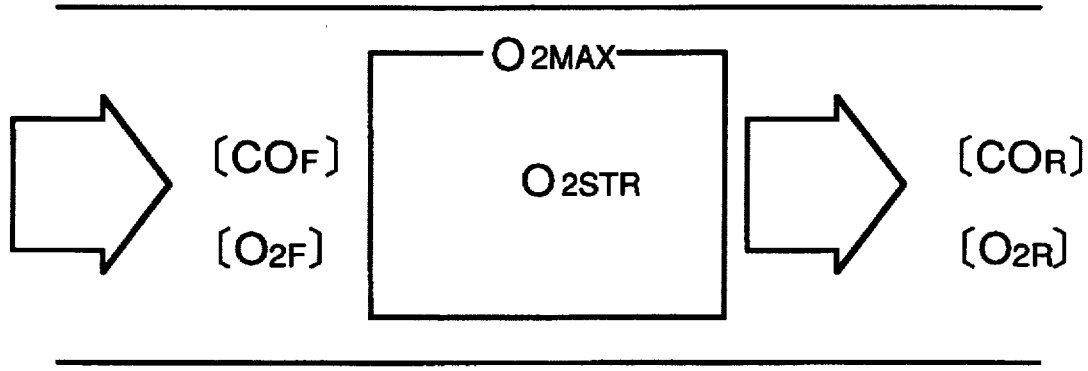
FIG. 11 is a schematic diagram useful in explaining the operation of the catalytic converter.

Next, the O2 storage amount O2STR stored in the catalytic converter 14 is calculated. According to the present embodiment, a physical model of the catalytic converter is constructed, which estimates the O2 storage amount O2STR, based only on CO and O2 components. FIG. 11 schematically shows the catalyst operation of the catalytic converter 14. In the catalytic converter 14, when the input air-fuel ratio A/F is on a rich side with respect to the stoichiometric value, desorption of CO+O→CO2 takes place, whereas when the A/F value is on a lean side, adsorption of O2→2O takes place. Therefore, when the A/F value is on the rich side, the discharging speed of O2 is calculated from the concentration of CO present in exhaust gases at the entrance of the catalytic converter 14, whereas when the A/F value is on the lean side, the adsorption speed of O2 is calculated from the concentration of O2 present in exhaust gases at the entrance of the catalytic converter, by the use of the following equations (6a) and (6b), respectively:

$$-d/dt(O) = K1 \times [COF] \times O2STR \quad (6a)$$

$$d/dt(O) = K2 \times [O2F] \times (O2MAX - O2STR) \quad (6b)$$

where O represents the O2 storage amount, [COF] the CO concentration at the entrance of the catalytic converter (ppm), [COR] the CO concentration at the exit thereof (ppm), [O2F] the O2 concentration at the entrance thereof (ppm), d/dt(O) a variation rate in the O2 storage amount, and K1 and K2 reaction-dependent coefficients, respectively. The reaction-dependent coefficients K1 and K2 are calculated according to the degree of deterioration of the catalyst temperature TCAT by the use of the following equations (7a) and (7b):

$$k1 = k1R \times k1CAT \quad (7a)$$

$$k2 = k2R \times k2CAT \quad (7b)$$

where k1R, k2R represents deterioration-dependent coefficients, and k1CAT, k2CAt temperature-dependent coefficients.

Figure 12A:
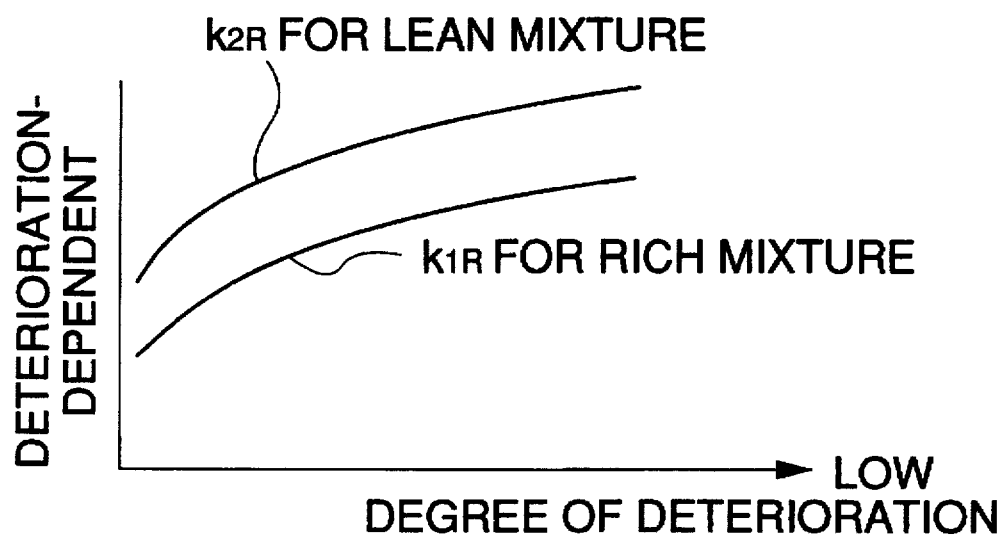
FIG. 12A is a graph showing the relationship between deterioration-dependent coefficients k1R, k2R and degree of deterioration.
Figure 12B:
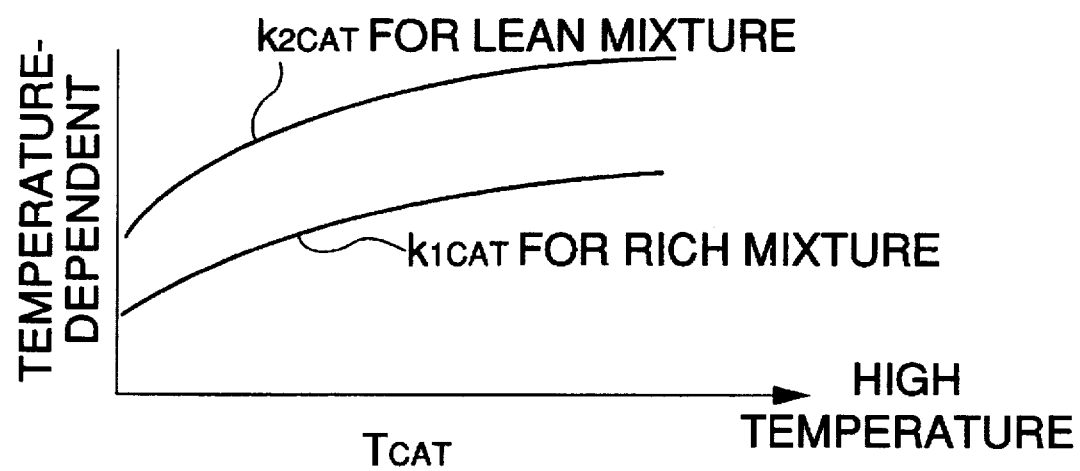
FIG. 12B is a graph showing the relationship between temperature-dependent coefficients k1CAT, k2CAT and the catalyst temperature TCAT.

As shown in the equations (7a) and (7b), the reaction-dependent coefficients k1, k2 are represented by respective products of the deterioration-dependent coefficients k1R, k2R and the temperature-dependent coefficients k1CAT, k2CAT. FIG. 12A shows the relationship between the deterioration-dependent coefficients k1R, k2R and degree of deterioration, based on which k1R and k2R tables are set for determining the deterioration-dependent coefficient k1R or k2R according to the degree of deterioration of the catalytic converter 14. FIG. 12B shows the relationship between the temperature-dependent coefficients k1CAT, k2CAT and the catalyst temperature TCAT, based on which k1CAT and k2CAT tables are set for determining the temperature-dependent coefficient k1CAT or k2CAT according to the catalyst temperature TCAT. From the above equations (6a), (6b) and (7a), (7b), the present oxygen storage amount O2STR can be determined.

If the O2 storage amount O2STR in the catalytic converter 14 is within the range of 0 to the maximum O2 storage amount O2MAX, the air-fuel ratio of exhaust gases at the exit of the catalytic converter 14 is equal to 14.7, whereas if the O2 storage amount O2STR is below "0" or exceeds the maximum O2 storage amount O2MAX, the A/F value detected at the entrance of the catalytic converter 14 directly emerges as the A/F value at the exit thereof.

Figure 13:
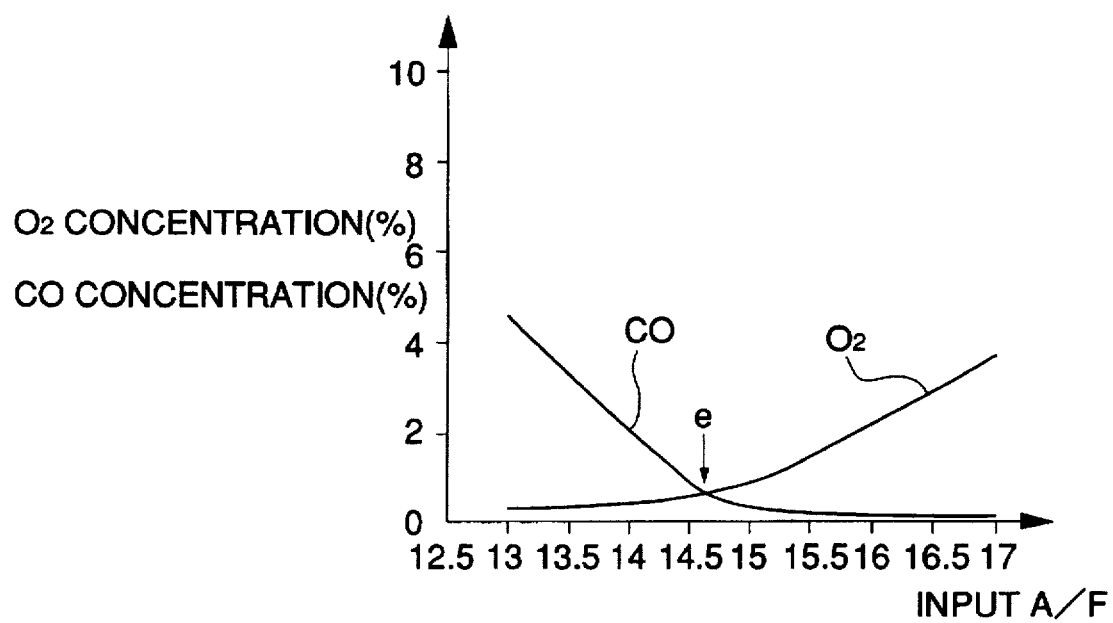
FIG. 13 is a graph showing the relationship between the air-fuel ratio A/F of exhaust gases supplied to the catalytic converter and CO concentration and O2 concentration in the exhaust gases.

FIG. 13 shows the relationship between the air-fuel ratio of exhaust gases input to the catalytic converter 14 and the CO concentration and O2 concentration. If the air-fuel ratio A/F of the exhaust gases exceeds 14.7, a variation rate ΔO2 in the O2 storage amount O2STR in the catalytic converter 14 is calculated by using the O2 concentration, while if the air-fuel ratio A/F is below 14.7, the variation rate ΔO2 in the O2 storage amount O2STR in the catalytic converter 14 is calculated by using the CO concentration. The variation rate ΔO2 in the O2 storage amount O2STR represents O2 discharging/adsorption speed per unit time.

Figure 14:
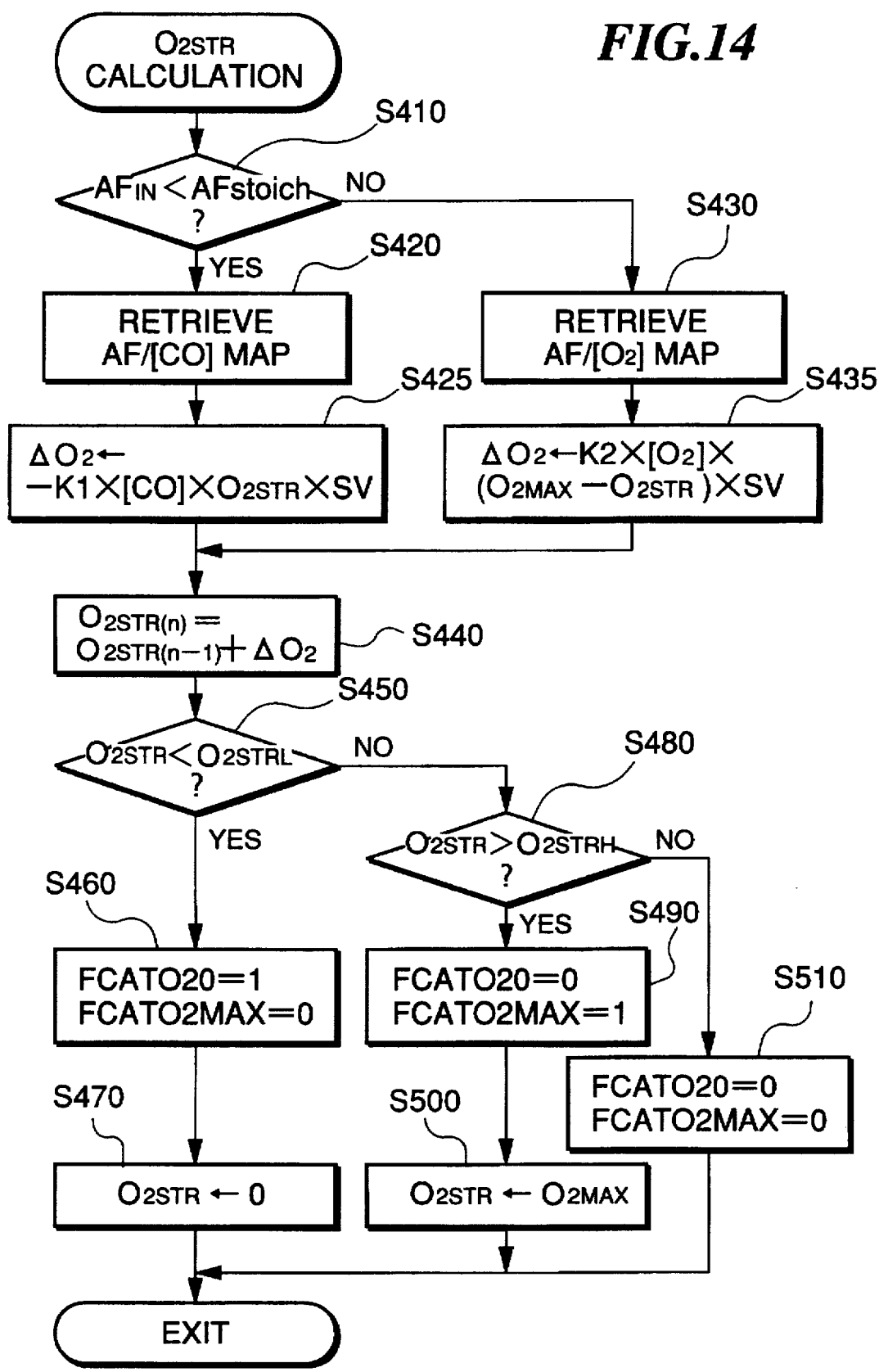
FIG. 14 is a flowchart showing a routine for calculating an O2 storage amount O2STR of the catalytic converter.

FIG. 14 shows a program for calculating the O2 storage amount O2STR in the catalytic converter 14. At a step S410, it is determined whether or not the air-fuel ratio A/F (AFIN) at the location upstream of the catalytic converter 14, which has been calculated by the aforedescribed air-fuel ratio A/F (fuel-air ratio F/A)-estimating routine, is below a stoichiometric value AFstoich 14.7, i.e. the A/F value is on the rich side. If the A/F value is on the rich side, an AF/[CO] map based on the relationship shown in FIG. 13 is retrieved, to thereby determine the CO concentration [COF] at a step S420. Then, the variation rate ΔO2 (−d/dt(o)) in the O2 storage amount O2STR is calculated based on the determined [COF] value by multiplying the term on the right side (k1×[COF]×O2STR) of the above equation (6a) by the space velocity SV at a step S425. The space velocity SV corresponds to an amount of exhaust gases flowing per unit time period. If the air-fuel ratio A/F is on the lean side, an AF/[O22] map based on the relationship of FIG. 13 is retrieved to determine the O2 concentration [O2F] at a step S430. Then, the variation rate ΔO2 (d/dr(o)) in O2 storage amount O2STR is calculated based on the determined O2 concentration [O2F] by multiplying the term on the right side (k2×[O2F]×(O2MAX−O2STR)) of the above equation (6b) by the space velocity SV at a step S435. The variation rate ΔO2 thus calculated is added to the O2 storage amount O2STR(n−1) which was calculated in the immediately preceding loop, at a step S440.

It is determined at a step S450 whether or not the calculated O2 storage amount O2STR(n) is below the predetermined lower limit value O2STRL. If the answer is affirmative (YES), the flag FCATO2O is set to "1" and the flag FCATO2MAX is reset to "0" at a step S460. Then, the O2 storage amount O2STR(n) is set to "0" at a step S470, followed by terminating the present routine. If it is determined at the step S450 that the O2STR(n) value is not below the O2STRL value, then it is determined at a step S480 whether or not the O2STR(n) value exceeds the predetermined upper limit value O2STRH. If it is determined that the O2STR(n) value exceeds the O2STRH value, the flag FCATO2O is reset to "0" and the flag FCATO2MAX is set to "1" at a step S490. Then, the O2STR(n) value is set to the maximum O2 storage value O2MAX at a step S500, followed by terminating the present routine. On the other hand, if it is determined at the step S480 that the O2STR(n) value does not exceed the upper limit value O2STRH, the flags FCATO2O and CATO2MAX are both reset to "0"S510, followed by terminating the present routine. The flags FCATO2O and CATO2MAX are employed in a program for calculating the O2 utilization factor as well, described hereinafter.

The predetermined upper limit value O2STR and the predetermined lower limit value O2STRH of the oxygen storage amount are changed according to the catalyst temperature TCAT. FIG. 15 shows the relationship between the predetermined upper and lower values O2STRH and O2STRL, and the catalyst temperature TCAT. The reaction rate of the catalyst varies with the catalyst temperature TCAT. That is, a change in the catalyst temperature changes the degree of activation of the catalyst, and moreover, the components of the catalyst which are activated are different depending on the temperature, which causes variation in the reaction rate of the catalyst with the temperature. On the other hand, the maximum O2 storage amount O2MAX is estimated based on the reaction speed of the catalyst, the air-fuel ratio detected by the upstream O2 sensor, and so forth, and hence the catalytic converter 14 cannot be utilized to the estimated maximum value of the O2 storage amount, in view of a possible error in the estimation. Further, the maximum O2 storage amount is a static value, and an effective oxygen storage amount defined as an amount of oxygen which can be adsorbed from or discharged into exhaust gases as time elapses, i.e. a dynamic maximum oxygen storage amount is smaller than the static maximum O2 storage amount. Further, the dynamic maximum O2 storage amount depends on the reaction rate which varies with the catalyst temperature, and hence in the present embodiment, as shown in FIG. 15, the range defined by the upper limit value O2STRH and the lower limit value O2STRL is widened as the catalyst temperature is higher.

Further, the catalyst temperature TCAT is correlated to the engine coolant temperature TW. Therefore, the predetermined upper limit value O2STRH and the predetermined lower limit value O2STRL may be set according to the engine coolant temperature TW as well. Further, the state of activation of the catalyst changes with the degree of degradation of the catalyst, and hence the reaction rate also depends on the degree of deterioration of the catalyst. Therefore, the range defined by the predetermined upper limit value O2STRH and the predetermined lower limit value O2STRL may be changed or narrowed not only with the catalyst temperature TCAT but also with the degree of deterioration of the catalyst.

Figures 16A, 16B, 16C, 16D, 16E:
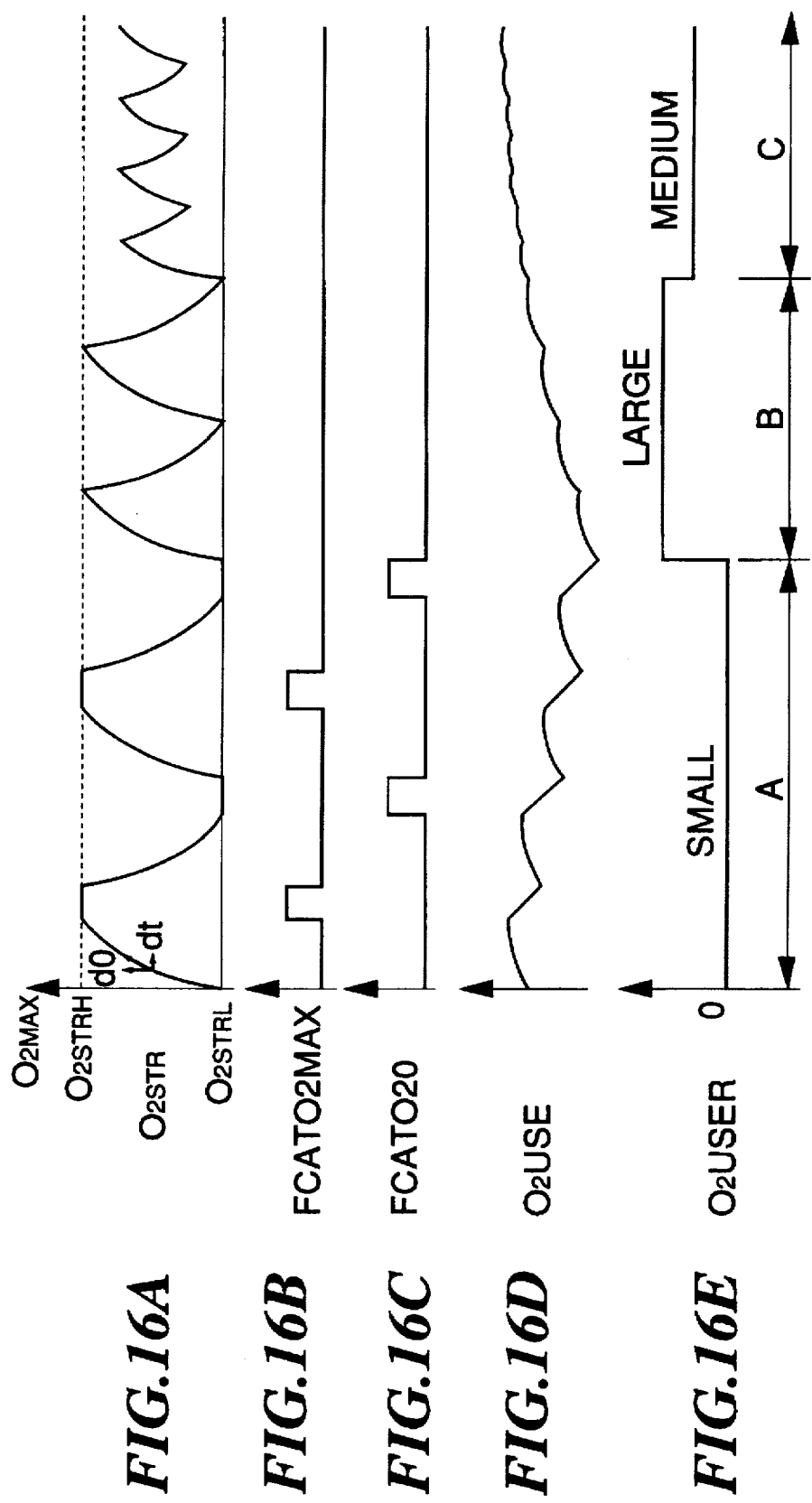
FIG. 16 is a timing chart showing the relationship in timing between the O2 storage amount O2STR, a flag FCATO2MAX, a flag FCATO20, an O2 utilization amount O2USE, and an O2 utilization factor O2USER.

FIG. 16 shows a timing chart showing the relationship in timing between the O2 storage amount O2STR and the states of the flags FCATO2O and FCATO2MAX exhibited when the A/F is subjected to perturbation in a predetermined manner. As shown in the figure, the O2 storage amount O2STR fluctuates in response to the rich/lean inversion period of the A/F value, and when the O2 storage amount O2STR is below the predetermined lower limit value O2STRL ) or exceeds the predetermined upper limit value O2STRH value, the flags FCATO2O and FCATO2MAX are set to "1", respectively. An O2USE value and the O2USER value shown in FIG. 16 represents the O2 utilization amount and the O2 utilization factor of the catalytic converter 14, respectively, referred to hereinafter.

[Processing 7 for calculating the O2 utilization factor O2USER]

The O2 utilization amount O2USE in the catalytic converter 14 is calculated by adding up the length of a segment of the path of change in the O2 storage amount O2STR corresponding to a gradient of the path relative to the time base per unit time, by the use of the following equation (8). However, if the O2 storage amount O2STR exceeds the O2STRH value or is below the O2STRL value, the O2USE value is decreased by a correction coefficient Kpenalty:

$$O2USE = \int_0^T \sqrt{1 + |d/dt(O2STR)|^2}\, dt - Kpenalty \times \Delta T \qquad (8)$$

The O2 storage amount O2STR of the equation (8) is almost proportional to a value $\Sigma|\Delta O2|$, and therefore the O2 utilization amount O2USE can be simply obtained from a cumulative value of $|\Delta O2b|$ by the use of the following equation (9):

$$O2USE = \sum^N |\Delta O2| - Kpenalty \times \Delta T \qquad (9)$$

In the equations (8) and (9), $\Delta T$ represents a cumulative time period over which the O2STR continues to be below the predetermined lower limit value O2STRL or exceed the predetermined upper limit value O2STRH. The correction coefficient Kpenalty is employed for decreasing the O2 utilization amount when the aforesaid flag FCATO2MAX or FCTO2O is set to "1", and is set to a value dependent upon the correlation of the O2 utilization amount O2USE with the actual purification rate of the catalyst.

The O2 utilization factor O2USER, which is correlated with the purification rate of the catalytic converter 14, is expressed by the following equation (10):

$$O2USER = \sum^N (O2USE)/T \qquad (10)$$

where T represents a time period corresponding to a number N of times of calculation of the O2USE value.

The O2USE value is a variation amount in the O2 storage amount O2STR per the predetermined time period T, and represents a physical amount having correlation with the purification rate of the catalyst.

Figure 17:
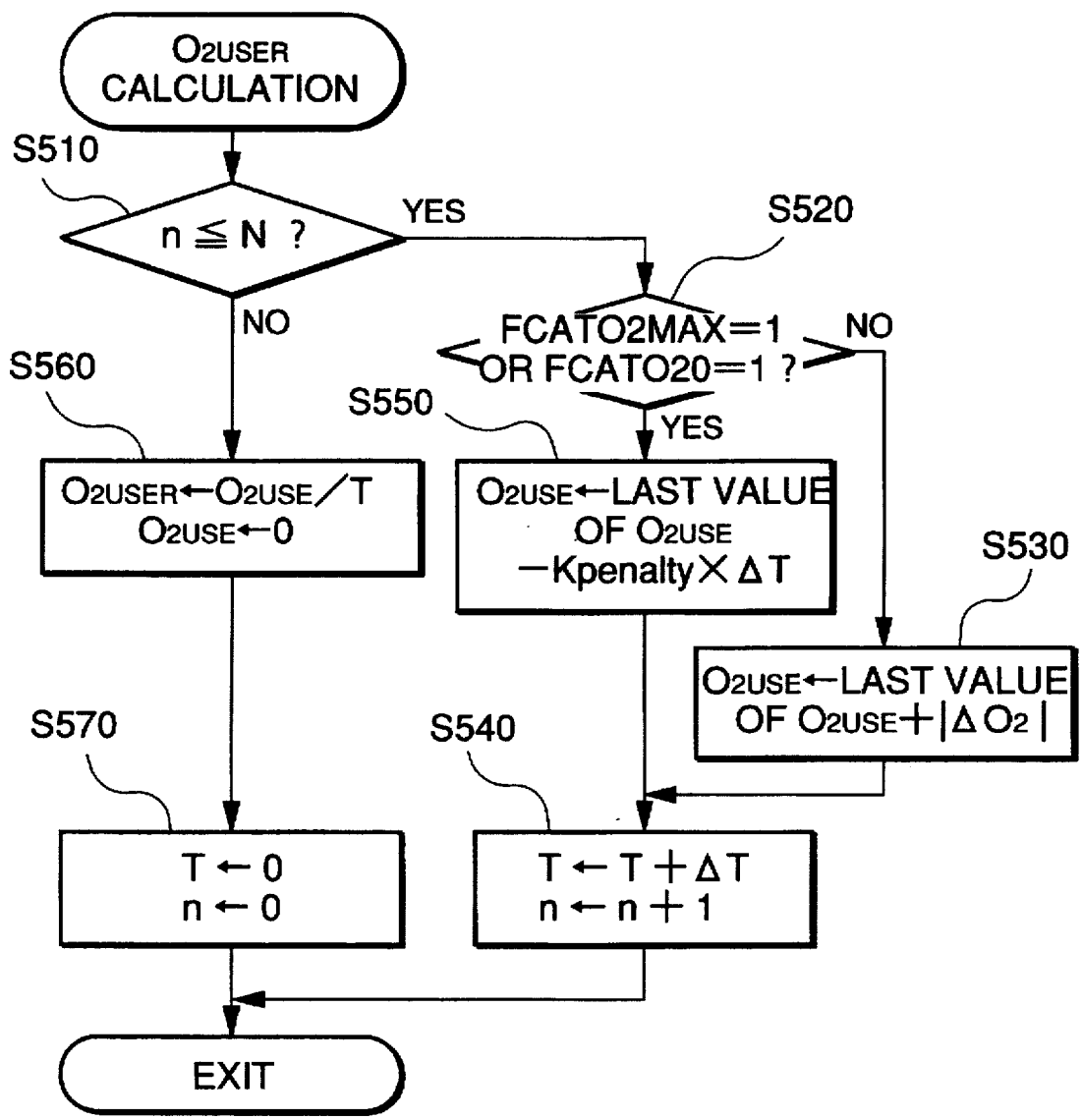
FIG. 17 is a flowchart showing a routine for calculating the O2 utilization factor O2USER.

FIG. 17 shows a program for calculating the O2 utilization factor O2USER. This routine is executed at predetermined time intervals, and the O2 utilization factor O2USER is calculated whenever the present routine is executed a predetermined number N of times. First, it is determined at a step S510 whether or not the number n of times of execution of the present routine exceeds the predetermined number N. If the answer is affirmative (YES), it is determined at a step S520 whether or not either the aforesaid flag FCATO2MAX or FCATO2O has been set to "1" If neither of the flag has been set to "1", a new value of the O2 utilization amount O2USE is calculated by adding a present value of the variation amount $|\Delta O2|$ to a last value of the O2 utilization amount O2USE at a step S530. Then, the value $\Delta T$ is added to the elapsed time period T and the number n of times of execution is incremented by "1"S540, followed by terminating the present routine. On the other hand, if either of the flags FCATO2MAX, FCATO2O has been set to "1" at the step S520, the correction coefficient Kpenalty is subtracted from the last value of the O2 utilization amount O2USE at a step S550, and then the value $\Delta T$ is added to the elapsed time period T and the number n of times of execution is incremented by "1"S540, followed by terminating the present routine. If the number n has reached the predetermined number N at the step S510, the O2USE value is divided by the elapsed time period T to obtain the O2 utilization factor O2USER and at the same time the O2 utilization amount O2USE is reset to "0" at a step S560. Then, the elapsed time period T and the number n of times of execution are reset to "0" at a step S570, followed by terminating the routine.

The above manner of calculation of the O2 utilization factor O2USER will be further explained with reference to FIG. 16: For example, in a range A of FIG. 16, the O2 storage amount O2STR in the catalytic converter 14 cyclically varies between the predetermined lower limit value O2STRL of the O2MAX value and the predetermined upper limit value O2STRH of the O2MAX value. However, the O2STR value falls below or exceeds those upper and lower limit values just before it is inverted. Consequently, the correction coefficient Kpenalty is applied so that the O2 utilization amount O2USE varies in the decreasing direction, to thereby set the O2USER value to a small value. In a range B of FIG. 16, the O2 storage amount O2STR in the catalytic converter 14 cyclically varies between the predetermined lower limit value O2SRL of the O2MAX value and the predetermined upper limit value O2SRH of the O2MAX value without deviating from the range, and consequently the O2 utilization amount O2USE increases, to thereby set the O2USER value to a large value. In a range C of FIG. 16, the repetition period of the lean/rich inversion of the air-fuel ratio is made shorter in order to increase the O2USER value. However, the O2 storage amount O2STR in the catalytic converter 14 cannot be used to a full extent, whereby the O2 utilization amount O2USE is decreased to a value lower than that in the range B.

[Processing 8 for controlling the air-fuel ratio]

Figure 18:
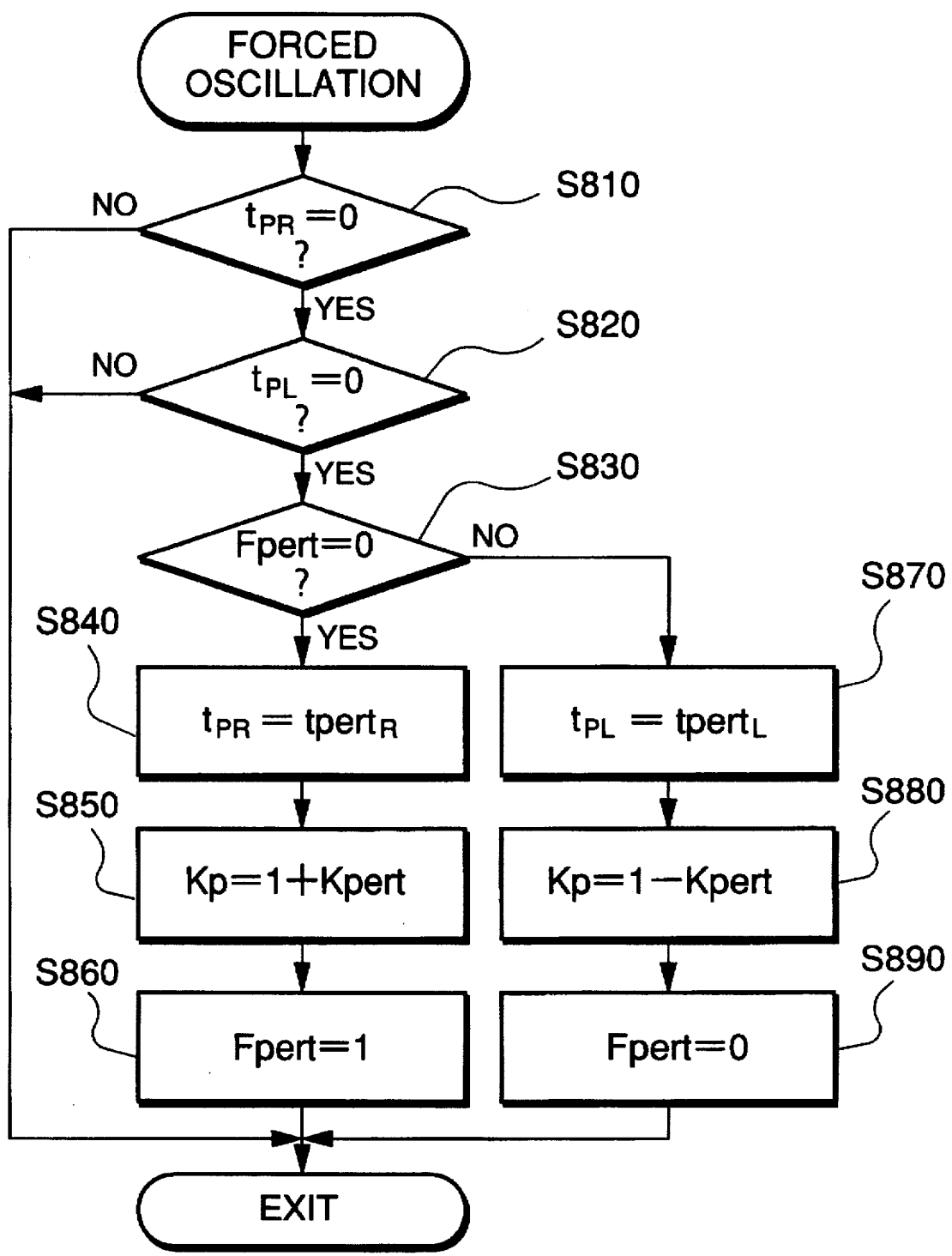
FIG. 18 is a flowchart showing a routine for executing perturbation of the air-fuel ratio.
Figures 19A, 19B, 19C:
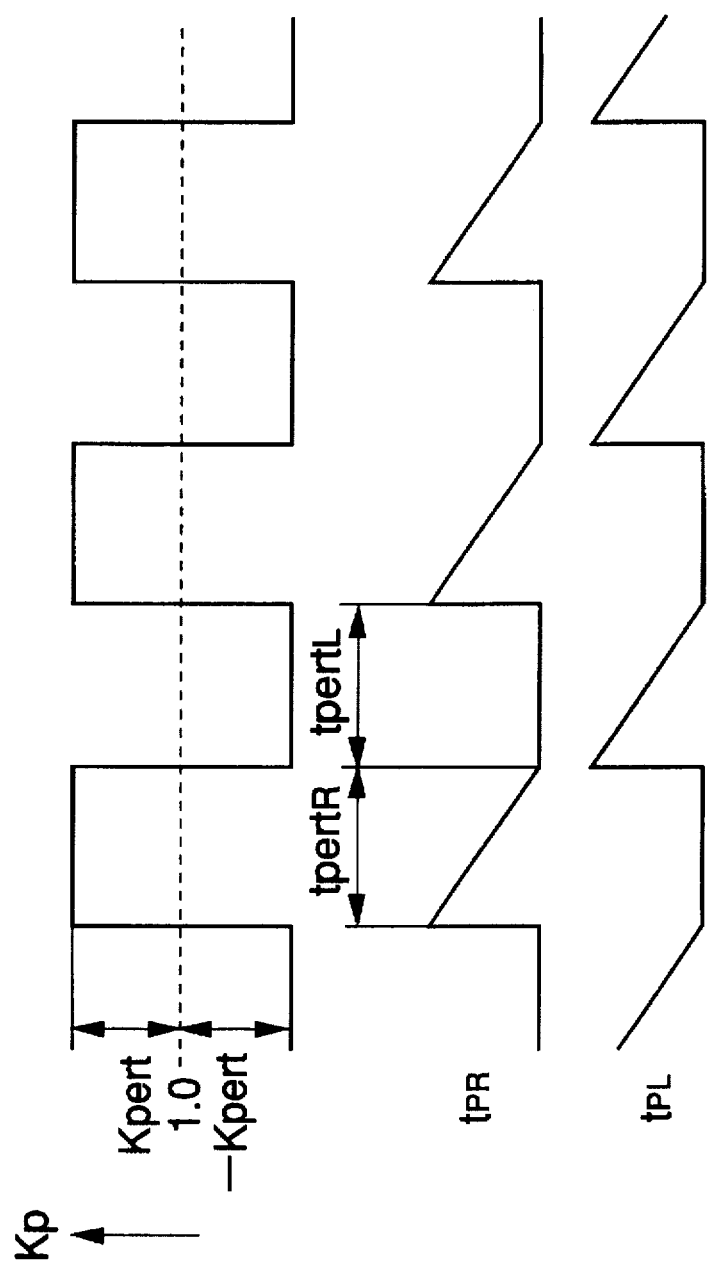
FIG. 19 is a timing chart showing amplitude Kpert and repetition periods tpertR, tpertL of the perturbation.

Then, description will be made of forced oscillation of the air-fuel ratio A/F (perturbation) by using the O2 utilization factor O2USER calculated as above. FIG. 18 shows a program for executing the perturbation. FIG. 19 shows a timing chart showing the amplitude of the perturbation and the repetition period of the same. In the present embodiment, the amplitude and repetition period of a perturbation coefficient Kp of the fuel injection time period TOUT are changed.

First, at a step S810, it is determined whether or not a count value of a downtimer tPR for switching the air-fuel ratio from a rich state to a lean state is equal to "0" If the count value is not equal to "0", the present routine is terminated, whereas if the count value is equal to "0", it is determined at a step S820 whether or not a count value of a downtimer tPL for switching the air-fuel ratio from the lean state to the rich state is equal to "0" If the count value is not equal to "0", the present routine is terminated, whereas if the count value is equal to "0", it is determined at a step S830 whether or not a flag Fpert has been set to "0" If the flag Fpert has been set to "0", the downtimer tPR is set to a predetermined repetition period tpertR at a step S840, and the coefficient Kp is set to a value (1+Kpert) to bias the A/F value toward the rich side at a step S850. Then, the flag Fpert is set to "1" at a step S860, followed by terminating the present routine. On the other hand, if the flag Fpert is set to "1" at the step S830, the downtimer tPL is eqaul to a predetermined repetition period tpertL at a step S870, and the coefficient Kp is set to a value (1−Kpert) to bias the A/F value toward the lean side at a step S880. Then, the flag Fpert is set to "0" at a step S890, followed by terminating the present routine.

By thus executing the present routine, the coefficient Kp changes about a value of 1.0 such that its waveform oscillates with the amplitude equal to the value Kpert and the repetition period equal to a value (tpertR+tpertL). Further, the variation rate ΔO2 of the catalytic converter is larger when the air-fuel ratio is on a richer side than when it is on a leaner side, and therefore the values tpertL, tpertR are set so as to satisfy the relationship of tpertR<tpertL to thereby make an amount of change of the oxygen storage amount when the air-fuel is on a richer side equal to an amount of change of the oxygen storage amount when the air-fuel ratio is on a leaner side. Further, the amplitude and repetition period of perturbation are changed according to the O2 utilization factor O2USER.

Figure 22:
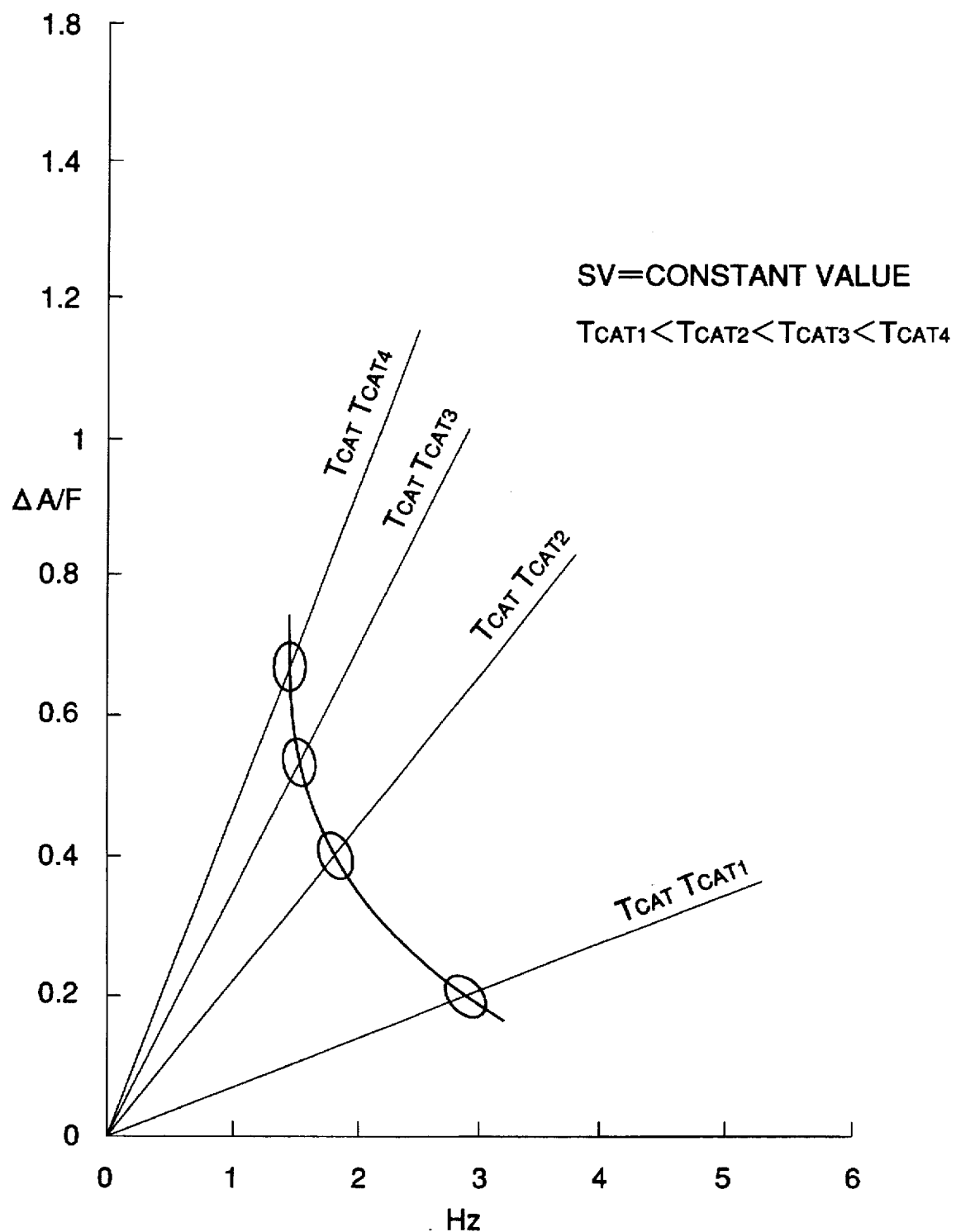
FIG. 22 is a diagram showing changes in the point determined by the amplitude ($\Delta$A/F) and frequency (Hz) which gives the maximum purification rate as occurring when the catalyst temperature TCAT is varied with a space velocity (SV) being held constant.
Figure 23:
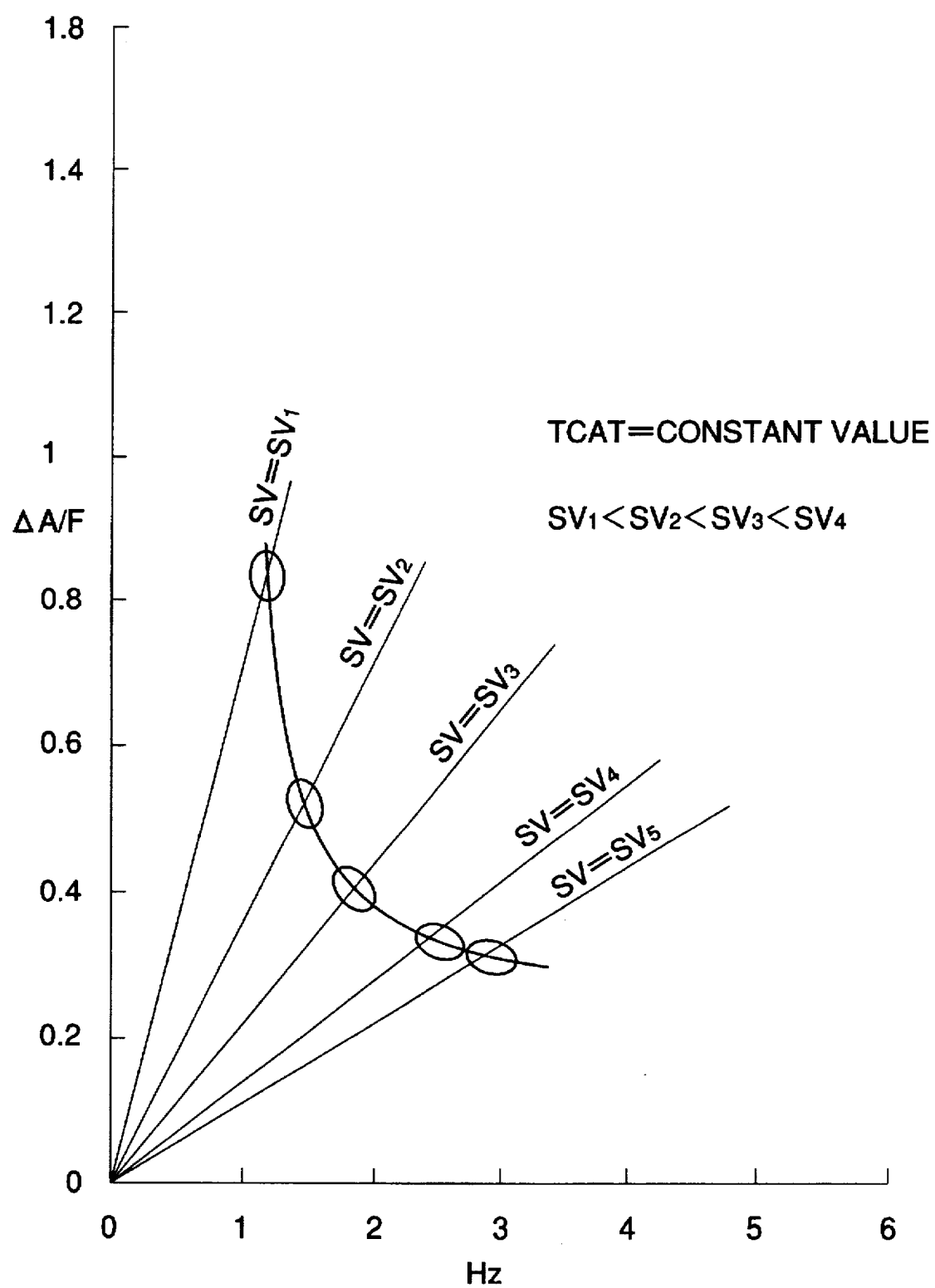
FIG. 23 is a diagram showing changes in the point determined by the amplitude ($\Delta$A/F) and frequency (Hz) which gives the maximum purification rate as occurring when a space velocity (SV) is varied with the catalyst temperature TCAT being held constant.

FIG. 22 shows changes in the point determined by the amplitude (ΔA/F) of perturbation and the frequency (Hz) of the same which gives the maximum purification rate of the catalyst, assumed when the catalyst temperature TCAT is changed while holding the space velocity SV at a fixed value. Further, FIG. 23 shows changes in the point determined by the amplitude (ΔA/F) and the frequency (Hz) of perturbation which gives the maximum purification rate of the catalyst as occurring when the space velocity SV is changed while holding the catalyst temperature TCAT at a fixed value. In FIG. 22 and FIG. 23, the circled areas designate regions where the maximum purification rate depending on the catalyst temperature and the space velocity SV is obtained. Both FIG. 22 and FIG. 23 show that the point determined by the amplitude (ΔA/F) and the frequency (Hz) of perturbation which gives the maximum purification rate of the catalyst changes in a substantially hyperbolic manner on a plane determined by the amplitude and the frequency as the catalyst temperature TCAT or the space velocity SV changes. Further, the point determined by the amplitude (ΔA/F) and the frequency (Hz) of perturbation which gives the maximum purification rate of the catalyst exists on straight lines which each intersect with the origin.

The reason for the point of the amplitude and the frequency of perturbation which gives the maximum purification rate lies on a straight line which intersects with the origin on a plane determined by the amplitude and the frequency is as follows:

As explained before with reference to FIG. 16, the O2 utilization factor O2USER corresponding to the purification rate of the catalyst becomes the maximum when the O2 storage amount O2STR changes in a short time to and from the maximum O2 storage amount O2MAX and the minimum value (zero).

Therefore, as shown in FIG. 21, to maximize the purification rate of the catalyst, the amount of decrease in the O2 storage amount O2STR on a richer side of the perturbation and the amount of increase in the O2 storage amount O2STR on a leaner side of the same are each required to be equal to the maximum O2 storage amount O2MAX. This enables the catalytic converter to discharge oxygen to such a full extent that the maximum O2 storage amount is reduced to zero, when perturbation is carried out on a rich side, and also to store oxygen to such a full extent that the oxygen storage amount is increased from zero to the maximum O2 storage amount.

By the way, the amount of decrease in the O2 storage amount O2STR on a richer side of the perturbation is determined by the product of an amount of release of O2 molecules per unit time period which is determined by the product of the amplitude of perturbation which represents concentration of CO on the richer side of perturbation and the space velocity which represents an amount of exhaust gases, and the duration of the rich state which is represented by the repetition period of the perturbation.

Similarly, the amount of increase in the O2 storage amount O2STR on a leaner side of the perturbation is determined by the product of an amount of storage of O2 molecules per unit time period which is determined by the product of the amplitude of perturbation which represents concentration of O2 on the leaner side of perturbation and the space velocity which represents an amount of exhaust gases, and the duration of the lean state which is represented by the repetition period of the perturbation.

Therefore, the point determined by the amplitude and frequency of the perturbation which satisfies the condition of the maximum purification rate lies on a straight line which intersects with the origin and extends on an amplitude-frequency plane with an inclination determined by the maximum storage amount and the space velocity. The larger the space velocity, the gentler the inclination, and the larger the maximum storage amount (catalyst temperature), the steeper the inclination.

The above explanation defines one of conditions required for obtaining the maximum purification rate of the catalyst, and a point on the straight line having the above inclination which corresponds to a specific amplitude and a specific frequency gives the maximum purification rate of the catalyst.

FIG. 21A to FIG. 21D show manners of changes in the purification rate obtained when the values of frequency and amplitude of the perturbation are varied in a linear manner.

Figure 21A:
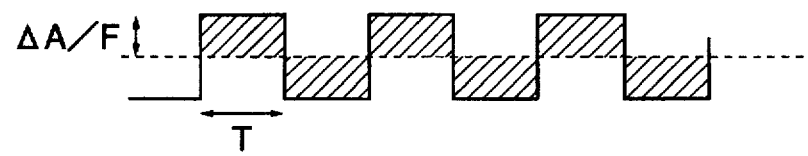
FIG. 21A to FIG. 21D show diagrams which are useful in explaining manners of changes in the purification factor of the catalyst when the frequency and amplitude of perturbation are varied in a linear manner.

FIG. 21A shows a waveform of perturbation having an amplitude and frequency which gives the maximum purification rate.

Figure 21B:
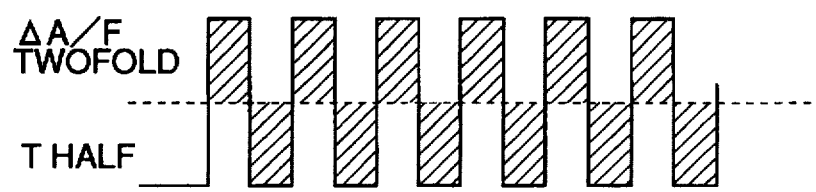

FIG. 21B shows a waveform obtained when in a state of the space velocity and each area of perturbation (amplitude× frequency) having the same values as assumed in FIG. 21A, the amplitude is set to a twofold value, and the repetition period is set to a half value. In this case, exhaust gases flow into the catalytic converter in such an amount that the amount of O2 molecules is in excess of a range within which the catalyst can process, i.e. store or release, oxygen per unit time period, i.e. the limit of adsorption or release of O2, which results in a decreased purification rate of the catalytic converter.

Figure 21C:
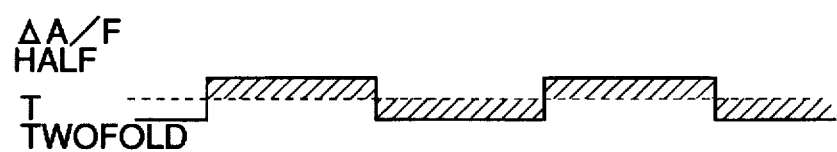

FIG. 21C shows a waveform obtained when in a state of the space velocity and each area of perturbation (amplitude× frequency) having the same values as assumed in FIG. 21A, the amplitude is set to a half value, and the repetition period is set to a twofold value. In this case, lean or rich exhaust gases flow into the catalytic converter over a longer time period compared with the FIG. 21A case, which causes self-poisoning in which HC and other components are caused to adhere to the catalyst, which also decreases the purification rate of the catalytic converter.

Figure 21D:
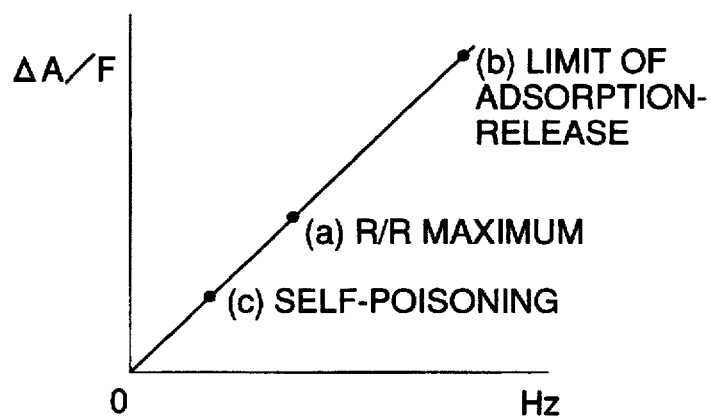

These cases are summarized in FIG. 21D.

[Processing 9 for setting rates of changes in the frequency and amplitude]

Figure 20:
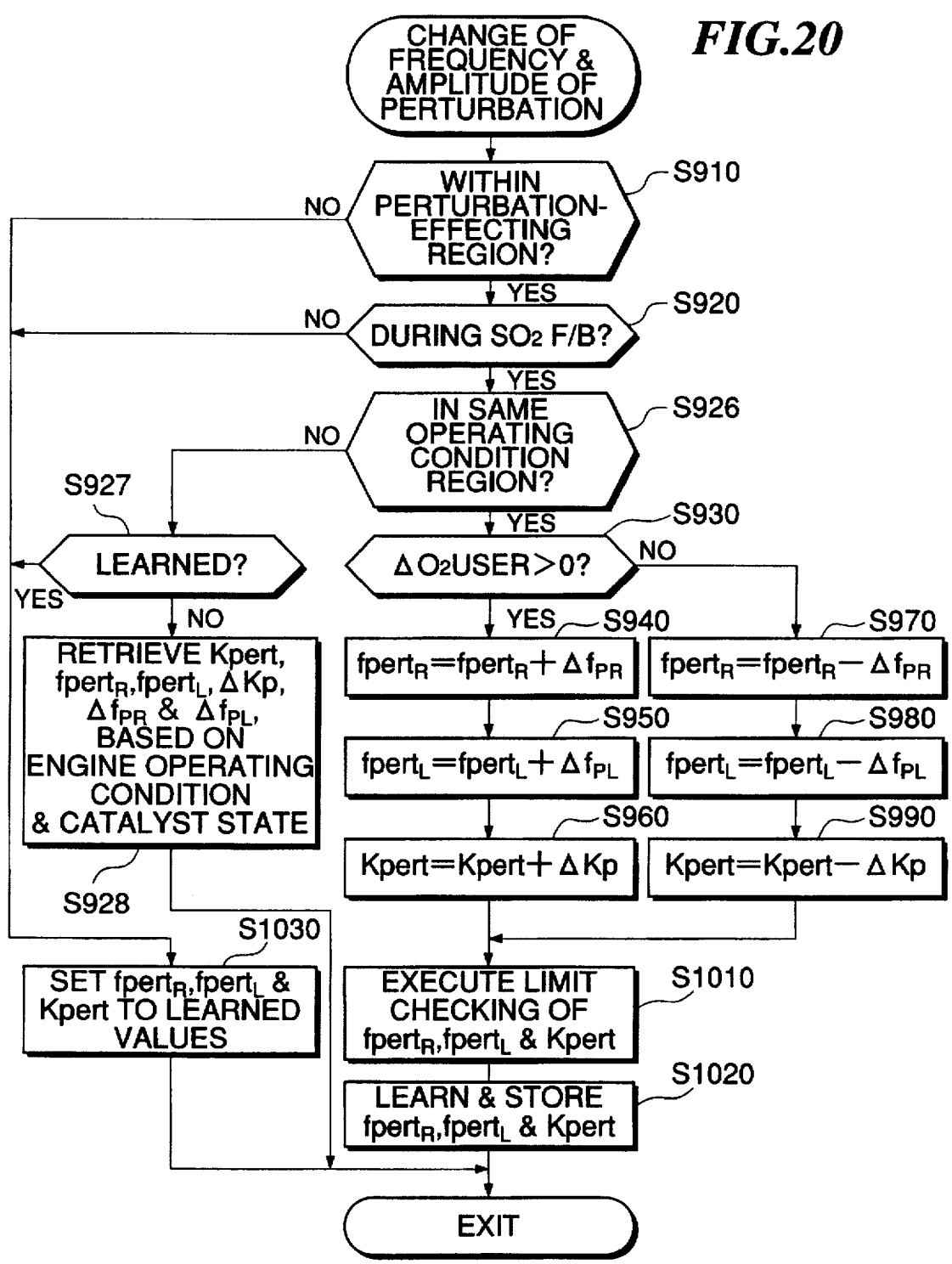
FIG. 20 is a flowchart showing a routine for changing the amplitude Kpert, and the frequencies fpertR, fpertL.

FIG. 20 shows a routine for changing the amplitude Kpert, and the frequencies fpertR, fpertL, in which the amplitude and frequency of perturbation are changed on the straight line extending on the amplitude-frequency plane and intersecting with the origin, to thereby converge those parameters to the point of the maximum purification rate (which corresponds to Processing 8). First, it is determined at a step S910 whether or not the engine is in a condition suitable for perturbation in which the intake pipe absolute pressure PBA, the engine rotational speed NE, the vehicle speed V are stable. If the answer to this question is negative (NO), the amplitude Kpert, the frequencies fpertR, fpertL are set to respective learned values at a step S1030, followed by terminating the program. If the answer to the question of the step S910 is affirmative (YES), it is determined at a step S920 whether or not the air-fuel ratio feedback control (SO2F/B) based on the downstream O2 sensor 16 is being carried out. If the answer to this question is negative (NO), the step S1030 s carried out, followed by terminating the program.

If the answer to the question of the step S920 is affirmative (YES), it is determined at a step S926 whether or not the engine has been continuing to be in the same operating condition. If the answer to this question is negative (NO), it is determined at a step S927 whether or not the amplitude Kpert and the frequencies fpertR, fpertL have been already learned. If the answer to this question is affirmative (YES), the learned values are set to the amplitude Kpert and the frequencies fpertR, fpertL at a step S1030, followed by terminating the program. If the answer to the question of the step S927 is negative (NO), the amplitude Kpert and the frequencies fpertR, fpertL are read from a space velocity SV/catalyst temperature TCAT map, not shown, according to the space velocity SV and the catalyst temperature TCAT, thereby setting initial values thereof, and at the same time, an amount of change $\Delta Kp$ of amplitude and amounts of changes $\Delta fPR$, $\Delta PL$ of frequency are determined according to the space velocity SV and the catalyst temperature TCAT, at a step S928, followed by terminating the program. FIG. 24A shows the relationship between the amount of change $\Delta Kp$ and the catalyst temperature TCAT, and FIG. 24B shows the relationship between the amount of change $\Delta Kp$ and the space velocity SV. FIG. 24C shows the relationship between the amounts of changes $\Delta fPR$, $\Delta fPL$ and the catalyst temperature TCAT, and FIG. 24D shows the relationship between the amounts of changes $\Delta fPR$, $\Delta fPL$ and the space velocity SV.

The amount of change $\Delta Kp$ and the amounts of changes $\Delta fPR$, $\Delta fPL$ are determined by retrieving respective three-dimensional maps which are set based on the relationships shown in FIG. 24A, FIG. 24B, FIG. 24C, and FIG. 24D.

Then, the present routine is repeatedly carried out, and if the answer to the question of the step S926 is affirmative (YES), i.e. the operating condition of the engine has not changed, the program proceeds to a step S930.

Then, it is determined at the step S930 whether or not a variation amount $\Delta O2USER$ in the O2 utilization factor O2USER is larger than "0", i.e. whether the O2 utilization factor O2USER is in the increasing direction or in the decreasing direction. If the O2USER value is in the increasing direction, the frequency components fpertR and fertL are increased by a the amounts $\Delta fPR$ and $\Delta fPL$ at steps S940 and S950, respectively, and the amplitude Kpert is increased by the amount $\Delta Kp$ at a step S960. On the other hand, if it is determined at the step S930 that the O2USER value is in the decreasing direction, the frequency components fpertR and fpertL are decreased by the amounts $\Delta fPR$ and $\Delta fPL$ at steps S970 and S980, respectively, and the amplitude Kpert is decreased by the amount $\Delta Kp$ at a step S990.

Then, it is determined at a step S1010 whether or not the thus corrected values are within ranges between the respective limit values, and if any of the values falls outside the corresponding range, the former is limited to the latter. Then, learned values of the amplitude Kpert and the frequencies fpertR and fpertL are calculated based on the thus determined Kpert, fpertR, and fpertL values, and stored into the aforementioned space velocity SV/catalyst temperature TCAT map according to the the space velocity SV and the catalyst temperature TCAT, at a step S1020, followed by terminating the present routine.

The amount of change (ΔKp) of the amplitude (ΔA/F) and the amount of change (ΔfPR, ΔfPL) of the frequency are determined by the SV/TCAT maps set based on the relationships shown in FIG. 24A to FIG. 24D such that the path of changes of the control parameters includes points of amplitude and frequency which give the maximum purification rate (corresponding to Processing 9).

Further, the means for setting the rate of changes in the amplitude and frequency of Processing 9 may change either the amount of change, i.e. variation rate, (ΔKp) of the amplitude or the amounts of changes, i.e. variation rates (ΔfPR, ΔfPL), or alternatively all the control parameters. Both of these methods can change the inclination of the straight line on which the maximum purification rate lies as desired.

When the operating region determined by the space velocity and the catalyst temperature has changed, the amplitude and the frequency are set to respective initial values obtained from the aforementioned space velocity, SV/catalyst temperature map according to the space velocity SV and the catalyst temperature TCAT, before the average values thereof are calculated. These initial values are set to values smaller than the point of the maximum purification rate shown in FIG. 22 or FIG. 23, thereby preventing the use of the critical area of storage and release of oxygen as in the case of FIG. 21B.

The control based on the linear change method described above is advantageous in that if the space velocity and the maximum oxygen storage amount are determined, the control can be necessarily effected on the straight line where the amplitude and the frequency which give the point of the maximum purification factor lies.

Figure 25:
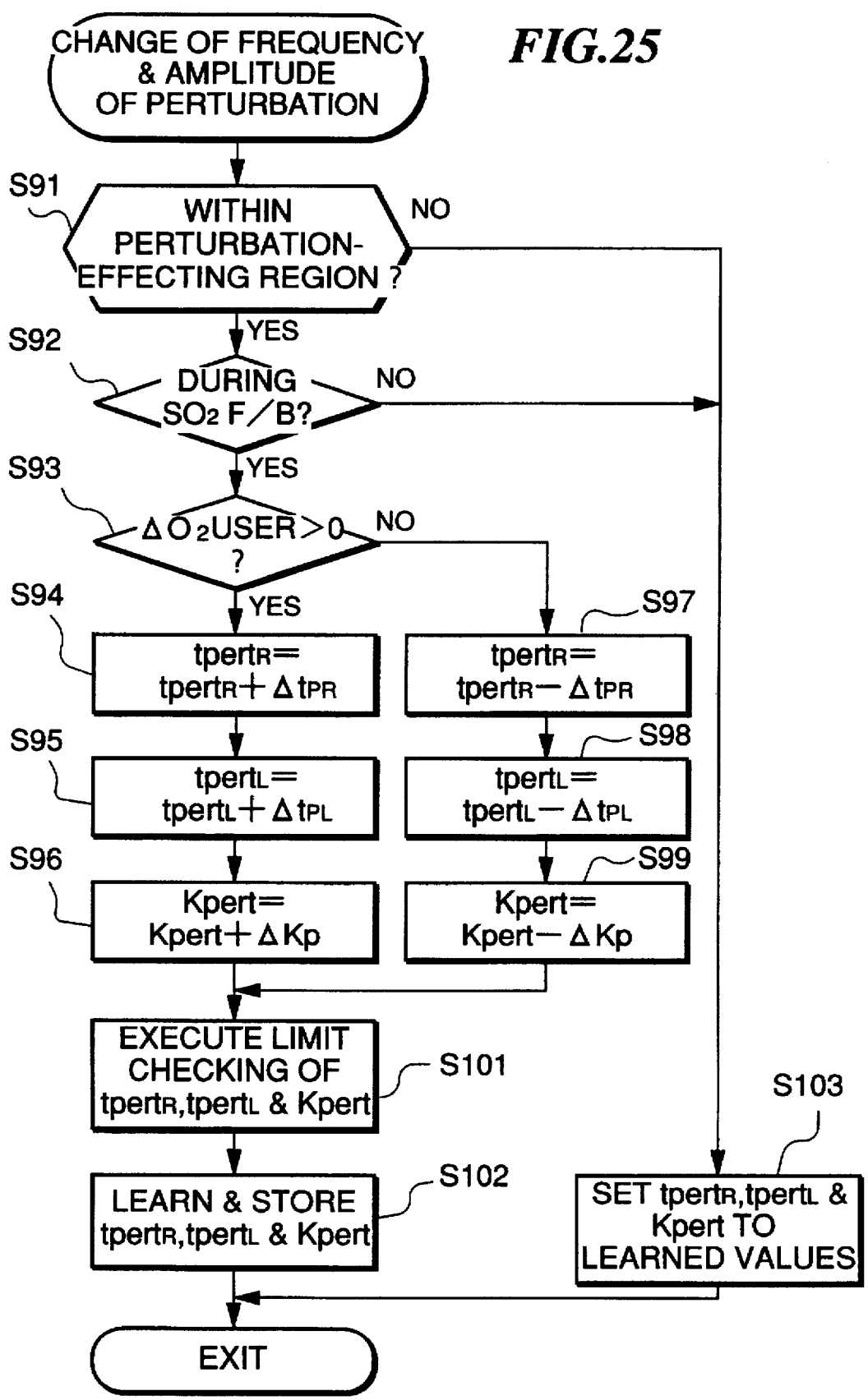
FIG. 25 is a flowchart showing a routine for changing the amplitude Kpert, and repetition periods tpertR, tpertL.

Then, the processing for changing the amplitude Kpert and the frequencies fpertR, fpertL in a hyperbolic manner. FIG. 25 shows a routine for changing the amplitude Kpert and the frequencies fpertR, fpertL in a hyperbolic manner, in which the amplitude and frequency of the perturbation are changed on the aforementioned amplitude-frequency plane substantially in a hyperbolic manner to thereby converge these control parameters to the point of the maximum purification rate. Although in FIG. 20 the frequency of perturbation is changed stepwise by a predetermined amount to give a linear path of change, in FIG. 25, the repetition period (inverse number of the frequency) of perturbation is changed stepwise by a predetermined amount, and the directions of change of the amplitude and change of the repetition period are made opposite to the directions shown in FIG. 20, thereby giving a substantially hyperbolic path (corresponding to Processing 9).

Referring to FIG. 25, first, it is determined at a step S91 whether or not the engine is in a condition suitable for perturbation in which the intake pipe absolute pressure PBA, the engine rotational speed NE, the vehicle speed V are stable. If the answer to this question is negative (NO), the amplitude Kpert and the repetition period tpertR, tpertL are set to respective learned values read from a space velocity SV/catalyst temperature TCAT map, not shown, at a step S103, followed by terminating the program. If the answer to the question of the step S91 is affirmative (YES), it is determined at a step S92 whether or not the air-fuel ratio feedback control (SO2F/B) based on the downstream O2 sensor 16 is being carried out. If the answer to this question is negative (NO), the step S103 is carried out, followed by terminating the program.

If the SO2F/B is being executed, it is determined at a step S93 whether or not a variation amount ΔO2USER in the O2 utilization factor O2USER is larger than "0", i.e. whether the O2 utilization factor O2USER is in the increasing direction or in the decreasing direction. If the O2USER value is in the increasing direction, the repetition period components tpertR and tpertL are increased by values ΔtPR and ΔtPL at steps S94 and S95, respectively, and the amplitude Kpert is increased by a value ΔKp at a step S96. On the other hand, if it is determined at the step S93 that the O2USER value is in the decreasing direction, the repetition period components tpertR and tpertL are decreased by the values ΔtPR and ΔtPL at steps S97 and S98, respectively, and the amplitude Kpert is decreased by the value ΔKp at a step S99. As the amounts of change ΔKp of amplitude Kpert and amounts of changes ΔtPR, ΔtPL of repetition periods tpertR, tpertL, values dependent on the space velocity SV and the catalyst temperature TCAT are used.

Then, it is determined at a step S101 whether or not the thus corrected values are within ranges between the respective limit values, and if any of the values falls outside the corresponding range, the former is limited to the latter. Then, learned values of the thus determined amplitude Kpert and repetition period (tpertR and tpertL) are calculated and stored into the space velocity SV/catalyst temperature TCAT map according to the space velocity SV and the catalyst temperature TCAT, at a step S102, followed by terminating the present routine.

The amount of change (ΔKp) of the amplitude (ΔA/F) and the amount of change (ΔtPR, ΔtPL) of the repetition period are determined by maps set based on the relationships shown in FIG. 26A to FIG. 26D such that the path of changes of the parameters includes points of amplitude and frequency which give the maximum purification rate (corresponding to Processing 9).

Further, the means for setting the rate of changes in the amplitude and frequency of Processing 9 may change either the amount of change, i.e. variation rate (ΔKp) of the amplitude or the amounts of changes, i.e. variation rate (ΔtPR, ΔtPL) of repetition periods, or alternatively all the parameters. Both of these methods can give a desired hyperbolic path of the maximum purification rate.

According to the control on the hyperbolic line, the point of the maximum purification rate is distributed in a hyperbolic manner as shown in FIG. 22 or FIG. 23. Therefore, this method is characterized in that it is excellent in responsiveness in a transient condition of the catalyst, i.e. when the operating condition of the catalyst changes, particularly when the space velocity (the amount of exhaust gases flowing into the catalyst) drastically changes with time.

[Processing 11 for calculating the fuel injection amount Tout]

A basic fuel injection amount Ti of the fuel injection amount Tout is determined from the engine rotational speed NE and the intake pipe absolute pressure PBA. The fuel injection amount Tout is calculated by multiplying the basic fuel injection amount Ti thus determined by the correction coefficient KTOTL and the coefficient Kp, as well as by the air-fuel ratio correction coefficient KO2 which is calculated in Processing 10 described hereinafter, by the use of the equation (11) shown below. The correction coefficient KTOTL represents a total of correction coefficients used for improving characteristics of the engine, such as fuel consumption, and accelerability, including a coolant temperature-dependent correction coefficient, a high load-dependent enriching correction coefficient, and a deceleration-dependent leaning coefficient.

$$Tout = Ti \times Kp \times KTOTL \times KO2 \tag{11}$$

[Processing 10 for calculating the air-fuel ratio correction coefficient KO2]

Figure 27A:
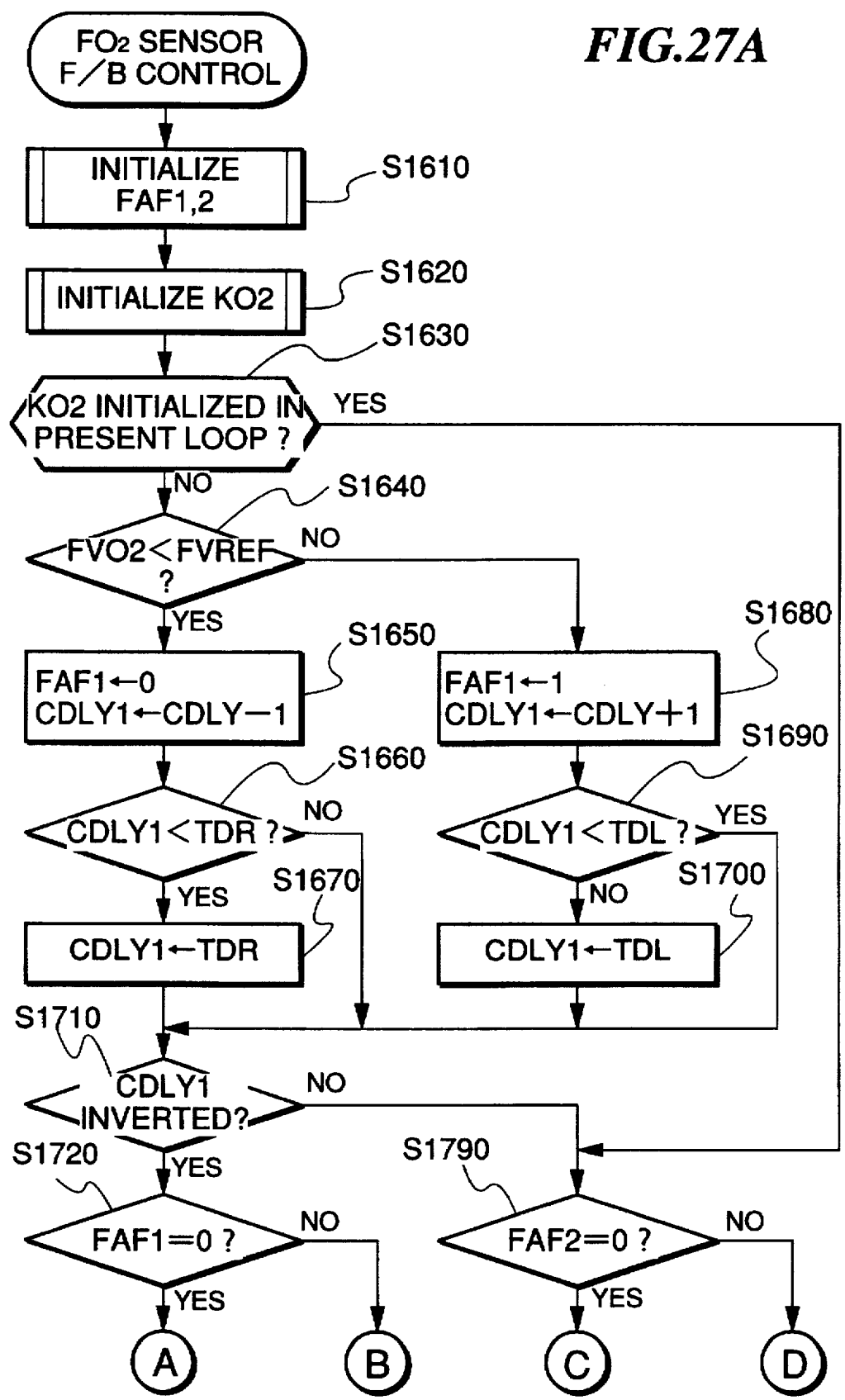
FIG. 27A is a flowchart showing a routine for calculating the air-fuel ratio correction coefficient KO2 based on an output voltage FVO2 of an O2 sensor arranged upstream of the catalytic converter.
Figure 27B:
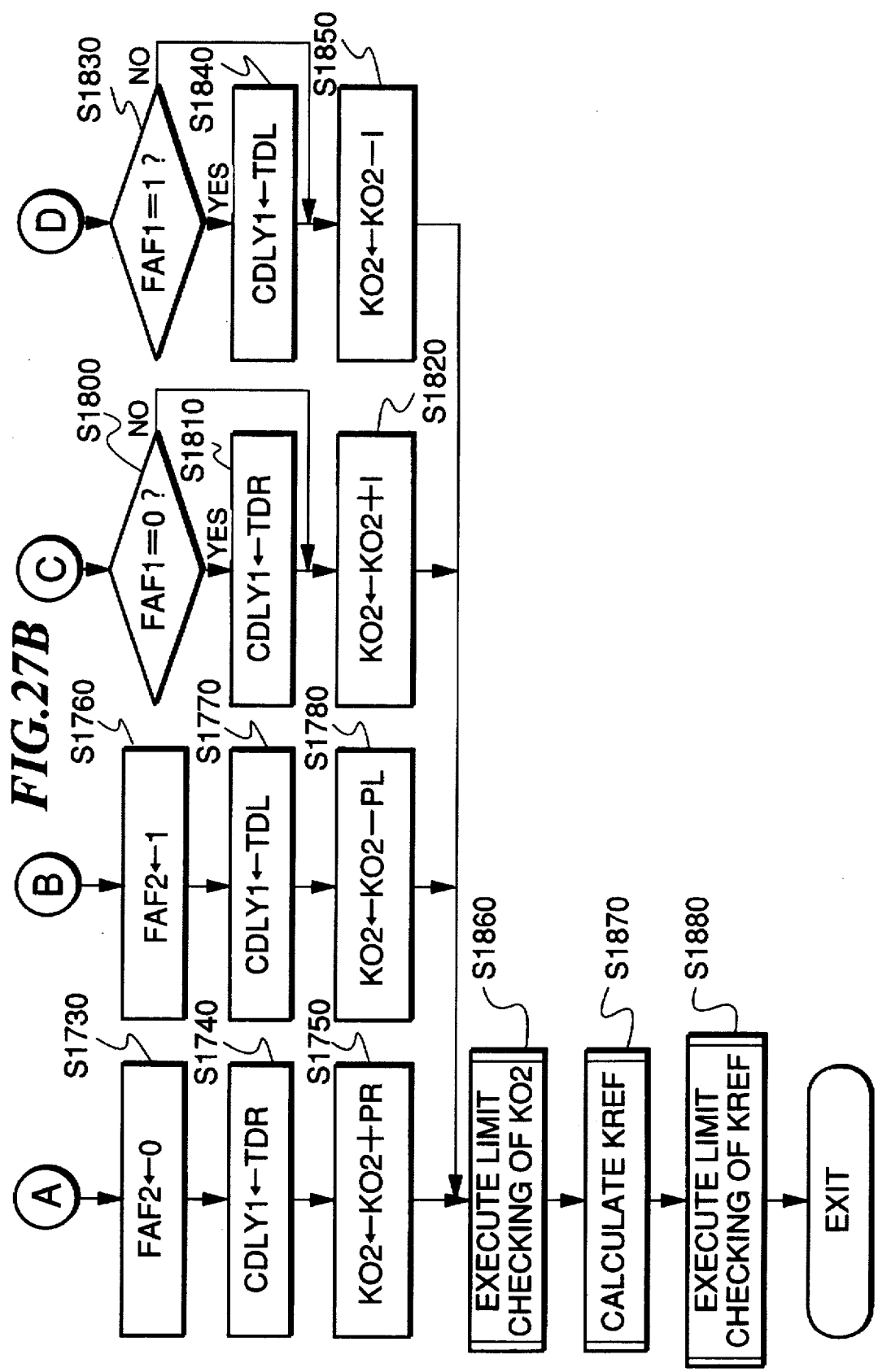
FIG. 27B is a continued part of the flowchart of FIG. 27.

FIGS. 27A and 27B show a program for calculating the air-fuel ratio correction coefficient KO2, based on voltage FRO2 output from the upstream O2 sensor 15.

At a step S1610, first and second lean/rich flags FAT1 and FAT2 are initialized. As shown at (a), and (b) of FIG. 29, the first lean/rich flag FAF1 is set to "1" when the output voltage FVO2 from the upstream O2 sensor 15 is higher than a reference voltage FVREF (e.g. 0.45 V), that is, when the output voltage FVO2 indicates a rich state of the air-fuel ratio, while, as shown at (d) of FIG. 29, the second lean/rich flag FAF2 is set to the same value as that of the flag FAF1 upon the lapse of a predetermined time period from a time point the first lean/rich flag FAF1 is inverted, i.e. a time point the flag FAF1 is changed from "0" to "1" or "1" to "0"

Figure 28:
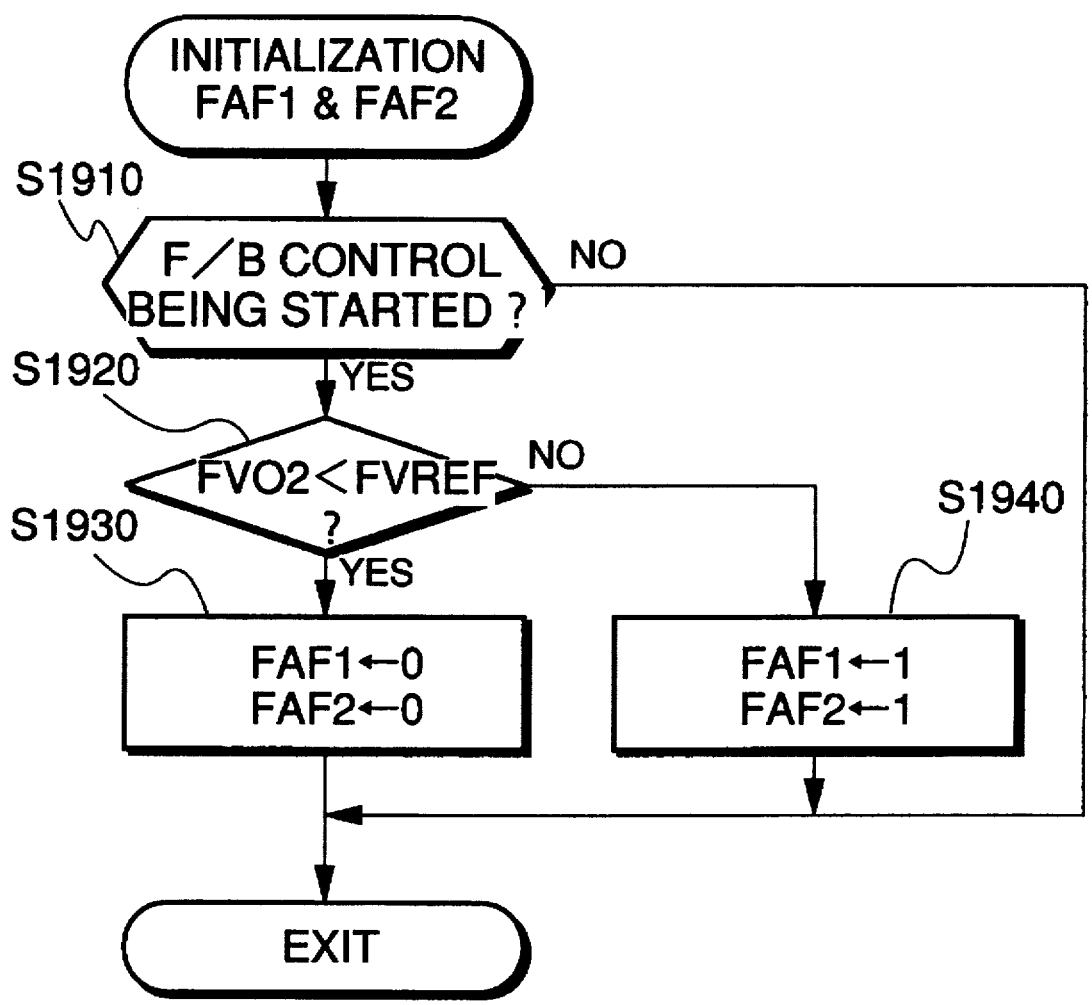
FIG. 28 is a flowchart showing a subroutine for initializing flags FAF1 and FAF2 used in the program of FIGS. 27A and 27B.

The initialization of these flags FAF1 and FAF2 is executed according to a subroutine shown in FIG. 28. Specifically, first, it is determined at a step S1910 whether or not the present loop is immediately after the start of the feedback control, i.e. whether or not the open-loop control was executed in the last loop and the feedback control has just been started in the present loop. If it is determined that the present loop is not the first loop of execution of the feedback control, it is not required to initialize the flags FAF1 and FAF2, and therefore the present program is immediately terminated.

If the present loop is the first loop of execution of the feedback control, it is determined at a step S1920 whether or not the output voltage FVO2 from the upstream O2 sensor 15 is lower than the reference voltage FVREF. If FVO2<FVREF stands, the first and second lean/rich flags FAF1 and FAF2 are both set to "0" at a step S1930, whereas if FVO2≧FVREF, the flags are both set to "1" at a step S1940.

Referring again to the FIG. 27A program, the KO2 value is initialized at a step S1620. Specifically, if the present loop is immediately after the shift from the open loop control to the feedback control, or if the throttle valve 3 is suddenly opened during the feedback control, a learned value KREF to be calculated at a step S1870, referred to hereinafter, is applied as an initial value of the KO2 value. If the present loop is in a condition other than the above conditions, no initialization of the KO2 value is executed at the step S1620.

At the following step S1630, it is determined whether or not the KO2 value has been initialized in the present loop. If it is determined that the KO2 value has been initialized, the program jumps to a step S1790, whereas if the initialization has not been executed, the program proceeds to a step S1640.

When the feedback control is being started, the answer to the question of the step S1630 is affirmative (YES), and hence at steps S1790 to S1840 an initial value of a P term-generation delay counter CDLY1 is set and integral control (I term control) of the KO2 value is executed in response to the values of the lean/rich flags FAF1 and FAF2. The counter CDLY1 measures, as shown at (b), (c) and (d) in FIG. 29, a delay time from a time point the first lean/rich flag FAF1 is inverted to a time point the second lean/rich flag FAF2 is inverted, i.e. a time period from a time point the O2 sensor output FVO2 is inverted to a time point the proportional control (P term control) is executed.

At the step S1790, it is determined whether or not the second lean/rich flag FAF2 has been set to "0". If FAF2="0", the program proceeds to the step S1800 of FIG. 28B, wherein it is determined whether or not the first lean/rich flag FAF1 has been set to "0". On the other hand, if FAF2="1", the program proceeds to the step S1830 of FIG. 28B, wherein it is determined whether or not the first lean/rich flag FAF1 is set to "1". When the feedback control is being started, if FVO2<FVREF, both of the flags FAF1 and FAF2 are set to "0" (see FIG. 28), and therefore the program proceeds via the steps S1790 and S1800 to the step S1810, wherein the counter CDLY1 is set to a predetermined negative value TDR. If FVO2≧FVREF, the flags FAF1 and FAF2 are both set to "1", and therefore the program proceeds via the steps S1790 and S1830 to the step S1840, wherein the counter CDLY1 is set to a predetermined positive value TDL. If both of the flags FAF1 and FAF2 are not equal to "0" or "1", the counter CDLY1 is not initialized. If FAF2=0, a predetermined value I is added to the KO2 value at the step S1820, whereas if FAF2=1, the predetermined value I is subtracted from the KO2 value at the step S1850, followed by the program proceeding to a step S1860. In the present embodiment, the TDR and TDL values are fixed values, whereas in a second embodiment, described hereinafter, they are varied in response to the O2 storage amount O2STR value.

If the answer to the step S1630 of FIG. 27A is negative (NO), i.e. if the KO2 value has not been initialized in the present loop, the program proceeds to the step S1640, wherein it is determined whether or not the upstream O2 sensor output voltage FVO2 is lower than the reference voltage FVREF. If FVO2<FVREF, the program proceeds to a step S1650, wherein the first lean/rich flag FAF1 is set to "0" and the P-term generation delay counter CDLY1 is decremented by "1" (see T4 and T10 at (c) in FIG. 29). Then, it is determined at a step S1660 whether or not the count value of the counter CDLY1 is smaller than the predetermined negative value TDR. If CDLY1<TDR, the counter CDLY1 is set to the value TDR at a step S1670, whereas if CDLY≧TDR, the program jumps to a step S1710.

Figure 29:
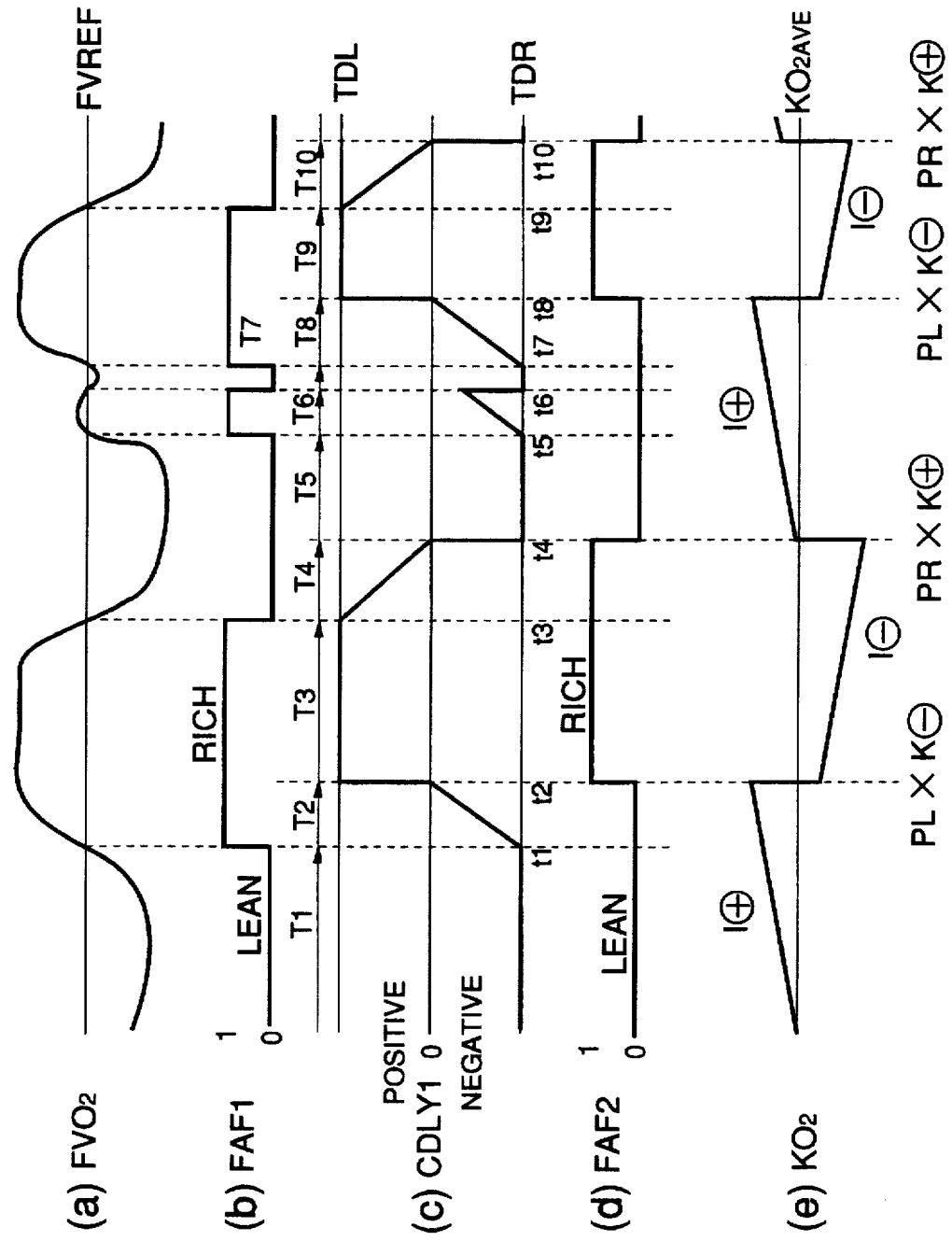
FIGS. 29 is a timing chart useful in explaining the calculation of the KO2 value by the program of FIGS. 27A, 27B and 28.

If the answer to the step S1640 is negative (NO), i.e. if FVO2≧FVREF, the first lean/rich flag FAF1 is set to "1" and the counter CDLY1 is incremented by 1 at a step S1680 (see T2, T6 and T8 at (c) in FIG. 29). Then, it is determined at a step S1690 whether or not the count Value of the counter CDLY1 is smaller than the predetermined positive value TDL. If CDLY1≧TDL, the counter CDLY1 is set to the value TDL at a step S1700, whereas if CDLY1<TDL, the program jumps to the step S1710.

In this way, the steps S1660, S1670, S1690 and S1700 function so that the count value of the counter CDLY1 does not become smaller than the predetermined negative value TDR nor larger than the predetermined positive value TDL.

At the step S1710, it is determined whether or not the sign (plus or minus sign) of the count value of the counter CDLY1 has been inverted. If the sign has not been inverted, the I term control is executed at the steps S1790 to S1850, whereas if the sign has been inverted, the P term control is executed at steps S1720 to S1780.

At the step S1720, it is determined whether or not the first lean/rich flag FAF1 has been set to "0". If FAF1=0, the program proceeds to the step S1730 of FIG. 27B, wherein the second lean/rich flag FAF2 is set to "0", and then the count value of the counter CDLY1 is set to the predetermined negative value TDR at the step S1740. Further, the correction coefficient KO2 is calculated at the step S1750 by the use of the following equation (12) (see time points t4 and t10 in FIG. 29):

$$KO2=KO2+(PR1+PR2) \quad (12)$$

where PR1 represents a first enriching proportional term (P term) responsive to the output from the downstream O2 sensor obtained from a program of FIG. 32, described hereinafter. PR2 represents a second enriching proportional term (P term) responsive to the O2STR value obtained from a program of FIG. 35, described hereinafter, which is set to "0" in the first embodiment.

If the answer to the step S1720 is negative (NO), i.e. if FAF1=1, the second lean/rich flag FAF2 is set to "1" at the step S1760, and the count value of the counter CDLY1 is set to the predetermined positive value TDL at the step S1770. Further, the correction coefficient KO2 is calculated at the step S1780, by the use of the following equation (13) (see time points t2 and t8 in FIG. 29):

$$KO2=KO2-(PL1+PL2) \quad (13)$$

where PL1 represents a first leaning proportional term (P term), which is obtained from the program of FIG. 32, described hereinafter, similarly to the PR1 value. PL2 represents a second leaning proportional term (P term), which is obtained from the program of FIG. 35, described hereinafter, similarly to the PL2 value, which is set to 0 in the first embodiment. At the following step S1860, limit checking of the KO2 value is carried out, and the learned value KREF of the KO2 is calculated at the step S1870. Further, limit checking of the KREF value is carried out at a step S1880, followed by terminating the program.

According to the program of FIGS. 27A and 27B described above, as shown in FIG. 29, the P term control is executed (time points t2, t4, t8 and t10) after a predetermined delay time (T2, T4, T8 and T10) from a time point the upstream O2 sensor output voltage FVO2 is inverted (time points t1, t3, t7 and t9). During a time period over which the second lean/rich flag FAF2 is set to "0", the I term control for increasing the KO2 value is executed (T1, T2 and T5 to T8), whereas during a time period over which the flag FAF2 is equal to "1", the I term control for decreasing the KO2 value is executed (T3, T4, T9 and T10). Incidentally, the O2 sensor output FVO2 varies with a short repetition period over a time period from the time point t5 to the time point t7, however, the period of variation in the sensor output FVO2 is shorter than the delay time of the P term control corresponding to the predetermined negative value TDR1, and therefore, the second lean/rich flag FAF2 is not inverted, resulting in no execution of the P term control over the above time period.

Figure 30:
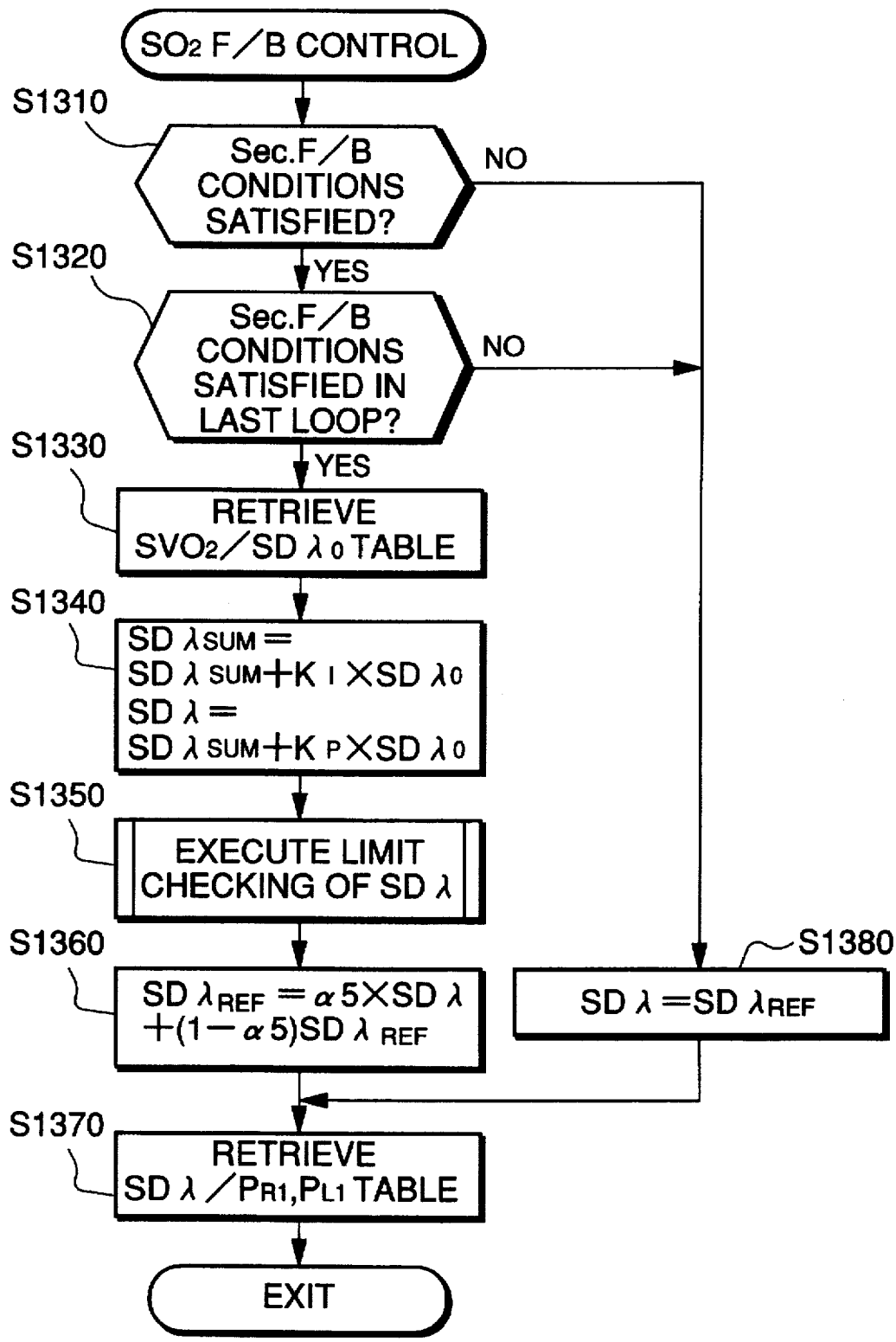
FIG. 30 is a flowchart showing a routine for controlling the air-fuel ratio, based on an output from an O2 sensor downstream of the catalytic converter.
Figure 31:
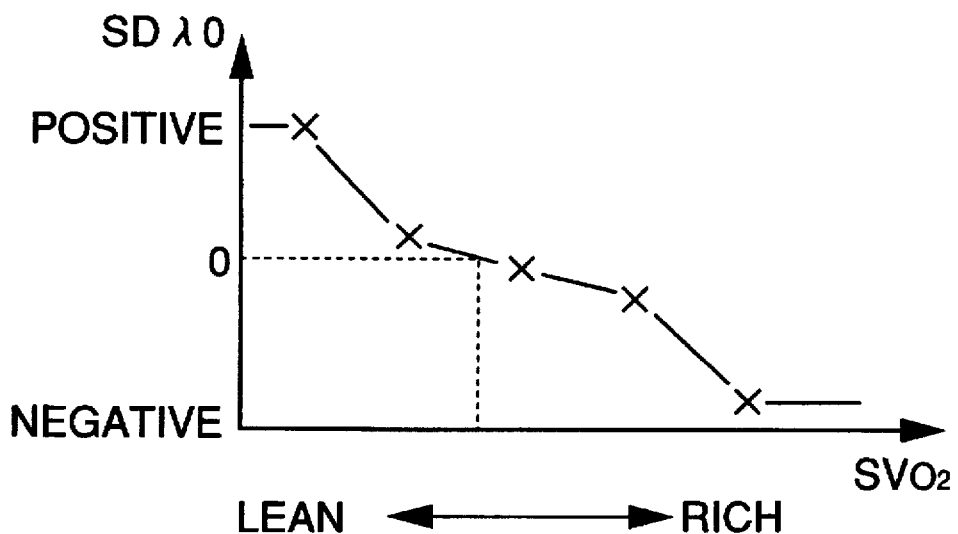
FIG. 31 is a graph showing the relationship between a deviation amount SDλD and an output SVO2 from the downstream O2 sensor.

Next, description will be made of air-fuel ratio feedback control based on the downstream O2 sensor 16, with reference to FIG. 30. First, it is determined at a step S1310 whether or not conditions for executing air-fuel ratio feedback control based on the downstream O2 sensor 16 are satisfied. Then, it is determined at a step S1320 whether or not the above conditions were satisfied in the last loop. If the answers to the steps S1310 and S1320 are both affirmative (YES), a table shown in FIG. 31 is retrieved to determine a deviation amount SD λ0 from the stoichiometric value toward the lean/rich side, based on the output VO2 from the downstream O2 sensor 16, at a step S1330. Then, at a step S1340, proportional and integral calculations are executed based on the deviation amount SDA 0 thus determined, by the use of the following equations (14a) and (14b):

$$SDA\lambda SUM=SD\lambda SUM+KI\times SDA\lambda 0 \quad (14a)$$

$$SDA=SD\lambda SUM+Kp\times SD\lambda 0 \quad (14b)$$

Then, it is determined at a step S1350 whether or not the calculated SDA value exceeds a limit value thereof, and if it exceeds the limit value, the calculated SDλ value is set to the limit value. Then, a learned value SDλ REF of the SDλ value is calculated at a step S1360, by the use of the following equation (15):

$$SD\lambda RE=\alpha 5\times SD\lambda+(1-\alpha 5)\times SD\lambda REF \quad (15)$$

where α5 is an averaging coefficient.

Figure 32:
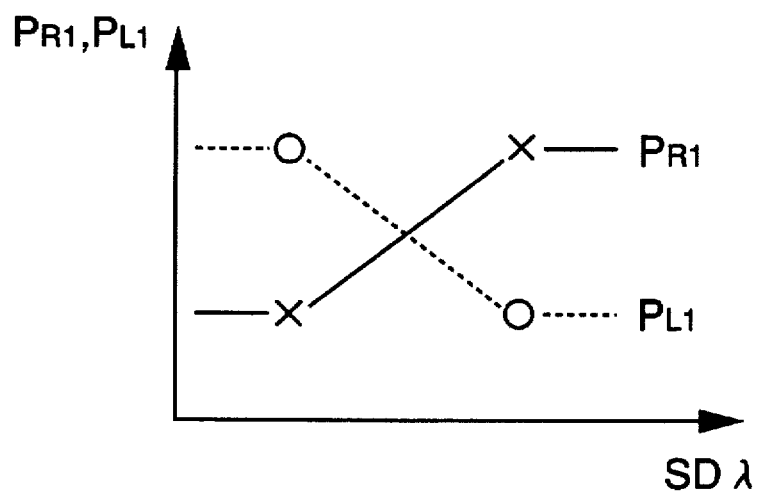
FIG. 32 is a graph showing the relationship between the deviation amount SD λ and P terms PR and PL.

Then, a table shown in FIG. 32 is retrieved to determine first P terms PR1 and PL1 corresponding to the SDA value, at a step S1370. If the conditions for executing the air-fuel ratio feedback control are not satisfied at the step S1310 or S1320, the learned value SDλ REF is applied as the SDλ value at a step S1380, and then the table shown in FIG. 32 is retrieved to determine the first P terms PR1 and PL1 corresponding to the SDλ value thus applied. The first P terms PR1 and PL1 corresponding to the SDλ value are used for calculating the KO2 value in the aforedescribed program for calculating the air-fuel ratio correction coefficient KO2. Thus, the above calculated air-fuel ratio correction coefficient KO2 is reflected upon the fuel injection period TOUT.

In this way, in the air-fuel ratio control carried out using the oxygen utilization factor O2USER, while subjecting the air-fuel ratio to perturbation in a linear or hyperbolic manner, the maximum purification rate dependent on the operating condition of the engine and the state of activation of the catalyst can be secured, thereby making it possible to markedly enhance exhaust emission characteristics, and the purification rate in an excellently responsive manner to changes in the operating condition of the engines.

[Variation of the first embodiment]

Although in the air-fuel ratio control system of the first embodiment, a region of the maximum purification rate is determined by changing the frequencies fpertR, fpertL and the amplitude Kpert, based on control of the oxygen utilization factor O2USER in alternately inverting directions, this is not limitative, but if the frequencies fpertR, fpertL and the amplitude Kpert corresponding to the maximum purification rate dependent on the space velocity SV and the catalytic temperature TCAT are obtained by experiments, it is possible to determine these control parameters from respective maps storing values thereof.

Figure 33:
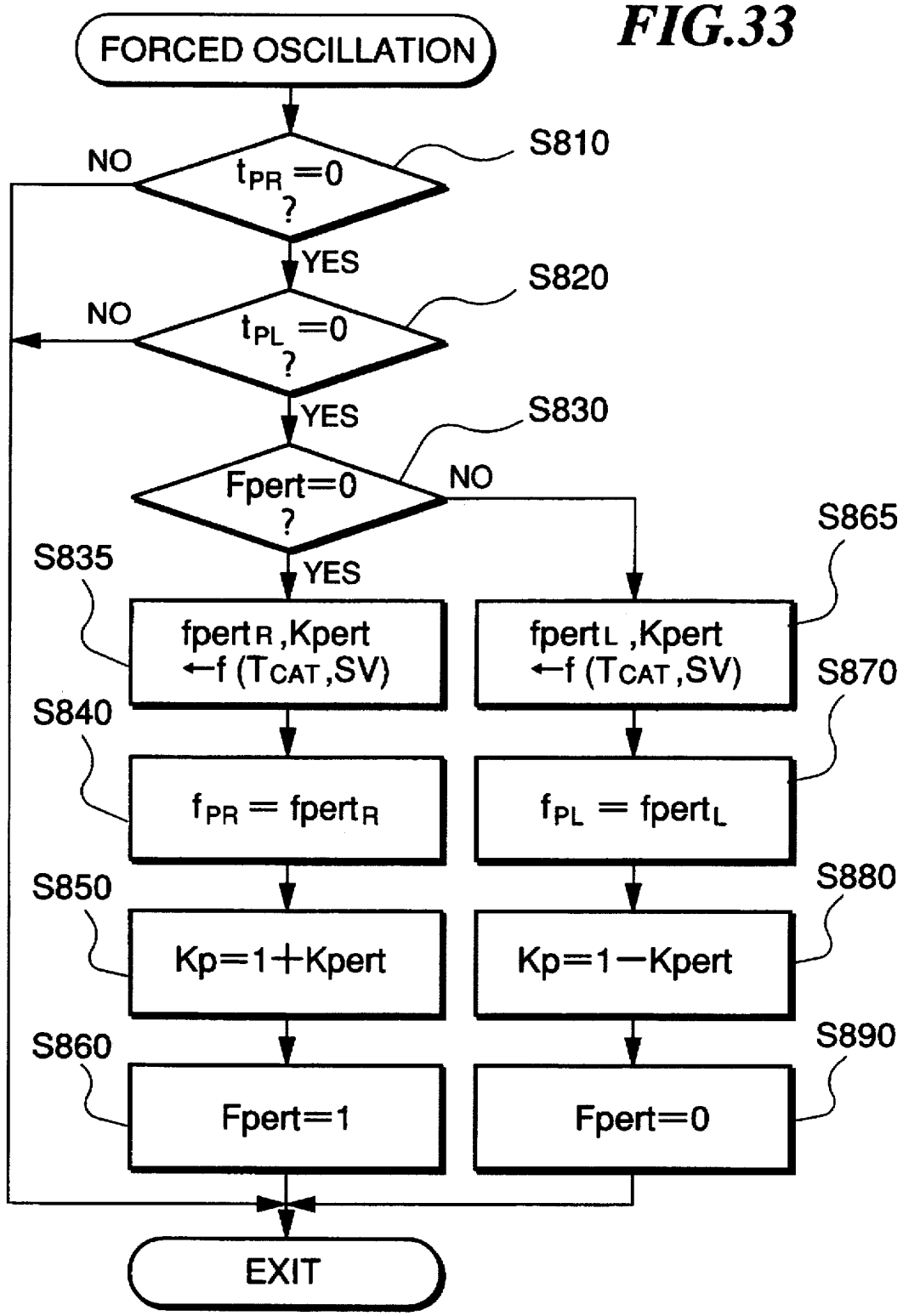
FIG. 33 is a flowchart showing a routine for carrying out forced oscillation of the air-fuel ratio by the use of frequencies fpertR, fpertL, and the amplitude Kpert determined based on a map.

FIG. 33 shows a routine for carrying out forced oscillation by the use of frequencies fpertR, fpertL, and the amplitude Kpert, determined from the maps. This routine corresponds to the routine for carrying out the forced oscillation according to the first embodiment shown in FIG. 18. At a step S835 and at a step S865, a f(TCAT, SV) map is retrieved to determine the frequencies fpertR, fpertL and amplitude Kpert dependent on the space velocity SV representative of the engine operating condition and the catalyst temperature TCAT representative of the state of activation of the catalyst.

Thus, according to the air-fuel ratio control system of the variation of the first embodiment, it is possible to obtain the maximum purification rate according to the space velocity SV and the catalyst temperature TCAT, and hence perform the control with even higher responsiveness.

[Outline of air-fuel ratio control according to the second embodiment]

Next, an air-fuel ratio control system for internal combustion engines according to a second embodiment of the invention will be described.

While in the first embodiment described above, the air-fuel ratio is controlled by changing the amplitude and repetition period of the perturbation such that the O2 utilization factor O2USER is maximized (Processing 8 in FIG. 2), in the second embodiment, the air-fuel ratio is controlled by changing delay times TDR and TDL as air-fuel ratio feedback control constants from the time the output from the downstream O2 sensor is inverted to the time proportional control of the correction coefficient KO2 is executed, and skip amounts (P terms PR and PL) for skipping the correction coefficient KO2, such that the O2USER value is maximized.

Figure 34:
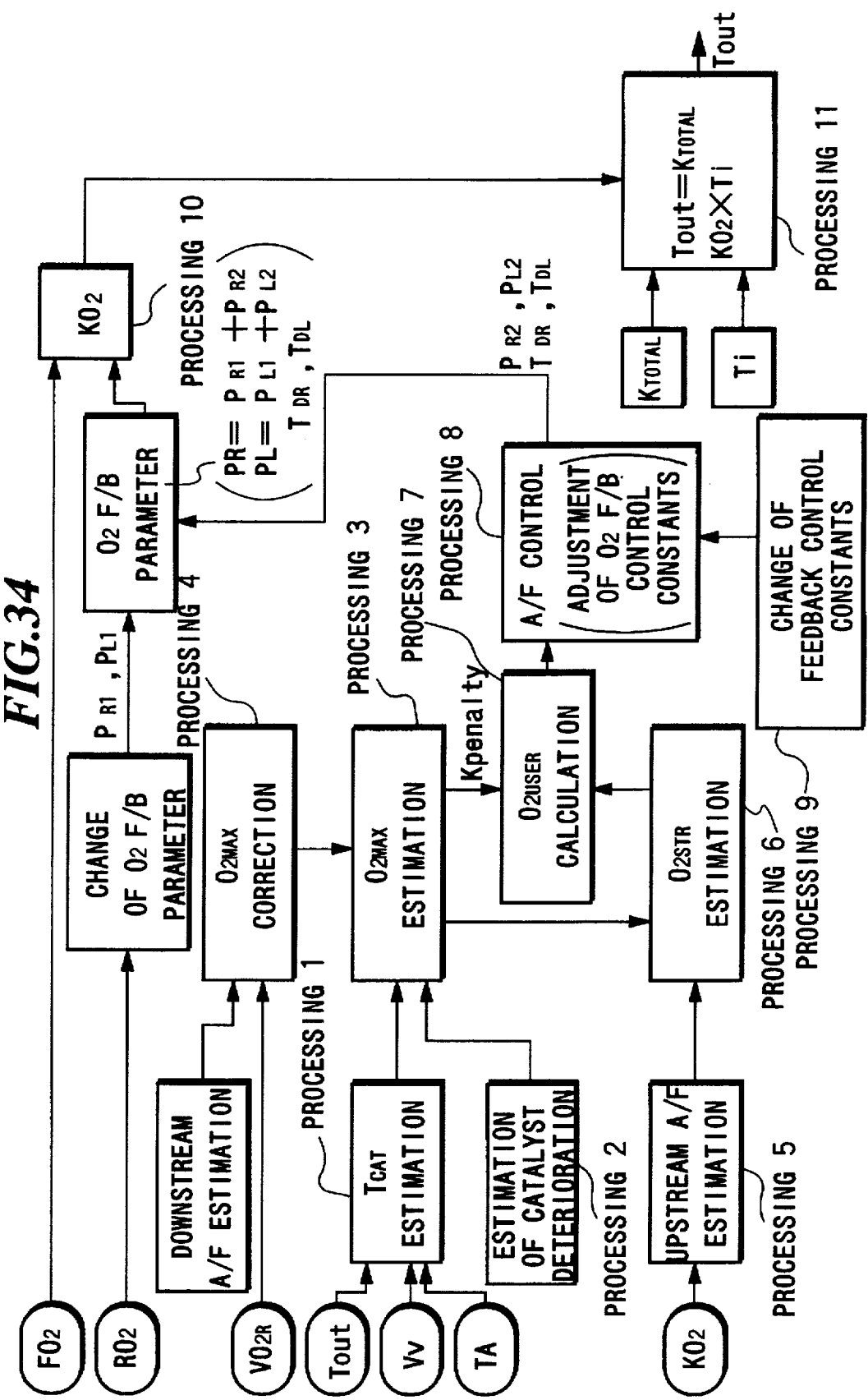
FIG. 34 is a schematic diagram showing an outline of the overall processing of the air-fuel ratio control executed by an air-fuel ratio control system according to a second embodiment of the invention.

FIG. 34 shows the outline of air-fuel ratio control according to the second embodiment. The system employed in the present embodiment is identical in construction and arrangement with that in the first embodiment, except for the processing 8 and its related parts.

The air-fuel ratio control system according to the second embodiment, similarly to the first embodiment, executes estimating the catalyst temperature TCAT (processing 1), estimating deterioration of the catalytic converter 14 (processing 2), estimating the maximum O2 storage amount O2MAX (processing 3), correcting the maximum O2 storage amount O2MAX (processing 4), estimating the air-fuel ratio A/F at a location upstream of the catalytic converter 14 (processing 5), estimating the O2 storage amount O2STR stored in the catalytic convener 14 (processing 6), calculating the O2 utilization factor O2USER of the catalytic converter 14 (processing 7), controlling the air-fuel ratio A/F of a mixture supplied to the engine by adjusting the F/B control constants (PR, PL, TDR, and TDL) of the correction coefficient KO2 in response to the O2 utilization amount O2USE so as to enhance the purification rate of the catalyst (processing 8), changing the F/B control constants (PR, PL, TDR, TDL) depending on operating conditions of the engine 1 (processing 9), calculating the air fuel-ratio correction coefficient KO2 (processing 10), and calculating the fuel injection amount TOUT by the use of the following equation 16 (processing 11):

$$Tout = Ti \times KTOTL \times KO2 \qquad (16)$$

Figure 35:
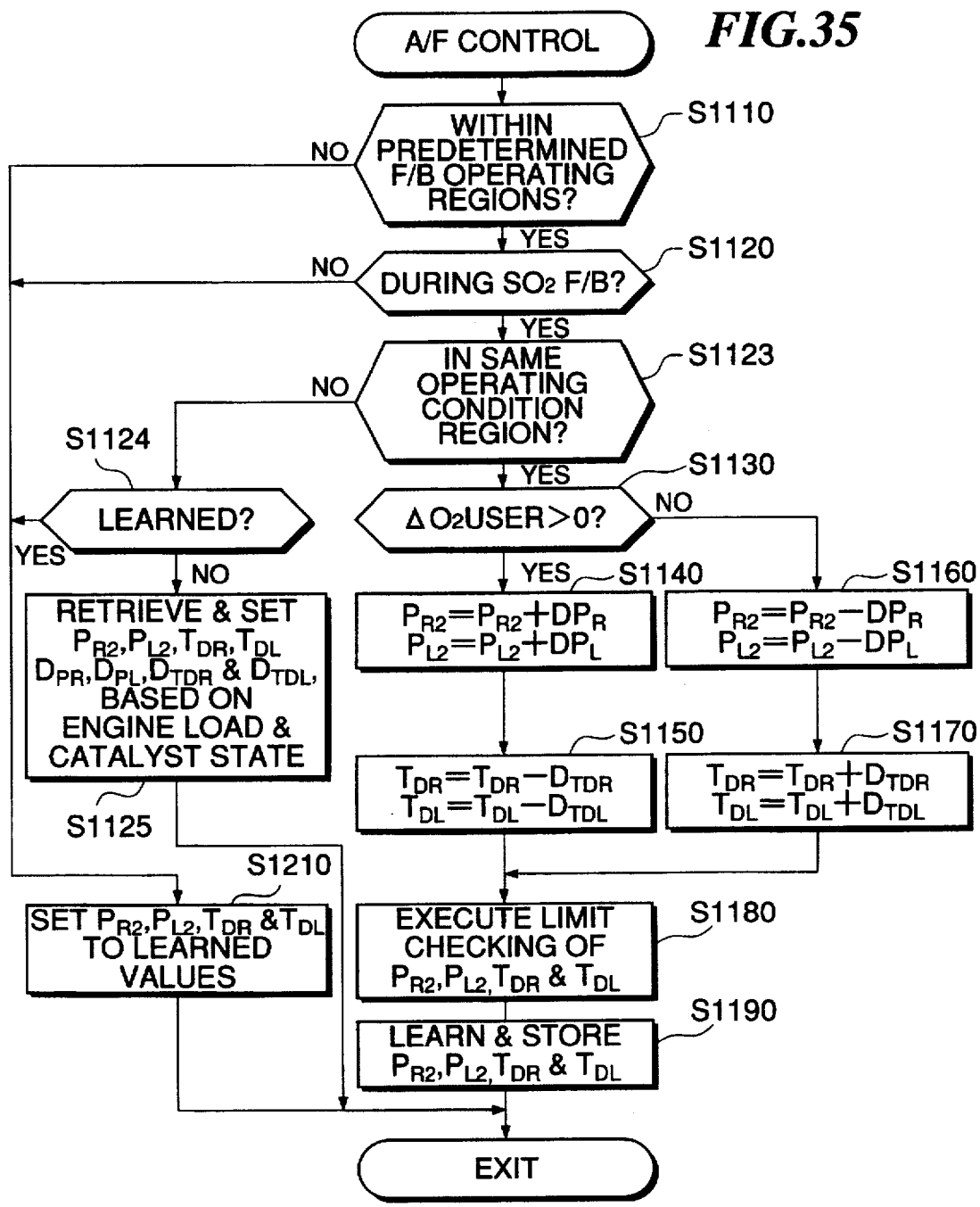
FIG. 35 is a flowchart showing a routine for carrying out the air-fuel ratio control by pseudo-perturbation effected in a linear manner based on the O2 utilization factor O2USER, according to the second embodiment.

FIG. 35 shows a program for controlling the air-fuel ratio A/F (Processing 8) by using the O2 utilization factor O2USER, according to the second embodiment. This routine is executed at predetermined time intervals.

First, at a step S1110 it is determined whether or not the engine is operating in a predetermined air-fuel ratio feedback control region where the intake pipe absolute pressure PBA, the engine rotational speed NE, the vehicle speed V, the throttle valve opening θ TH, etc. are within respective predetermined ranges, and at the same time the PBA value and the θTH value continue to be steady. If the answer to the question is affirmative (YES), it is determined at a step S1120 whether or not the air-fuel ratio feedback control responsive to the output from the downstream O2 sensor 16 is being executed. If the answer is affirmative (YES), it is determined at a step S1123 whether or not the engine has been continuing to be in the same condition. If the answer to the question is negative (NO), it is determined at a step S1124 whether or not the P terms PR2 and PL2 and the enriching and leaning inversion delay times TDR and TDL have already been learned. If the answer to this question is affirmative (YES), the learned values are set as values PR2, PL2, TDR, and TDL, at a step S1210, followed by terminating the program. If the answer to the question of the step S1124 is negative (NO), a SV/TCAT map, not shown, is searched according to the SV value and the TCAT value for initial values of the second P terms PR2 and PL2 on the richer side and the leaner side and the enriching and leaning inversion delay times TDR and TDL, and amounts of changes DPR, DPL in the P terms and amounts of changes DTDR, DTDL in the enriching and leaning inversion delay times TDR and TDL are also set according to the space velocity SV and the catalyst temperature TCAT, at a step S1125, followed by terminating the program. The amounts of changes DTDR, DTDL in the enriching and leaning inversion delay times TDR and TDL are set to such values that the frequency of the pseudo-perturbation changes on the linear path as described hereinabove with reference to FIG. 22 in the first embodiment.

Then, the present routine is carried out again, and if the answer to the question of the step S1123 is affirmative (YES), i.e. if the operating condition of the engine has not changed, it is determined at a step S1130 whether the O2USER value is in the increasing direction or in the decreasing direction. If the O2USER value is in the increasing direction, the second P terms PR2 and PL2 are increased by adding predetermined values DPR and DPL to the immediately preceding values of the second P terms PR2 and PL2, respectively, at a step S1140, and then the enriching and leaning inversion delay times TDR and TDL are decreased by subtracting predetermined values DTDR and DTDL from the immediately preceding values of the delay times TDR and TDL, respectively, at a step S1150. Increases in the second enriching and leaning P terms PR2 and PL2, and decreases in the enriching and leaning inversion delay times TDR and TDL correspond to increases in the amplitude Kpert and decrease in the frequency (fpertR, fpertL) of the A/F perturbation according to the first embodiment. On the other hand, if the O2USER value is in the decreasing direction, the second enriching and leaning P terms PR2 and PL2 are decreased by subtracting the DPR and DPL values from the immediately preceding values, respectively, at a step S1160, and then the enriching and leaning inversion delay times TDR and TDL are increased by adding the DTDR and DTDL values to the immediately preceding values, respectively, at a step S1170. By thus changing the P terms PR2 and PL2 and the rich/lean inversion delay times TDR, TDL, it is possible to carry out the pseudo-perturbation similar to the perturbation carried out in the first embodiment, with the area (ΔA/F×T) being held constant.

Next, it is determined at a step S1180 whether or not the second P terms PR2 and PL2, and the delay times TDR and TDL exceed respective limit values, and if any of the values exceeds the corresponding limit value, limit checking thereof is carried out. Then, at a step S1190 learned values of the second P terms PR2 and PL2, and the delay times TDR and TDL are calculated and stored.

On the other hand, if the engine is not in the F/B control region at the step S1110, or if the air-fuel ratio F/B control responsive to the output from the downstream O2 sensor 16 is not being executed at the step S1120, the second P terms PR2 and PL2 and the delay times TDR and TDL are set to the learned values calculated up to the last loop, at a step S1210.

The air-fuel ratio correction coefficient KO2 is calculated based on the second P terms PR2 and PL2 and the delay times TDR and TDL obtained as above, in a manner similar to the first embodiment in Processing 10. The correction coefficient KO2 thus calculated is used in Processing 11 to multiply the basic fuel injection amount Ti together with the correction coefficient KTOTAL to determine the fuel injection amount Tout by the use of the aforementioned equation (16). The air-fuel ratio coefficient KO2 is calculated in the same manner as described in the first embodiment.

Figure 36:
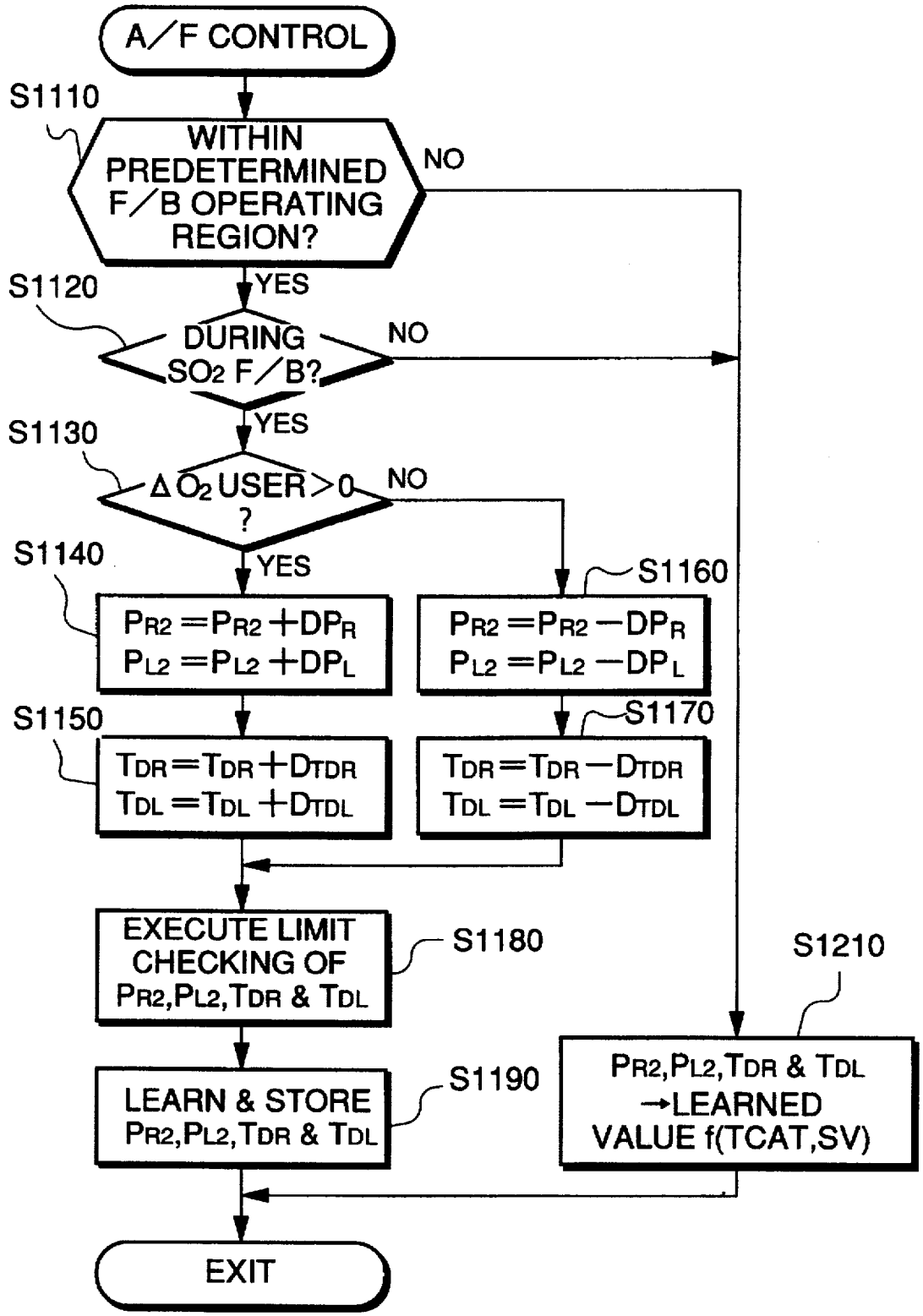
FIG. 36 is a flowchart showing a routine for carrying out the air-fuel ratio control by pseudo-perturbation effected in a hyperbolic manner, according to the second embodiment.

Further, instead of carrying out the pseudo-perturbation in a linear manner, it is possible to carry out the pseudo-perturbation in a hyperbolic manner, in a manner similar to the first embodiment. FIG. 36 shows an air-fuel ratio control routine in which the pseudo-perturbation is carried out in a hyperbolic manner. This routine is distinguished from the foregoing pseudo-perturbation in a linear manner in that the steps S1123, S1125 are omitted, and the steps S1150 and S1170 are modified. That is, first at a step S1110 it is determined whether or not the engine is operating in a predetermined air-fuel ratio feedback control region where the intake pipe absolute pressure PBA, the engine rotational speed NE, the vehicle speed V, the throttle valve opening θTH, etc. are within respective predetermined ranges, and at the same time the PBA value and the θTH value continue to be steady. If the answer to this question is affirmative (YES), it is determined at a step S1120 whether or not the air-fuel ratio feedback control responsive to the output from the downstream O2 sensor 16 is being executed. If the answer to the question of the step S1110 or S1120 is negative (NO), the program proceeds to a step S1210, where a SV/TCAT map, not shown, is searched according to the SV value and the TCAT value for initial values of the second P terms PR2 and PL2 on the richer side and the leaner side and the enriching and leaning inversion delay times TDR and TDL, and amounts DPR, DPL of changes in the P terms and amounts DTDR, DTDL of changes in the enriching and leaning inversion delay times TDR and TDL are also set according to the space velocity SV and the catalyst temperature TCAT, at a step S1125, followed by terminating the program. If the answer to the question of the step S1120 is affirmative (YES), it is determined at a step S1130 whether the O2USER value is in the increasing direction or in the decreasing direction. If the O2USER value is in the increasing direction, the second P terms PR2 and PL2 are increased by adding predetermined values DPR and DPL to the immediately preceding values of the second P terms PR2 and PL2, respectively, at a step S1140, and then the enriching and leaning inversion delay times TDR and TDL are increased by adding predetermined values DTDR and DTDL to the immediately preceding values of the delay times TDR and TDL, respectively, at a step S1150A. Increases in the second enriching and leaning P terms PR2 and PL2, and increases in the enriching and leaning inversion delay times TDR and TDL correspond to increases in the amplitude Kpert and increase in the frequency (fpertR, fpertL) of the A/F perturbation according to the first embodiment. On the other hand, if the O2USER value is in the decreasing direction, the second enriching and leaning P terms PR2 and PL2 are decreased by subtracting the DPR and DPL values from the immediately preceding values, respectively, at a step S1160, and then the enriching and leaning inversion delay times TDR and TDL are decreased by subtracting the DTDR and DTDL values from the immediately preceding values, respectively, at a step S1170A. The amounts of changes TDR, TDL in the rich/lean inversion delay times are set to such values that the frequency of the pseudo-perturbation varies by a value of integer on the hyperbolic path shown in FIG. 23 in the first embodiment. Then, it is determined at a step S1180 whether or not the second P terms PR2 and PL2, and the delay times TDR and TDL exceed respective limit values, and if any of the values exceeds the corresponding limit value, the excessive value is set to the corresponding limit value. Then, at a step S1190, the second P terms PR2, PL2, and the delay times TDR, TDL are learned and the learned values are stored into a SV/TCAT map, not shown. By thus changing the P terms PR2, PL2, and the rich/lean inversion delay times TDR, TDL, it is possible to carry out the perturbation control in a hyperbolic manner similarly to the first embodiment.

The amounts of changes DDR, DRL of the D term gains and the amounts of changes DTDR, DTDL of the rich/lean inversion delay times applied to the equations at the steps S1140, S1150, S1160, and S1170 are varied according to the space velocity SV and the catalyst temperature TCAT.

As described heretofore, according to the second embodiment, it is possible to markedly improve the exhaust emission characteristics, similarly to the first embodiment. Moreover, the pseudo-perturbation carried out in the ordinary air-fuel ratio control can dispense with the forcible oscillation processing routine carried out in the first embodiment.

[Variation of the second embodiment]

Similarly to the first embodiment, although in the second embodiment,if the P terms PR2, PL2 and the rich/lean inversion delay times TDR, TDL dependent on the space velocity SV and the catalytic temperature TCAT are obtained empirically, it is possible to directly determine these control parameters from respective respective maps in which those values obtained empirically are set, according to the space velocity SV and the catalyst temperature TCAT.

Figure 37A:
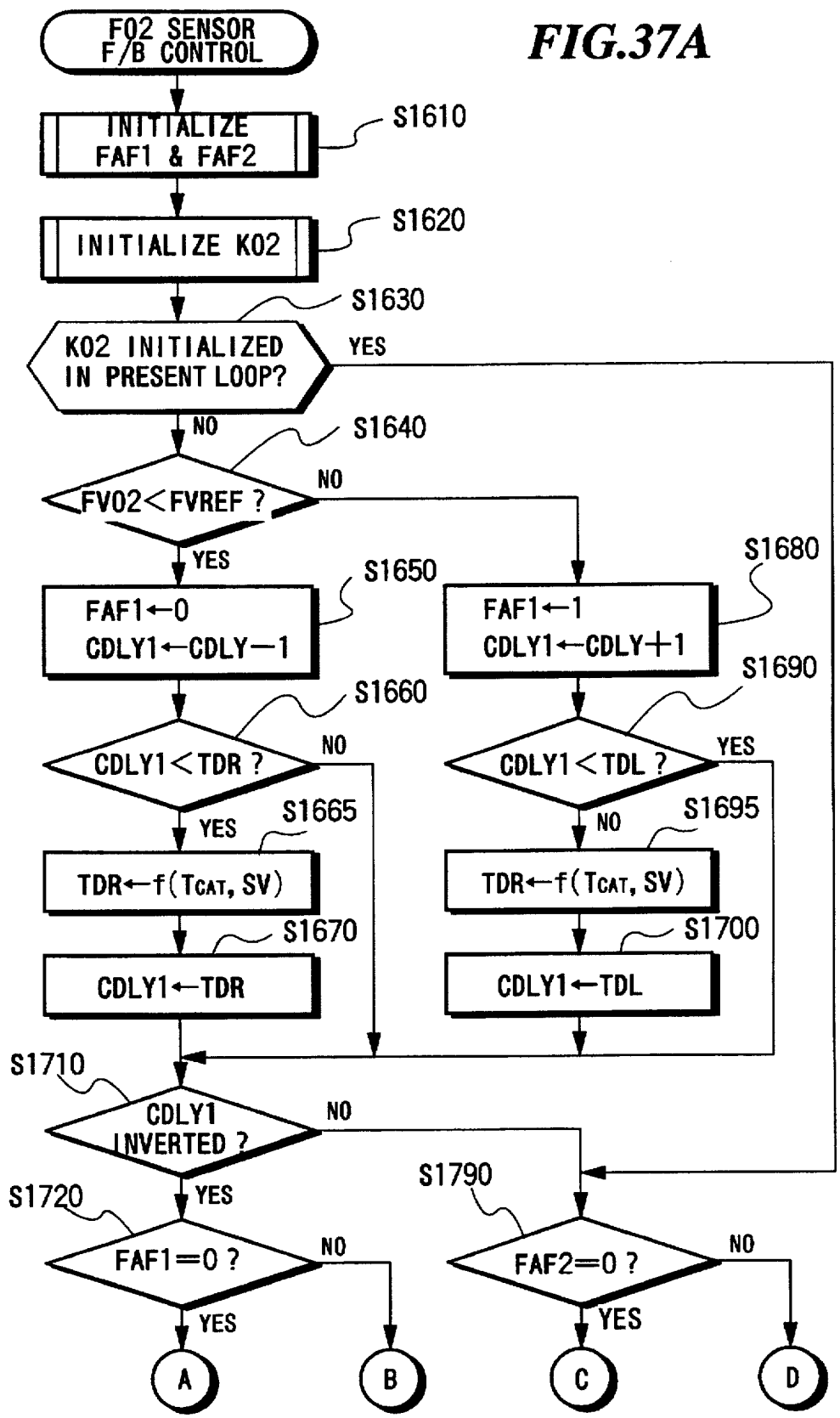
FIG. 37A is a flowchart showing a routine for calculating the air-fuel ratio correction coefficient KO2 based on P terms PR2, L2, and lean-rich delay time periods TDR, TDL determined based on a map.
Figure 37B:
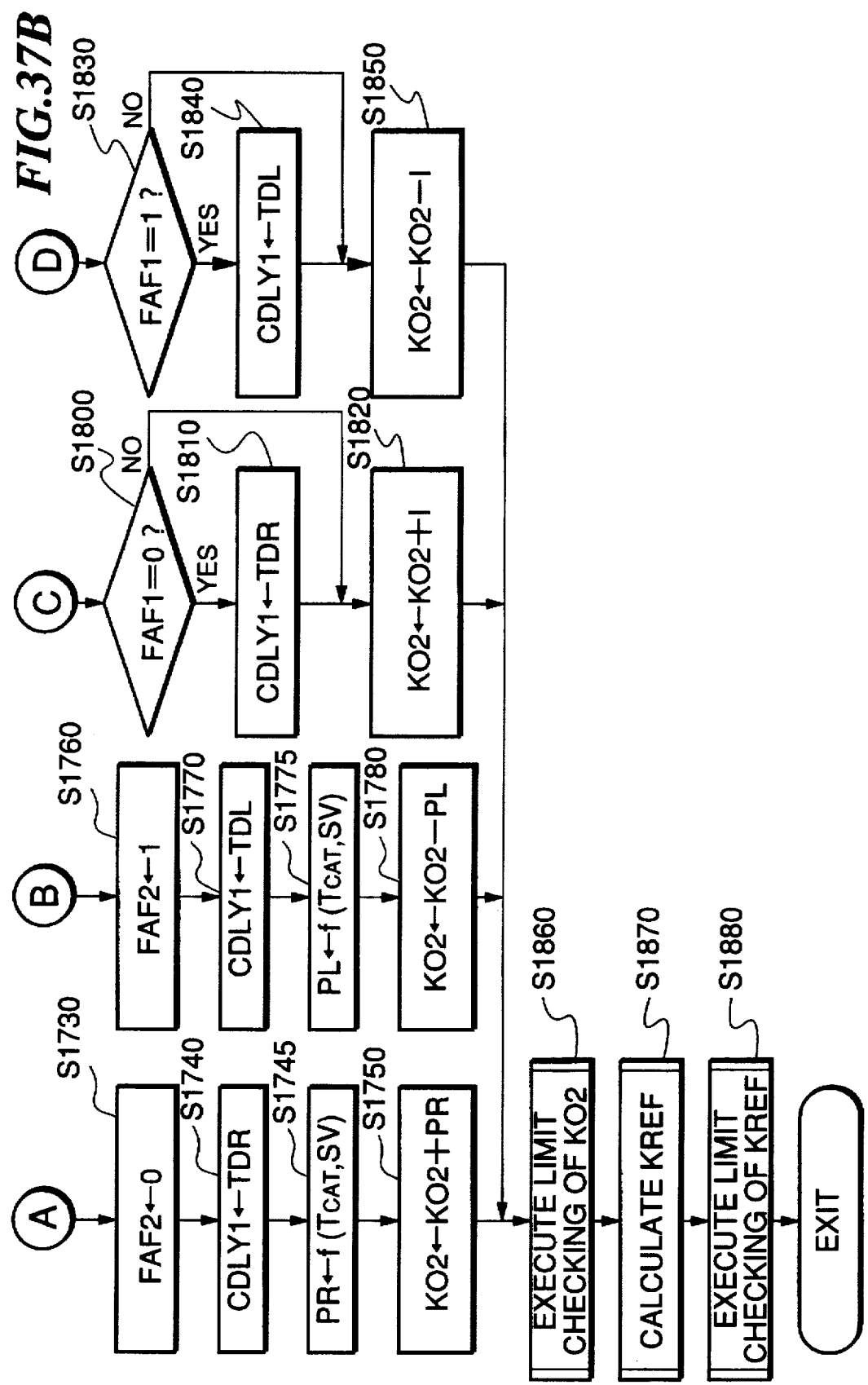
FIG. 37B is a continued part of the flowchart of FIG. 37A.

FIG. 37A and FIG. 37B show a routine for calculating the air-fuel ratio correction coefficient KO2 based on the P terms PR2, PL2 and the rich/lean inversion delay times TDR, TDL which are determined by the maps. The routine of FIG. 37A and FIG. 37B correspond to FIG. 27A and FIG. 27B of the first embodiment.

At a step S166 and at a step S1695, the rich/lean delay times TDR, TDL are directly determined from f(TCAT, SV) maps, respectively, and at a step S1745 and at a step S1775, the P terms PR, PL are directly determined by f(TCAT, SV) maps, which makes it possible to carry out the maximum purification rate control in a manner even more responsive to operating conditions of the engine.

What is claimed is:

1. An air-fuel ratio control system for an internal combustion engine having an exhaust passage, and a catalytic converter arranged in said exhaust passage, comprising:
   maximum oxygen storage amount-calculating means for calculating a maximum oxygen storage amount indicative of the maximum amount of oxygen that can be stored in said catalytic converter;
   forcible oscillating means for forcibly oscillating an air-fuel ratio of a mixture supplied to said engine at a predetermined frequency and a predetermined amplitude;
   oscillation-changing means for changing at least one of said predetermined frequency and said predetermined amplitude at a predetermined rate of change; and
   change rate-setting means for setting said predetermined rate of change of said at least one of said predetermined frequency and said predetermined amplitude, in dependence on said maximum oxygen storage amount.

2. An air-fuel ratio control system according to claim 1, wherein said maximum oxygen storage amount-calculating means calculates said maximum oxygen storage amount based on at least one of temperature of a catalyst of said catalytic converter and a degree of deterioration of said catalytic converter.

3. An air-fuel ratio control system for an internal combustion engine having an exhaust passage, and a catalytic converter arranged in said exhaust passage, comprising:
   exhaust gas amount-calculating means for calculating an exhaust gas amount indicative of an amount of exhaust gases supplied to said catalytic converter;
   forcible oscillating means for forcibly oscillating an air-fuel ratio of a mixture supplied to said engine at predetermined frequency and a predetermined amplitude;

oscillation-changing means for changing at least one of said predetermined frequency and said predetermined amplitude at a predetermined rate of change; and change rate-setting means for setting a predetermined rate of change of said at least one of said predetermined frequency and said predetermined amplitude in dependence on said exhaust gas amount.

4. An air-fuel ratio control system according to claim 3, wherein said exhaust gas amount-calculating means determines said exhaust gas amount, based on load on said engine and rotational speed of said engine.

5. An air-fuel ratio control system for an internal combustion engine having an exhaust passage, a catalytic converter arranged in said exhaust passage, and an oxygen sensor arranged in said exhaust passage at a location upstream of said catalytic converter, comprising:

maximum oxygen storage amount-calculating means for calculating a maximum oxygen storage amount indicative of the maximum amount of oxygen that can be stored in said catalytic converter;

air-fuel ratio feedback control means for calculating an air-fuel ratio feedback control amount, based on an output from said oxygen sensor and a feedback control constant;

control amount-changing means for changing said air-fuel ratio feedback control constant at a predetermined rate of change; and change rate-setting means for setting said predetermined rate of change of said feedback control constant, based on said maximum oxygen storage amount.

6. An air-fuel ratio control system according to claim 5, wherein said maximum oxygen storage amount-calculating means calculates said maximum oxygen storage amount, based on at least one of temperature of a catalyst of said catalytic converter and a degree of deterioration of said catalytic converter.

7. An air-fuel ratio control system according to claim 5, wherein said air-fuel ratio feedback control constant comprises a proportional term and a delay time period for delaying operation of said 5 proportional term after said output from said oxygen sensor is inverted.

8. An air-fuel ratio control system for an internal combustion engine having an exhaust passage, a catalytic converter arranged in said exhaust passage, and an oxygen. sensor arranged in said exhaust passage at a location upstream of said catalytic converter, comprising:

exhaust gas amount-calculating means for calculating an exhaust gas amount indicative of an amount of exhaust gases supplied to said catalytic converter;

air-fuel ratio feedback control means for calculating an air-fuel ratio feedback control amount, based on an output from said oxygen sensor and a feedback control constant;

control amount-changing means for changing said air-fuel ratio feedback control constant at a predetermined rate of change; and change rate-setting means for setting said predetermined rate of change of said feedback control constant, based on said exhaust gas amount.

9. An air-fuel ratio control system according to claim 8, wherein said exhaust gas amount-calculating means determines said amount of exhaust gases, based on load on said engine and rotational speed of said engine.

10. An air-fuel ratio control system according to claim 8, wherein said air-fuel ratio feedback control constant comprises a proportional term and a delay time period for delaying operation of said proportional term after said output from said oxygen sensor is inverted.

11. An air-fuel ratio control system for an internal combustion engine having an exhaust passage, and a catalytic converter arranged in said exhaust passage, comprising:

maximum oxygen storage amount-calculating means for calculating a maximum oxygen storage amount indicative of the maximum amount of oxygen that can be stored in said catalytic converter;

exhaust gas amount-calculating means for calculating an exhaust gas amount indicative of an amount of exhaust gases supplied to said catalytic converter;

forcible oscillating means for forcibly oscillating an air-fuel ratio of a mixture supplied to said engine at a predetermined frequency and a predetermined amplitude; and setting means for setting said predetermined frequency and said predetermined amplitude, in dependence on said maximum oxygen storage amount and said exhaust gas amount.

12. An air-fuel ratio control system for an internal combustion engine having an exhaust passage, a catalytic converter arranged in said exhaust passage, and an oxygen sensor arranged in said exhaust passage at a location upstream of said catalytic converter, comprising:

control amount-calculating means for calculating an air-fuel ratio feedback control amount, based on a predetermined Proportional term when a predetermined delay time period elapses after said output from said oxygen sensor is inverted.

maximum oxygen storage amount-calculating means for calculating a maximum oxygen storage amount indicative of the maximum amount of oxygen that can be stored in said-catalytic converter;

exhaust gas amount-calculating means for calculating an exhaust gas amount indicative of an amount of exhaust gases supplied to said catalytic converter; and setting means for setting said predetermined proportional term and said predetermined delay time period, in dependence on said maximum oxygen storage amount and said exhaust gas amount.

13. An air-fuel ratio control system for an internal combustion engine having an exhaust passage, and a catalytic converter arranged in said exhaust passage, comprising:

oxygen amount-calculating means for calculating an amount of oxygen stored in said catalytic converter;

maximum oxygen storage amount-calculating means for calculating a maximum oxygen storage amount indicative of the maximum amount of oxygen that can be stored in said catalytic converter;

air-fuel ratio control means for controlling an air-fuel ratio of a mixture supplied to said engine such that said amount of oxygen stored in said catalytic converter falls within a predetermined range within said maximum oxygen storage amount; and changing means for changing said predetermined range in dependence on operating conditions of said engine.

14. An air-fuel ratio control system according to claim 13, wherein said operating conditions of said engine includes temperature of said catalytic converter, and said predetermined range is set to a smaller range as said temperature of said catalytic converter is lower.

15. An air-fuel ratio control system according to claim 13, wherein said operating conditions of said engine include deterioration of said catalytic converter, and said predetermined range is set to a smaller range when said catalytic converter is in a deteriorated state.

16. An air-fuel ratio control system according to claim 13, wherein said operating conditions of said engine include coolant temperature of said engine, and said predetermined range is set to a smaller range as said engine coolant temperature is lower.

17. An air-fuel ratio control system for an internal combustion engine having a cylinder block, an exhaust passage extending from said cylinder block, and a catalytic converter arranged in said exhaust passage, comprising:

an oxygen sensor arranged in said exhaust passage at a location upstream of said catalytic converter;

control amount-calculating means for calculating an air-fuel ratio feedback control amount, based on an output from said oxygen sensor;

air-fuel ratio control means for controlling an air-fuel ratio of a mixture supplied to said engine based on said air-fuel ratio feedback control amount;

first air-fuel ratio-estimating means for estimating an air-fuel ratio of exhaust gases in said exhaust passage at a location immediately downstream of said cylinder block from an amount of variation of said air-fuel ratio feedback control amount relative to an average value of said air-fuel ratio feedback control amount; and second air-fuel ratio-estimating means for estimating an air-fuel ratio of exhaust gases in said exhaust passage at a location immediately upstream of said catalytic converter from an averaged air-fuel ratio obtained by averaging said air-fuel ratio of said exhaust gases at said location immediately downstream of said cylinder block by the use of a predetermined averaging time constant.

18. An air-fuel ratio control system according to claim 17, wherein said predetermined averaging time constant is determined based on operating conditions of said engine.

19. An air-fuel ratio control system according to claim 17, including a second oxygen sensor arranged in said exhaust passage at a location downstream of said catalytic converter, and correcting means for correcting said air-fuel ratio of exhaust gases at said location immediately upstream of said catalytic converter, based on an output from said second oxygen sensor.

20. An air-fuel ratio control system according to claim 17, wherein said air-fuel ratio control means controls the air-fuel ratio of said mixture supplied to said engine, based on said air-fuel ratio of said exhaust gases at said location immediately upstream of said catalytic converter.

21. An air-fuel ratio control system for an internal combustion engine having an exhaust passage, and a catalytic converter arranged in said exhaust passage, comprising:

an oxygen sensor arranged in said exhaust passage at a location upstream of said catalytic converter;

control amount-calculating means for calculating an air-fuel ratio feedback control amount, based on an output from said oxygen sensor;

air-fuel ratio control means for controlling an air-fuel ratio of a mixture supplied to said engine, based on said air-fuel ratio-feedback control amount;

first averaging means for averaging said air-fuel ratio feedback control amount by a first averaging time constant;

second averaging means for averaging said air-fuel ratio feedback control amount by a second averaging time constant; and air-fuel ratio-calculating means for calculating an air-fuel ratio of exhaust gases at a location immediately upstream of said catalytic converter, based on an output from said first averaging means and an output from said second averaging means.

22. An air-fuel ratio control system according to claim 21, including average value-calculating means for calculating an average value of said air-fuel ratio feedback control amount by the use of said first averaging time constant and wherein said second averaging time constant is determined based on operating conditions of said engine, to an averaging degree smaller than an averaging degree of said first averaging time constant.

23. An air-fuel ratio control system according to claim 21, including a second oxygen sensor arranged in said exhaust passage at a location downstream of said catalytic converter, and correcting means for correcting said air-fuel ratio of exhaust gases at said location immediately upstream of said catalytic converter, based on an output from said second oxygen sensor.

24. An air-fuel ratio control system according to claim 21, wherein said air-fuel ratio control means includes control amount-changing means for changing a control amount of said air-fuel ratio of said mixture supplied to said engine, based on said air-fuel ratio of said exhaust gases at said location immediately upstream of said catalytic converter.

25. An air-fuel ratio control system according to claim 24, wherein said air-fuel ratio control means includes estimating means for estimating an amount of oxygen stored in said catalytic converter, based on said estimated air fuel ratio of exhaust gases at said location immediately upstream of said catalytic converter, and control amount-calculating means for calculating said control amount, based on said estimated amount of oxygen stored in said catalytic converter.

26. In an exhaust system temperature-estimating device for an internal combustion engine having an exhaust passage, including steady condition temperature-calculating means for calculating a steady condition temperature of said exhaust passage in a steady condition of said engine, based on operating conditions of said engine at least including load on said engine, follow-up speed-calculating means for calculating a follow-up speed of said temperature of said exhaust system relative to said steady condition temperature, and exhaust system temperature-estimating means for estimating temperature of said exhaust system, based on said steady condition temperature and said follow-up speed, the improvement comprising:

intake air temperature-detecting means for detecting intake air temperature of said engine;

vehicle speed-detecting means for detecting speed of a vehicle on which said engine is installed; and correcting means for correcting said steady condition temperature and/or said follow-up speed, based on said intake air temperature and said vehicle speed.

27. An exhaust system temperature-estimating device according to claim 26, including correcting means for correcting said steady condition temperature by an air-fuel ratio of a mixture supplied to said engine.

* * * * *